United States Patent
Li et al.

(10) Patent No.: US 10,785,837 B2
(45) Date of Patent: *Sep. 22, 2020

(54) SYSTEMS AND METHODS FOR STAGE-BASED CONTROL RELATED TO TRIAC DIMMERS

(71) Applicant: ON-BRIGHT ELECTRONICS (SHANGHAI) CO., LTD., Shanghai (CN)

(72) Inventors: Zhuoyan Li, Shanghai (CN); Liqiang Zhu, Shanghai (CN); Xueyou Ling, Shanghai (CN); Jun Zhou, Shanghai (CN); Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/385,327

(22) Filed: Apr. 16, 2019

(65) Prior Publication Data

US 2019/0350060 A1    Nov. 14, 2019

Related U.S. Application Data

(63) Continuation of application No. 15/849,452, filed on Dec. 20, 2017, now Pat. No. 10,375,785.

(30) Foreign Application Priority Data

Nov. 30, 2017    (CN) .......................... 2017 1 1235958

(51) Int. Cl.
*H05B 33/08*    (2020.01)
*H05B 37/02*    (2006.01)
(Continued)

(52) U.S. Cl.
CPC ............. *H05B 45/10* (2020.01); *H05B 45/37* (2020.01); *H05B 47/16* (2020.01)

(58) Field of Classification Search
None
See application file for complete search history.

(56) References Cited

U.S. PATENT DOCUMENTS 3,803,452 A    4/1974  Goldschmied
3,899,713 A    8/1975  Barkan et al.
(Continued)

FOREIGN PATENT DOCUMENTS

CN    1448005 A    10/2003
CN    101657057 A    2/2010
(Continued)

OTHER PUBLICATIONS

China Patent Office, Office Action dated Aug. 28, 2015, in Application No. 201410322602.9.
(Continued)

*Primary Examiner* — Crystal L Hammond
(74) *Attorney, Agent, or Firm* — Faegre Drinker Biddle & Reath LLP

(57) ABSTRACT

System controller and method for a lighting system according to certain embodiments. For example, the system controller includes a first controller terminal configured to receive a first signal, and a second controller terminal coupled to a first transistor terminal of a transistor. The transistor further includes a second transistor terminal and a third transistor terminal. The second transistor terminal is coupled to a first winding terminal of a winding, and the winding further includes a second winding terminal coupled to a capacitor. Additionally, the system controller includes a third controller terminal coupled to the third transistor terminal of the transistor, and a fourth controller terminal
(Continued)

coupled to a resistor and configured to receive a second signal. The second signal represents a magnitude of a current flowing through at least the winding, the third controller terminal, the fourth controller terminal, and the resistor.

25 Claims, 11 Drawing Sheets

(51) Int. Cl.
*H05B 45/10* (2020.01)
*H05B 45/37* (2020.01)
*H05B 47/16* (2020.01)

(56) References Cited

U.S. PATENT DOCUMENTS

| | | |
|---|---|---|
| 4,253,045 A | 2/1981 | Weber |
| 5,144,205 A | 9/1992 | Motto et al. |
| 5,249,298 A | 9/1993 | Bolan et al. |
| 5,504,398 A | 4/1996 | Rothenbuhler |
| 5,949,197 A | 9/1999 | Kastner |
| 6,196,208 B1 * | 3/2001 | Masters ............... F02D 31/008 123/597 |
| 6,218,788 B1 | 4/2001 | Chen et al. |
| 6,229,271 B1 | 5/2001 | Liu |
| 6,278,245 B1 | 8/2001 | Li et al. |
| 7,038,399 B2 | 5/2006 | Lys et al. |
| 7,649,327 B2 | 1/2010 | Peng |
| 7,825,715 B1 | 11/2010 | Greenberg |
| 7,880,400 B2 | 2/2011 | Zhou et al. |
| 7,944,153 B2 | 5/2011 | Greenfeld |
| 8,018,171 B1 | 9/2011 | Melanson et al. |
| 8,134,302 B2 | 3/2012 | Yang et al. |
| 8,278,832 B2 | 10/2012 | Hung et al. |
| 8,373,313 B2 | 2/2013 | Garcia et al. |
| 8,378,583 B2 | 2/2013 | Hying et al. |
| 8,378,588 B2 | 2/2013 | Kuo et al. |
| 8,378,589 B2 | 2/2013 | Kuo et al. |
| 8,415,901 B2 | 4/2013 | Recker et al. |
| 8,432,438 B2 | 4/2013 | Ryan et al. |
| 8,497,637 B2 | 7/2013 | Liu |
| 8,558,477 B2 | 10/2013 | Bordin et al. |
| 8,569,956 B2 | 10/2013 | Shteynberg et al. |
| 8,644,041 B2 | 2/2014 | Pansier |
| 8,698,419 B2 | 4/2014 | Yan et al. |
| 8,716,882 B2 | 5/2014 | Pettler et al. |
| 8,742,674 B2 * | 6/2014 | Shteynberg ........ H05B 33/0815 315/201 |
| 8,890,440 B2 | 11/2014 | Yan et al. |
| 8,896,288 B2 | 11/2014 | Choi et al. |
| 8,941,324 B2 | 1/2015 | Zhou et al. |
| 9,030,122 B2 | 5/2015 | Yan et al. |
| 9,084,316 B2 | 7/2015 | Melanson et al. |
| 9,148,050 B2 | 9/2015 | Chiang |
| 9,167,638 B2 | 10/2015 | Le |
| 9,173,258 B2 | 10/2015 | Ekbote |
| 9,207,265 B1 | 12/2015 | Grisamore et al. |
| 9,220,133 B2 | 12/2015 | Salvestrini et al. |
| 9,220,136 B2 | 12/2015 | Zhang |
| 9,247,623 B2 | 1/2016 | Recker et al. |
| 9,247,625 B2 | 1/2016 | Recker et al. |
| 9,301,349 B2 | 3/2016 | Zhu et al. |
| 9,332,609 B1 | 5/2016 | Rhodes et al. |
| 9,402,293 B2 | 7/2016 | Vaughan et al. |
| 9,408,269 B2 | 8/2016 | Zhu et al. |
| 9,414,455 B2 | 8/2016 | Zhou et al. |
| 9,467,137 B2 | 10/2016 | Eum et al. |
| 9,480,118 B2 | 10/2016 | Liao et al. |
| 9,554,432 B2 | 1/2017 | Zhu et al. |
| 9,585,222 B2 | 2/2017 | Zhu et al. |
| 9,655,188 B1 | 5/2017 | Lewis et al. |
| 9,661,702 B2 | 5/2017 | Mednik et al. |
| 9,723,676 B2 | 8/2017 | Ganick et al. |
| 9,750,107 B2 | 8/2017 | Zhu et al. |
| 9,820,344 B1 | 11/2017 | Papanicolaou |
| 9,883,561 B1 | 1/2018 | Liang et al. |
| 9,883,562 B2 | 1/2018 | Zhu et al. |
| 9,961,734 B2 | 6/2018 | Zhu et al. |
| 10,054,271 B2 | 8/2018 | Xiong et al. |
| 10,153,684 B2 | 12/2018 | Liu et al. |
| 10,194,500 B2 | 1/2019 | Zhu et al. |
| 10,264,642 B2 | 4/2019 | Liang et al. |
| 10,292,217 B2 | 5/2019 | Zhu et al. |
| 10,334,677 B2 | 6/2019 | Zhu et al. |
| 10,342,087 B2 | 7/2019 | Zhu et al. |
| 10,375,785 B2 | 8/2019 | Li et al. |
| 10,383,187 B2 | 8/2019 | Liao et al. |
| 10,447,171 B2 | 10/2019 | Newman, Jr. et al. |
| 10,448,469 B2 | 10/2019 | Zhu et al. |
| 10,448,470 B2 | 10/2019 | Zhu et al. |
| 10,455,657 B2 | 10/2019 | Zhu et al. |
| 10,530,268 B2 | 1/2020 | Newman, Jr. et al. |
| 10,616,975 B2 | 4/2020 | Gotou et al. |
| 2006/0022648 A1 | 2/2006 | Ben-Yaakov et al. |
| 2007/0182338 A1 | 8/2007 | Shteynberg et al. |
| 2007/0182699 A1 | 8/2007 | Ha et al. |
| 2007/0267978 A1 | 11/2007 | Shteynberg et al. |
| 2008/0224629 A1 | 9/2008 | Melanson |
| 2008/0224633 A1 | 9/2008 | Melanson et al. |
| 2008/0278092 A1 | 11/2008 | Lys et al. |
| 2009/0021469 A1 | 1/2009 | Yeo et al. |
| 2009/0085494 A1 | 4/2009 | Summerland |
| 2009/0251059 A1 | 10/2009 | Veltman |
| 2010/0141153 A1 | 6/2010 | Recker et al. |
| 2010/0156319 A1 | 6/2010 | Melanson |
| 2010/0164406 A1 | 7/2010 | Kost et al. |
| 2010/0176733 A1 | 7/2010 | King |
| 2010/0207536 A1 | 8/2010 | Burdalski |
| 2010/0213859 A1 | 8/2010 | Shteynberg |
| 2010/0219766 A1 | 9/2010 | Kuo et al. |
| 2010/0231136 A1 | 9/2010 | Reisenauer et al. |
| 2011/0012530 A1 | 1/2011 | Zheng et al. |
| 2011/0037399 A1 | 2/2011 | Hung et al. |
| 2011/0074302 A1 | 3/2011 | Draper et al. |
| 2011/0080110 A1 | 4/2011 | Nuhfer et al. |
| 2011/0080111 A1 | 4/2011 | Nuhfer et al. |
| 2011/0101867 A1 | 5/2011 | Wang et al. |
| 2011/0121744 A1 | 5/2011 | Salvestrini |
| 2011/0121754 A1 | 5/2011 | Shteynberg |
| 2011/0133662 A1 | 6/2011 | Yan et al. |
| 2011/0227490 A1 | 9/2011 | Huynh |
| 2011/0260619 A1 | 10/2011 | Sadwick |
| 2011/0285301 A1 | 11/2011 | Kuang et al. |
| 2011/0291583 A1 | 12/2011 | Shen |
| 2011/0309759 A1 | 12/2011 | Shteynberg |
| 2012/0001548 A1 | 1/2012 | Recker et al. |
| 2012/0032604 A1 | 2/2012 | Hontele |
| 2012/0069616 A1 | 3/2012 | Kitamura et al. |
| 2012/0080944 A1 | 4/2012 | Recker et al. |
| 2012/0081009 A1 | 4/2012 | Shteynberg et al. |
| 2012/0081032 A1 | 4/2012 | Huang |
| 2012/0146526 A1 | 6/2012 | Lam et al. |
| 2012/0181944 A1 | 7/2012 | Jacobs et al. |
| 2012/0181946 A1 | 7/2012 | Melanson |
| 2012/0187857 A1 | 7/2012 | Ulmann et al. |
| 2012/0242237 A1 | 9/2012 | Chen et al. |
| 2012/0262093 A1 | 10/2012 | Recker et al. |
| 2012/0268031 A1 | 10/2012 | Zhou et al. |
| 2012/0286679 A1 | 11/2012 | Liu |
| 2012/0299500 A1 | 11/2012 | Sadwick |
| 2012/0299501 A1 | 11/2012 | Kost et al. |
| 2012/0319604 A1 | 12/2012 | Walters |
| 2012/0326616 A1 | 12/2012 | Sumitani et al. |
| 2013/0009561 A1 | 1/2013 | Briggs |
| 2013/0020965 A1 | 1/2013 | Kang et al. |
| 2013/0026942 A1 | 1/2013 | Ryan et al. |
| 2013/0026945 A1 | 1/2013 | Ganick et al. |
| 2013/0027528 A1 | 1/2013 | Staats et al. |
| 2013/0034172 A1 | 2/2013 | Pettler et al. |
| 2013/0043726 A1 | 2/2013 | Krishnamoorthy et al. |
| 2013/0063047 A1 | 3/2013 | Veskovic |
| 2013/0154487 A1 | 6/2013 | Kuang et al. |
| 2013/0162158 A1 | 6/2013 | Pollischansky |

(56) References Cited

U.S. PATENT DOCUMENTS

| | | |
|---|---|---|
| 2013/0175931 A1 | 7/2013 | Sadwick |
| 2013/0181630 A1 | 7/2013 | Taipale et al. |
| 2013/0193879 A1 | 8/2013 | Sadwick |
| 2013/0194848 A1 | 8/2013 | Bemardinis et al. |
| 2013/0215655 A1 | 8/2013 | Yang et al. |
| 2013/0223107 A1 | 8/2013 | Zhang et al. |
| 2013/0241427 A1 | 9/2013 | Kesterson et al. |
| 2013/0241428 A1 | 9/2013 | Takeda |
| 2013/0241441 A1 | 9/2013 | Myers et al. |
| 2013/0242622 A1 | 9/2013 | Peng |
| 2013/0249431 A1 | 9/2013 | Shteynberg et al. |
| 2013/0307431 A1 | 11/2013 | Zhu et al. |
| 2013/0307434 A1 | 11/2013 | Zhang |
| 2014/0009082 A1 | 1/2014 | King et al. |
| 2014/0029315 A1 | 1/2014 | Zhang et al. |
| 2014/0049177 A1 | 2/2014 | Kulczycki et al. |
| 2014/0063857 A1 | 3/2014 | Peng |
| 2014/0078790 A1 | 3/2014 | Lin et al. |
| 2014/0103829 A1 | 4/2014 | Kang |
| 2014/0132172 A1 | 5/2014 | Zhu et al. |
| 2014/0160809 A1 | 6/2014 | Lin et al. |
| 2014/0176016 A1 | 6/2014 | Li et al. |
| 2014/0197760 A1 | 7/2014 | Radermacher |
| 2014/0265898 A1 | 9/2014 | Del Carmen, Jr. et al. |
| 2014/0265907 A1 | 9/2014 | Su et al. |
| 2014/0265935 A1 | 9/2014 | Sadwick |
| 2014/0268935 A1 | 9/2014 | Chiang |
| 2014/0320031 A1* | 10/2014 | Wu ............ H05B 33/0812 315/193 |
| 2014/0333228 A1 | 11/2014 | Angeles et al. |
| 2014/0346973 A1 | 11/2014 | Zhu et al. |
| 2014/0354170 A1 | 12/2014 | Gredler |
| 2015/0015159 A1 | 1/2015 | Wang |
| 2015/0035450 A1 | 2/2015 | Werner |
| 2015/0062981 A1 | 3/2015 | Fang |
| 2015/0077009 A1 | 3/2015 | Kunimatsu |
| 2015/0091470 A1 | 4/2015 | Zhou et al. |
| 2015/0312978 A1 | 10/2015 | Vaughan et al. |
| 2015/0312982 A1 | 10/2015 | Melanson |
| 2015/0312988 A1 | 10/2015 | Liao et al. |
| 2015/0333764 A1 | 11/2015 | Pastore et al. |
| 2015/0357910 A1 | 12/2015 | Murakami et al. |
| 2015/0359054 A1 | 12/2015 | Lin et al. |
| 2015/0366010 A1 | 12/2015 | Mao et al. |
| 2015/0382424 A1 | 12/2015 | Knapp et al. |
| 2016/0014861 A1 | 1/2016 | Zhu et al. |
| 2016/0014865 A1 | 1/2016 | Zhu et al. |
| 2016/0037604 A1 | 2/2016 | Zhu et al. |
| 2016/0119998 A1 | 4/2016 | Linnartz et al. |
| 2016/0286617 A1 | 9/2016 | Takabachi et al. |
| 2016/0323957 A1 | 11/2016 | Hu et al. |
| 2016/0338163 A1 | 11/2016 | Zhu et al. |
| 2017/0006684 A1 | 1/2017 | Tu et al. |
| 2017/0027029 A1 | 1/2017 | Hu et al. |
| 2017/0064787 A1 | 3/2017 | Liao et al. |
| 2017/0099712 A1 | 4/2017 | Hilgers et al. |
| 2017/0181235 A1 | 6/2017 | Zhu et al. |
| 2017/0196063 A1 | 7/2017 | Zhu et al. |
| 2017/0251532 A1 | 8/2017 | Wang et al. |
| 2017/0311409 A1 | 10/2017 | Zhu et al. |
| 2017/0354008 A1 | 12/2017 | Eum et al. |
| 2017/0359880 A1 | 12/2017 | Zhu et al. |
| 2018/0103520 A1 | 4/2018 | Zhu et al. |
| 2018/0110104 A1 | 4/2018 | Liang et al. |
| 2018/0139816 A1 | 5/2018 | Liu et al. |
| 2018/0288845 A1 | 10/2018 | Zhu et al. |
| 2019/0069364 A1 | 2/2019 | Zhu et al. |
| 2019/0069366 A1 | 2/2019 | Liao et al. |
| 2019/0082507 A1 | 3/2019 | Zhu et al. |
| 2019/0124736 A1 | 4/2019 | Zhu et al. |
| 2019/0166667 A1 | 5/2019 | Li et al. |
| 2019/0230755 A1 | 7/2019 | Zhu et al. |
| 2019/0327810 A1 | 10/2019 | Zhu et al. |

FOREIGN PATENT DOCUMENTS

| | | |
|---|---|---|
| CN | 101868090 | 10/2010 |
| CN | 101896022 A | 11/2010 |
| CN | 101917804 A | 12/2010 |
| CN | 101998734 A | 3/2011 |
| CN | 102014540 | 4/2011 |
| CN | 102014551 A | 4/2011 |
| CN | 102056378 A | 5/2011 |
| CN | 102209412 A | 10/2011 |
| CN | 102300375 A | 12/2011 |
| CN | 102347607 | 2/2012 |
| CN | 102387634 A | 3/2012 |
| CN | 103004290 | 3/2012 |
| CN | 102474953 | 5/2012 |
| CN | 102497706 | 6/2012 |
| CN | 202353859 U | 7/2012 |
| CN | 102695330 A | 9/2012 |
| CN | 102791056 A | 11/2012 |
| CN | 102843836 A | 12/2012 |
| CN | 202632722 U | 12/2012 |
| CN | 102870497 | 1/2013 |
| CN | 102946674 A | 2/2013 |
| CN | 103024994 A | 4/2013 |
| CN | 103096606 A | 5/2013 |
| CN | 103260302 A | 8/2013 |
| CN | 103313472 | 9/2013 |
| CN | 103369802 A | 10/2013 |
| CN | 103379712 A | 10/2013 |
| CN | 103547014 | 1/2014 |
| CN | 103716934 | 4/2014 |
| CN | 103858524 | 6/2014 |
| CN | 203675408 U | 6/2014 |
| CN | 103945614 A | 7/2014 |
| CN | 103957634 A | 7/2014 |
| CN | 103096606 B | 12/2014 |
| CN | 103781229 B | 9/2015 |
| CN | 105246218 A | 1/2016 |
| CN | 105265019 | 1/2016 |
| CN | 105423140 A | 3/2016 |
| CN | 105591553 A | 5/2016 |
| CN | 105873269 | 8/2016 |
| CN | 106105395 A | 11/2016 |
| CN | 205812458 U | 12/2016 |
| CN | 106358337 A | 1/2017 |
| CN | 106413189 | 2/2017 |
| CN | 106793246 A | 5/2017 |
| CN | 107046751 A | 8/2017 |
| CN | 106332374 A | 11/2017 |
| EP | 2403318 A1 | 1/2012 |
| JP | 2008-010152 A | 1/2008 |
| JP | 2011-249328 A | 12/2011 |
| TW | 201215228 A1 | 9/2010 |
| TW | 201125441 A | 7/2011 |
| TW | 201132241 | 9/2011 |
| TW | 201143530 A | 12/2011 |
| TW | 201146087 A1 | 12/2011 |
| TW | 201204168 A1 | 1/2012 |
| TW | 201208463 A1 | 2/2012 |
| TW | 201208481 A1 | 2/2012 |
| TW | 201208486 | 2/2012 |
| TW | 201233021 A | 8/2012 |
| TW | 201244543 | 11/2012 |
| TW | I 387396 | 2/2013 |
| TW | 201315118 A | 4/2013 |
| TW | 201322825 A | 6/2013 |
| TW | 201342987 | 10/2013 |
| TW | 201348909 | 12/2013 |
| TW | I-422130 | 1/2014 |
| TW | I 423732 | 1/2014 |
| TW | 201412189 A | 3/2014 |
| TW | 201414146 A | 4/2014 |
| TW | M477115 | 4/2014 |
| TW | 201417626 A | 5/2014 |
| TW | 201417631 | 5/2014 |
| TW | 201422045 | 6/2014 |
| TW | 201424454 A | 6/2014 |
| TW | I 448198 | 8/2014 |
| TW | 201503756 A | 1/2015 |

(56) References Cited

FOREIGN PATENT DOCUMENTS

| TW | 201515514 | 4/2015 |
|---|---|---|
| TW | I 496502 B | 8/2015 |
| TW | 201603644 | 1/2016 |
| TW | 201607368 | 2/2016 |
| TW | 201630468 A | 8/2016 |
| TW | 201639415 A | 11/2016 |

OTHER PUBLICATIONS

China Patent Office, Office Action dated Aug. 8, 2015, in Application No. 201410172086.6.
China Patent Office, Office Action dated Mar. 2, 2016, in Application No. 201410172086.6.
China Patent Office, Office Action dated Dec. 14, 2015, in Application No. 201210166672.0.
China Patent Office, Office Action dated Sep. 2, 2016, in Application No. 201510103579.9.
China Patent Office, Office Action dated Jul. 7, 2014, in Application No. 201210468505.1.
China Patent Office, Office Action dated Jun. 3, 2014, in Application No. 201110103130.4.
China Patent Office, Office Action dated Jun. 30, 2015, in Application No. 201410171893.6.
China Patent Office, Office Action dated Nov. 15, 2014, in Application No. 201210166672.0.
China Patent Office, Office Action dated Oct. 19, 2015, in Application No. 201410322612.2.
China Patent Office, Office Action dated Mar. 22, 2016, in Application No. 201410322612.2.
China Patent Office, Office Action dated Nov. 29, 2018, in Application No. 201710828263.5.
China Patent Office, Office Action dated Dec. 3, 2018, in Application No. 201710557179.4.
China Patent Office, Office Action dated Mar. 22, 2019, in Application No. 201711464007.9.
Taiwan Intellectual Property Office, Office Action dated Jan. 7, 2014, in Application No. 100119272.
Taiwan Intellectual Property Office, Office Action dated Jun. 9, 2014, in Application No. 101124982.
Taiwan Intellectual Property Office, Office Action dated Nov. 13, 2015, in Application No. 103141628.
Taiwan Intellectual Property Office, Office Action dated Sep. 17, 2015, in Application No. 103127108.
Taiwan Intellectual Property Office, Office Action dated Sep. 17, 2015, in Application No. 103127620.
Taiwan Intellectual Property Office, Office Action dated Sep. 25, 2014, in Application No. 101148716.
Taiwan Intellectual Property Office, Office Action dated Feb. 27, 2018, in Application No. 106136242.
Taiwan Intellectual Property Office, Office Action dated Jan. 14, 2019, in Application No. 107107508.
Taiwan Intellectual Property Office, Office Action dated Feb. 6, 2018, in Application No. 106130686.
Taiwan Intellectual Property Office, Office Action dated Apr. 18, 2016, in Application No. 103140989.
Taiwan Intellectual Property Office, Office Action dated Aug. 23, 2017, in Application No. 106103535.
Taiwan Intellectual Property Office, Office Action dated May 28, 2019, in Application No. 107112306.
United States Patent and Trademark Office, Notice of Allowance dated Sep. 24, 2018, in U.S. Appl. No. 15/849,452.
United States Patent and Trademark Office, Notice of Allowance dated Jan. 25, 2019, in U.S. Appl. No. 15/849,452.
United States Patent and Trademark Office, Office Action dated Oct. 3, 2017, in U.S. Appl. No. 15/649,586.
United States Patent and Trademark Office, Notice of Allowance dated May 23, 2018, in U.S. Appl. No. 15/649,586.
United States Patent and Trademark Office, Notice of Allowance dated Oct. 24, 2018, in U.S. Appl. No. 15/649,586.
United States Patent and Trademark Office, Office Action dated Oct. 3, 2017, in U.S. Appl. No. 15/649,566.
United States Patent and Trademark Office, Office Action dated May 11, 2018, in U.S. Appl. No. 15/649,566.
United States Patent and Trademark Office, Notice of Allowance dated Dec. 27, 2018, in U.S. Appl. No. 15/649,566.
United States Patent and Trademark Office, Office Action dated Mar. 6, 2018, in U.S. Appl. No. 15/836,461.
United States Patent and Trademark Office, Office Action dated Nov. 2, 2018, in U.S. Appl. No. 15/836,461.
United States Patent and Trademark Office, Notice of Allowance dated Apr. 4, 2019, in U.S. Appl. No. 15/836,461.
United States Patent and Trademark Office, Office Action dated Oct. 3, 2018, in U.S. Appl. No. 15/934,460.
United States Patent and Trademark Office, Office Action dated Jan. 11, 2019, in U.S. Appl. No. 16/009,727.
United States Patent and Trademark Office, Notice of Allowance dated May 30, 2019, in U.S. Appl. No. 16/009,727.
United States Patent and Trademark Office, Office Action dated Apr. 20, 2017, in U.S. Appl. No. 15/263,080.
United States Patent and Trademark Office, Office Action dated Sep. 12, 2017, in U.S. Appl. No. 15/263,080.
United States Patent and Trademark Office, Notice of Allowance dated Jan. 30, 2018, in U.S. Appl. No. 15/263,080.
United States Patent and Trademark Office, Notice of Allowance dated Jun. 4, 2018, in U.S. Appl. No. 15/263,080.
United States Patent and Trademark Office, Notice of Allowance dated Oct. 3, 2018, in U.S. Appl. No. 15/263,080.
United States Patent and Trademark Office, Notice of Allowance dated Nov. 30, 2018, in U.S. Appl. No. 15/263,080.
United States Patent and Trademark Office, Office Action dated Apr. 17, 2019, in U.S. Appl. No. 16/119,952.
United States Patent and Trademark Office, Notice of Allowance dated Jun. 21, 2019, in U.S. Appl. No. 15/934,460.
United States Patent and Trademark Office, Notice of Allowance dated Jul. 25, 2019, in U.S. Appl. No. 16/129,576.
United States Patent and Trademark Office, Office Action dated Sep. 16, 2019, in U.S. Appl. No. 16/226,424.
United States Patent and Trademark Office, Office Action dated Jul. 12, 2019, in U.S. Appl. No. 16/124,739.
United States Patent and Trademark Office, Office Action dated Aug. 8, 2019, in U.S. Appl. No. 16/270,416.
United States Patent and Trademark Office, Office Action dated Oct. 4, 2019, in U.S. Appl. No. 16/385,309.
United States Patent and Trademark Office, Office Action dated Oct. 10, 2019, in U.S. Appl. No. 16/119,952.
China Patent Office, Office Action dated Jan. 9, 2020, in Application No. 201710828263.5.
Taiwan Intellectual Property Office, Office Action dated Oct. 31, 2019, in Application No. 107107508.
United States Patent and Trademark Office, Notice of Allowance dated Dec. 16, 2019, in U.S. Appl. No. 16/124,739.
United States Patent and Trademark Office, Notice of Allowance dated Feb. 11, 2020, in U.S. Appl. No. 16/270,416.
United States Patent and Trademark Office, Office Action dated Mar. 24, 2020, in U.S. Appl. No. 16/119,952.
United States Patent and Trademark Office, Notice of Allowance dated Apr. 16, 2020, in U.S. Appl. No. 16/385,309.
United States Patent and Trademark Office, Notice of Allowance dated Jun. 22, 2020, in U.S. Appl. No. 16/226,424.
United States Patent and Trademark Office, Office Action dated Jun. 18, 2020, in U.S. Appl. No. 16/124,739.
United States Patent and Trademark Office, Office Action dated Jun. 30, 2020, in U.S. Appl. No. 16/124,739.
United States Patent and Trademark Office, Notice of Allowance dated Jun. 18, 2020, in U.S. Appl. No. 16/385,309.
United States Patent and Trademark Office, Office Action dated Jul. 16, 2020, in U.S. Appl. No. 16/566,701.
United States Patent and Trademark Office, Office Action dated Jul. 2, 2020, in U.S. Appl. No. 16/661,897.
United States Patent and Trademark Office, Office Action dated Jul. 23, 2020, in U.S. Appl. No. 16/804,918.

(56) References Cited

OTHER PUBLICATIONS

United States Patent and Trademark Office, Office Action dated Jun. 30, 2020, in U.S. Appl. No. 16/809,447.

* cited by examiner

US 10,785,837 B2

SYSTEMS AND METHODS FOR STAGE-BASED CONTROL RELATED TO TRIAC DIMMERS

1. CROSS-REFERENCES TO RELATED APPLICATIONS

This application is a continuation of U.S. patent application Ser. No. 15/849,452, filed Dec. 20, 2017, which claims priority to Chinese Patent Application No. 201711235958.9, filed. Nov. 30, 2017, both of the above-referenced applications being incorporated by reference herein for all purposes.

Additionally, this application is related to U.S. patent application Ser. Nos. 15/364,100, 14/593,734 and 14/451,656, all of which are incorporated by reference herein for all purposes.

2. BACKGROUND OF THE INVENTION

Certain embodiments of the present invention are directed to integrated circuits. More particularly, some embodiments of the invention provide a system and method for stage-based control related to TRIAC dimmer. Merely by way of example, some embodiments of the invention have been applied to driving one or more light emitting diodes (LEDs). But it would be recognized that the invention has a much broader range of applicability.

A conventional lighting system may include or may not include a TRIAC dimmer that is a dimmer including a Triode for Alternating Current (TRIAC). For example, the TRIAC dimmer is either a leading-edge TRIAC dimmer or a trailing-edge TRIAC dimmer. Often, the leading-edge TRIAC dimmer and the trailing-edge TRIAC dimmer are configured to receive an alternating-current (AC) input voltage, process the AC input voltage by clipping part of the waveform of the AC input voltage, and generate a voltage that is then received by a rectifier (e.g., a full wave rectifying bridge) in order to generate a rectified output voltage.

FIG. 1 shows certain conventional timing diagrams for a leading-edge TRIAC dimmer and a trailing-edge TRIAC dimmer. The waveforms 110, 120, and 130 are merely examples. Each of the waveforms 110, 120, and 130 represents a rectified output voltage as a function of time that is generated by a rectifier. For the waveform 110, the rectifier receives an AC input voltage without any processing by a TRIAC dimmer. For the waveform 120, an AC input voltage is received by a leading-edge TRIAC dimmer, and the voltage generated by the leading-edge TRIAC dimmer is received by the rectifier, which then generates the rectified output voltage. For the waveform 130, an AC input voltage is received by a trailing-edge TRIAC dimmer, and the voltage generated by the trailing-edge TRIAC dimmer is received by the rectifier, which then generates the rectified output voltage.

As shown by the waveform 110, each cycle of the rectified output voltage has, for example, a phase angel (e.g., $\phi$) that changes from 0° to 180° and then from 180° to 360°. As shown by the waveform 120, the leading-edge TRIAC dimmer usually processes the AC input voltage by clipping part of the waveform that corresponds to the phase angel starting at 0° or starting at 180°. As shown by the waveform 130, the trailing-edge TRIAC dimmer often processes the AC input voltage by clipping part of the waveform that corresponds to the phase angel ending at 180° or ending at 360°.

Various conventional technologies have been used to detect whether or not a TRIAC dimmer has been included in a lighting system, and if a TRIAC dimmer is detected to be included in the lighting system, whether the TRIAC dimmer is a leading-edge TRIAC dimmer or a trailing-edge TRIAC dimmer. In one conventional technology, a rectified output voltage generated by a rectifier is compared with a threshold voltage $V_{th\_on}$ in order to determine a turn-on time period $T_{on}$. If the turn-on time period $T_{on}$ is approximately equal to the duration of a half cycle of the AC input voltage, no TRIAC dimmer is determined to be included in the lighting system; if the turn-on time period $T_{on}$ is not approximately equal to but is smaller than the duration of a half cycle of the AC input voltage, a TRIAC dimmer is determined to be included in the lighting system. If a TRIAC dimmer is determined to be included in the lighting system, a turn-on voltage slope $V_{on\_slope}$ is compared with the threshold voltage slope $V_{th\_slope}$. If the turn-on voltage slope $V_{on\_slope}$ is larger than the threshold voltage slope $V_{th\_slope}$, the TRIAC dimmer is determined to be a leading-edge TRIAC dimmer; if the turn-on voltage slope $V_{on\_slope}$ is smaller than the threshold voltage slope $V_{th\_slope}$, the TRIAC dimmer is determined to be a trailing-edge TRIAC dimmer.

If a conventional lighting system includes a TRIAC dimmer and light emitting diodes (LEDs), the light emitting diodes may flicker if the current that flows through the TRIAC dimmer falls below a holding current that is, for example, required by the TRIAC dimmer. As an example, if the current that flows through the TRIAC dimmer falls below the holding current, the TRIAC dimmer may turn on and off repeatedly, thus causing the LEDs to flicker. As another example, the various TRIAC dimmers made by different manufacturers have different holding currents ranging from 5 mA to 50 mA.

The light emitting diodes (LEDs) are gradually replacing incandescent lamps and becoming major lighting sources. The LEDs can provide high energy efficiency and long lifetime. The dimming control of LEDs, however, faces significant challenges because of insufficient dimmer compatibility. For certain historical reasons, the TRIAC dimmers often are designed primarily suitable for incandescent lamps, which usually include resistive loads with low lighting efficiency. Such low lighting efficiency of the resistive loads often helps to satisfy the holding-current requirements of TRIAC dimmers. Hence the TRIAC dimmers may work well with the incandescent lamps. In contrast, for highly efficient LEDs, the holding-current requirements of TRIAC dimmers usually are difficult to meet. The LEDs often need less amount of input power than the incandescent lamps for the same level of illumination.

In order to meet the holding-current requirements of the TRIAC dimmers, some conventional techniques use a bleeder for a lighting system. FIG. 2 is a simplified diagram of a conventional lighting system that includes a bleeder. As shown, the conventional lighting system 200 includes a TRIAC dimmer 210, a rectifier 220, a bleeder 224, a diode 226, capacitors 230, 232, 234, 236 and 238, a pulse-width-modulation (PWM) controller 240, a winding 260, a transistor 262, resistors 270, 272, 274, 276, 278 and 279, and one or more LEDs 250. The PWM controller 240 includes controller terminals 242, 244, 246, 248, 252, 254, 256 and 258. For example, the PWM controller 240 is a chip, and each of the controller terminals 242, 244, 246, 248, 252, 254, 256 and 258 is a pin. In yet another example, the winding 260 includes winding terminals 263 and 265.

The TRIAC dimmer 210 receives an AC input voltage 214 (e.g., VAC) and generates a voltage 212. The voltage 212 is received by the rectifier 220 (e.g., a full wave rectifying bridge), which then generates a rectified output voltage 222.

The rectified output voltage 222 is larger than or equal to zero. The resistor 279 includes resistor terminals 235 and 239, and the capacitor 236 includes capacitor terminals 281 and 283. The resistor terminal 235 receives the rectified output voltage 222. The resistor terminal 239 is connected to the capacitor terminal 281, the controller terminal 252, and a gate terminal of the transistor 262. The gate terminal of the transistor 262 receives a gate voltage 237 from the resistor terminal 239, the capacitor terminal 281, and the controller terminal 252. The capacitor terminal 283 receives a ground voltage.

As shown in FIG. 2, the rectified output voltage 222 is used to charge the capacitor 236 through the resistor 279 to raise the gate voltage 237. In response, if the result of the gate voltage 237 minus a source voltage at a source terminal of the transistor 262 reaches or exceeds a transistor threshold voltage, the transistor 262 is turned on. When the transistor 262 is turned on, through the transistor 262 and the controller terminal 254, a current flows into the PWM controller 240 and uses an internal path to charge the capacitor 232. In response, the capacitor 232 generates a capacitor voltage 233, which is received by the controller terminal 244. If the capacitor voltage 233 reaches or exceeds an undervoltage-lockout threshold of the PWM controller 240, the PWM controller 240 starts up.

After the PWM controller 240 has started up, a pulse-width-modulation (PWM) signal 255 is generated. The PWM signal 255 has a signal frequency and a duty cycle. The PWM signal 255 is received by the source terminal of the transistor 262 through the terminal 254. The transistor 262 is turned on and off, in order to make an output current 266 constant and provide the output current 266 to the one or more LEDs 250, by working with at least the capacitor 238.

As shown in FIG. 2, a drain voltage at a drain terminal of the transistor 262 is received by a voltage divider that includes the resistors 276 and 278. The drain terminal of the transistor 262 is connected to the winding terminal 265 of the winding 260, and the winding terminal 263 of the winding 260 is connected to the capacitor 230 and the resistor 279. In response, the voltage divider generates a voltage 277, which is received by the controller terminal 256. The PWM controller 240 uses the voltage 277 to detect the end of a demagnetization process of the winding 260. The detection of the end of the demagnetization process is used to control an internal error amplifier of the PWM controller 240, and through the controller terminal 246, to control charging and discharging of the capacitor 234.

Also, after the PWM controller 240 has started up, the resistor 274 is used to detect a current 261, which flows through the winding 260. The current 261 flows from the winding 260 through the resistor 274, which in response generates a sensing voltage 275. The sensing voltage 275 is received by the PWM controller 240 at the controller terminal 258, and is processed by the PWM controller 240 on a cycle-by-cycle basis. The peak magnitude of the sensing voltage 275 is sampled, and the sampled signal is sent to an input terminal of the internal error amplifier of the PWM controller 240. The other input terminal of the internal error amplifier receives a reference voltage $V_{ref}$.

As shown in FIG. 2, the rectified output voltage 222 is received by a voltage divider that includes the resistors 270 and 272. In response, the voltage divider generates a voltage 271, which is received by the controller terminal 242. The PWM controller 240 processes the voltage 271 and determines phase angle of the voltage 271. Based on the detected range of phase angle of the voltage 271, the PWM controller 240 adjusts the reference voltage $V_{ref}$, which is received by the internal error amplifier.

The bleeder 224 is used to ensure that, when the TRIAC dimmer 210 is fired on, an input current 264 that flows through the TRIAC dimmer 210 is larger than a holding current required by the TRIAC dimmer 210, in order to avoid misfire of the TRIAC dimmer 210 and also avoid flickering of the one or more LEDs 250. For example, the bleeder 224 includes a resistor, which receives the rectified output voltage 222 at one resistor terminal of the resistor and receives the ground voltage at the other resistor terminal of the resistor. The resistor of the bleeder 224 allows a bleeder current 268 to flow through as at least part of the input current 264. In another example, if the holding current required by the TRIAC dimmer 210 is small and if the average current that flows through the transistor 262 can satisfy the holding current requirement of the TRIAC dimmer 210, the bleeder 224 is not activated or is simply removed.

As shown in FIG. 2, the lighting system 200 includes, for example, a quasi-resonant system with a buck-boost topology. The output current 266 of the quasi-resonant system is received by the one or more LEDs 250 and is determined as follows:

$$I_o = \frac{1}{2} \times \frac{V_{ref}}{R_{cs}} \qquad \text{(Equation 1)}$$

where $I_O$ represents the output current 266 of the quasi-resonant system of the lighting system 200. Additionally, $V_{ref}$ represents the reference voltage received by the internal error amplifier of the PWM controller 240. Moreover, $R_{cs}$ represents the resistance of the resistor 274.

FIG. 3 is a simplified diagram showing certain conventional components of the lighting system 200 as shown in FIG. 2. The pulse-width-modulation (PWM) controller 240 includes a dimming control component 300 and a transistor 350. The dimming control component 300 includes a phase detector 310, a reference voltage generator 320, a pulse-width-modulation (PWM) signal generator 330, and a driver 340.

FIG. 4 shows certain conventional timing diagrams for the lighting system 200 as shown in FIGS. 2 and 3. The waveform 471 represents the voltage 271 as a function of time, the waveform 412 represents the phase signal 312 as a function of time, the waveform 475 represents the sensing voltage 275 as a function of time, and the waveform 464 represents cycle-by-cycle average of the input current 264 as a function of time.

As shown by FIGS. 3 and 4, the lighting system 200 uses a closed loop to perform dimming control. The phase detector 310 receives the voltage 271 through the terminal 242, detects phase angle of the voltage 271, and generates a phase signal 312 that indicates the detected range of phase angle of the voltage 271. As shown by the waveform 471, the voltage 271 becomes larger than a dim-on threshold voltage (e.g., $V_{th\_dimon}$) at time $t_a$ and becomes smaller than a dim-off threshold voltage (e.g., $V_{th\_dimoff}$) at time $t_b$. The dim-on threshold voltage (e.g., $V_{th\_dimon}$) is equal to or different from the dim-off threshold voltage (e.g., $V_{th\_dimoff}$). The time duration from time $t_a$ to time $t_b$ is represented by $T_R$, during which the phase signal 312 is at the logic high level, as shown by the waveform 412. The time duration $T_R$ represents the detected range of phase angle of the voltage 271.

During the time duration $T_R$, the sensing voltage 275 ramps up and down. For example, during the time duration $T_R$, within a switching period (e.g., $T_{SW}$), the sensing voltage 275 ramps up, ramps down, and then remains constant (e.g., remains equal to zero) until the end of the switching period (e.g., until the end of $T_{SW}$).

The phase signal 312 is received by the reference voltage generator 320, which uses the detected range of phase angle of the voltage 271 to generate the reference voltage 322 (e.g., $V_{ref}$). As shown in FIG. 3, the reference voltage 322 (e.g., $V_{ref}$) is received by the PWM signal generator 330. For example, the PWM signal generator 330 includes the internal error amplifier of the PWM controller 240. In another example, the PWM signal generator 330 also receives the sensing voltage 275 and generates a pulse-width-modulation (PWM) signal 332. The PWM signal 332 is received by the driver 340, which in response generates a drive signal 342 and outputs the drive signal 342 to the transistor 350. The transistor 350 includes a gate terminal, a drain terminal, and a source terminal. The gate terminal of the transistor 350 receives the drive signal 342. The drain terminal of the transistor 350 is coupled to the controller terminal 254, and the source terminal of the transistor 350 is coupled to the controller terminal 258.

As shown by the waveform 475, the reference voltage 322 (e.g., $V_{ref}$) is used by the PWM signal generator 330 to generate the PWM signal 332, which is then used to control the peak magnitude (e.g., CS_peak) of the sensing voltage 275 for each PWM cycle during the time duration $T_R$. For example, each PWM cycle corresponds to a time duration that is equal to the switching period (e.g., $T_{SW}$) in magnitude. In another example, if the detected range of phase angle of the voltage 271 (e.g., corresponding to $T_R$) becomes larger, the reference voltage 322 (e.g., $V_{ref}$) also becomes larger. In yet another example, if the detected range of phase angle of the voltage 271 (e.g., corresponding to $T_R$) becomes smaller, the reference voltage 322 (e.g., $V_{ref}$) also becomes smaller.

According to Equation 1, if the reference voltage 322 (e.g., $V_{ref}$) becomes larger, the output current 266 (e.g., $I_O$) of the quasi-resonant system of the lighting system 200 also becomes larger; if the reference voltage 322 (e.g., $V_{ref}$) becomes smaller, the output current 266 (e.g., $I_O$) of the quasi-resonant system of the lighting system 200 also becomes smaller.

As shown by FIG. 2, the cycle-by-cycle average of the input current 264 is approximately equal to the sum of cycle-by-cycle average of the output current 266 (e.g., $I_O$) and the bleeder current 268. During the time duration $T_R$, within each switching cycle of the PWM signal 332, the output current 266 changes with time, so the average of the output current 266 within each switching cycle is used to determine the cycle-by-cycle average (e.g., I_PWM_av) of the output current 266 as a function of time. When the time duration $T_R$ becomes smaller, the reference voltage 322 (e.g., $V_{ref}$) also becomes smaller and the one or more LEDs 250 are expected to become dimmer. When the time duration $T_R$ becomes too small, the reference voltage 322 (e.g., $V_{ref}$) also becomes too small and the cycle-by-cycle average (e.g., I_PWM_av) of the output current 266 during the time duration $T_R$ becomes smaller than the holding current (e.g., I_holding) required by the TRIAC dimmer 210. In order to avoid misfire of the TRIAC dimmer 210 and also avoid flickering of the one or more LEDs 250, the bleeder current 268 (e.g., I_bleed) is provided in order to increase the cycle-by-cycle average of the input current 264 during the time duration $T_R$. As shown by the waveform 464, the cycle-by-cycle average of the input current 264 during the time duration $T_R$ becomes larger than the holding current required by the TRIAC dimmer 210.

As shown in FIG. 3, the driver 340 outputs the drive signal 342 to the transistor 350. The transistor 350 is turned on if the drive signal 342 is at a logic high level, and the transistor 350 is turned off if the drive signal 342 is at a logic low level. When the transistor 262 and the transistor 350 are turned on, the current 261 flows through the winding 260, the transistor 262, the controller terminal 254, the transistor 350, the controller terminal 258, and the resistor 274. If the transistor 350 becomes turned off when the transistor 262 is still turned on, the transistor 262 then also becomes turned off and the winding 260 starts to discharge. If the transistor 350 becomes turned on when the transistor 262 is still turned off, the transistor 262 then also becomes turned on and the winding 260 starts to charge.

As shown in FIGS. 2-4, the lighting system 200 uses a closed loop to perform dimming control. For example, the lighting system 200 detects the range of phase angle of the voltage 271, and based on the detected range of phase angle, adjusts the reference voltage $V_{ref}$ that is received by the internal error amplifier of the PWM controller 240. In another example, the lighting system 200 provides energy to the one or more LEDs 250 throughout the entire time period of each switching cycle during the time duration $T_R$, which corresponds to the unclipped part of the waveform of the AC input voltage 214 (e.g., VAC).

As discussed above, a bleeder (e.g., the bleeder 224) can help a lighting system (e.g., the lighting system 200) to meet the holding-current requirement of a TRIAC dimmer (e.g., the TRIAC dimmer 210) in order to avoid misfire of the TRIAC dimmer (e.g., the TRIAC dimmer 210) and avoid flickering of one or more LEDs (e.g., the one or more LEDs 250). But the bleeder (e.g., the bleeder 224) usually increases heat generation and reduces energy efficiency of the lighting system (e.g., the lighting system 200). Such reduction in energy efficiency usually becomes more severe if a bleeder current (e.g., the bleeder current 268) becomes larger. This reduced energy efficiency often prevents the lighting system (e.g., the lighting system 200) from taking full advantage of high energy efficiency and long lifetime of the one or more LEDs (e.g., the one or more LEDs 250).

Hence it is highly desirable to improve the techniques of dimming control.

3. BRIEF SUMMARY OF THE INVENTION

Certain embodiments of the present invention are directed to integrated circuits. More particularly, some embodiments of the invention provide a system and method for stage-based control related to TRIAC dimmer. Merely by way of example, some embodiments of the invention have been applied to driving one or more light emitting diodes (LEDs). But it would be recognized that the invention has a much broader range of applicability.

According to one embodiment, a system controller for a lighting system includes a first controller terminal configured to receive a first signal, and a second controller terminal coupled to a first transistor terminal of a transistor. The transistor further includes a second transistor terminal and a third transistor terminal. The second transistor terminal is coupled to a first winding terminal of a winding, and the winding further includes a second winding terminal coupled to a capacitor. Additionally, the system controller includes a third controller terminal coupled to the third transistor terminal of the transistor, and a fourth controller terminal coupled to a resistor and configured to receive a second signal. The second signal represents a magnitude of a current flowing through at least the winding, the third controller terminal, the fourth controller terminal, and the resistor. The system controller is configured to: in response to the first signal becoming larger than a first threshold in magnitude at a first time, cause the second signal to ramp up and down during a first duration of time; and in response to the first signal becoming smaller than a second threshold in magnitude at a third time, cause the second signal to ramp up and down during a second duration of time. The first duration of time starts at the first time and ends at a second time. The second duration of time starts at the third time and ends at a fourth time. The system controller is further configured to cause the second signal to remain equal to a constant magnitude from the second time to the third time. The first time is earlier than the second time, the second time is earlier than the third time, and the third time is earlier than the fourth time.

According to another embodiment, a system controller for a lighting system includes a first controller terminal configured to receive a first signal, and a second controller terminal coupled to a first transistor terminal of a transistor. The transistor further includes a second transistor terminal and a third transistor terminal, and the second transistor terminal is coupled to a winding. Additionally, the system controller further includes a third controller terminal coupled to the third transistor terminal of the transistor, and a fourth controller terminal coupled to a resistor and configured to receive a second signal. The second signal represents a magnitude of a current flowing through at least the winding, the third controller terminal, the fourth controller terminal, and the resistor. The system controller is configured to: in response to the first signal becoming larger than a first threshold in magnitude at a first time, cause the second signal to ramp up and down during a duration of time. The duration of time starts at a second time and ends at a third time. The third time is a time when the first signal becomes smaller than a second threshold in magnitude. The system controller is further configured to cause the second signal to remain equal to a constant magnitude from the first time to the second time. The first time is earlier than the second time, and the second time is earlier than the third time.

According to yet another embodiment, a system controller for a lighting system includes a first controller terminal configured to receive a first signal. The first signal is related to a dimming-control phase angle. Additionally, the system controller includes a second controller terminal coupled to a first transistor terminal of a transistor. The transistor further includes a second transistor terminal and a third transistor terminal, and the second transistor terminal is coupled to a winding. Moreover, the system controller includes a third controller terminal coupled to the third transistor terminal of the transistor, and a fourth controller terminal coupled to a resistor and configured to receive a second signal. The second signal represents a magnitude of a current flowing through at least the winding, the third controller terminal, the fourth controller terminal, and the resistor. The system controller is configured to, in response to the first signal satisfying one or more predetermined conditions: cause the second signal to ramp up and down during a first duration of time; and cause the second signal to ramp up and down during a second duration of time. The first duration of time starts at a first time and ends at a second time, and the second time is the same as or later than the first time. The second duration of time starts at a third time and ends at a fourth time, and the fourth time is the same as or later than the third time. The system controller is further configured to: in response to the dimming-control phase angle increasing from a first angle magnitude to a second angle magnitude, keep the first duration of time at a first predetermined constant; in response to the dimming-control phase angle increasing from the second angle magnitude to a third angle magnitude, increase the first duration of time; and in response to the dimming-control phase angle increasing from the third angle magnitude to a fourth angle magnitude, keep the first duration of time at a second predetermined constant.

According to yet another embodiment, a system controller for a lighting system includes a first controller terminal configured to receive a first signal. The first signal is related to a dimming-control phase angle. Additionally, the system controller includes a second controller terminal coupled to a first transistor terminal of a transistor. The transistor further includes a second transistor terminal and a third transistor terminal, and the second transistor terminal is coupled to a winding. Moreover, the system controller includes a third controller terminal coupled to the third transistor terminal of the transistor, and a fourth controller terminal coupled to a resistor and configured to receive a second signal. The second signal represents a magnitude of a current flowing through at least the winding, the third controller terminal, the fourth controller terminal, and the resistor. The system controller is configured to, in response to the first signal satisfying one or more predetermined conditions: cause the second signal to ramp up and down during a first duration of time; and cause the second signal to ramp up and down during a second duration of time. The first duration of time starts at a first time and ends at a second time, and the second time is the same as or later than the first time. The second duration of time starts at a third time and ends at a fourth time, and the fourth time is the same as or later than the third time. The system controller is further configured to: in response to the dimming-control phase angle increasing from a first angle magnitude to a second angle magnitude, keep the second duration of time at a first predetermined constant; in response to the dimming-control phase angle increasing from the second angle magnitude to a third angle magnitude, increase the second duration of time; and in response to the dimming-control phase angle increasing from the third angle magnitude to a fourth angle magnitude, keep the second duration of time at a second predetermined constant.

According to yet another embodiment, a system controller for a lighting system includes a first controller terminal configured to receive a first signal. The first signal is related to a dimming-control phase angle. Additionally, the system controller includes a second controller terminal coupled to a first transistor terminal of a transistor. The transistor further includes a second transistor terminal and a third transistor terminal, and the second transistor terminal is coupled to a winding. Moreover, the system controller includes a third controller terminal coupled to the third transistor terminal of the transistor, and a fourth controller terminal coupled to a resistor and configured to receive a second signal. The second signal represents a magnitude of a current flowing through at least the winding, the third controller terminal, the fourth controller terminal, and the resistor. The system controller is configured to, in response to the first signal satisfying one or more predetermined conditions: cause the second signal to ramp up and down during a first duration of time; and cause the second signal to ramp up and down during a second duration of time. The first duration of time starts at a first time and ends at a second time, and the second time is the same as or later than the first time. The second duration of time starts at a third time and ends at a fourth time, and the fourth time is the same as or later than the third time. The sum of the first duration of time and the second duration of time is equal to a total duration of time. The system controller is further configured to: in response to the dimming-control phase angle increasing from a first angle magnitude to a second angle magnitude, keep the total duration of time at a first predetermined constant; in response to the dimming-control phase angle increasing from the second angle magnitude to a third angle magnitude, increase the total duration of time; and in response to the dimming-control phase angle increasing from the third angle magnitude to a fourth angle magnitude, keep the total duration of time at a second predetermined constant.

According to yet another embodiment, a system controller for a lighting system includes a first controller terminal configured to receive a first signal, and a second controller terminal coupled to a first transistor terminal of a transistor. The transistor further includes a second transistor terminal and a third transistor terminal, and the second transistor terminal is coupled to a first winding terminal of a winding. The winding further includes a second winding terminal coupled to a capacitor. Additionally, the system controller includes a third controller terminal coupled to the third transistor terminal of the transistor, and a fourth controller terminal coupled to a resistor and configured to receive a second signal. The second signal represents a magnitude of a current flowing through at least the winding, the third controller terminal, the fourth controller terminal, and the resistor. The system controller is configured to determine whether or not a TRIAC dimmer is detected to be included in the lighting system and if the TRIAC dimmer is detected to be included in the lighting system, whether the TRIAC dimmer is a leading-edge TRIAC dimmer or a trailing-edge TRIAC dimmer. The system controller is further configured to, if the TRIAC dimmer is detected to be included in the lighting system and the TRIAC dimmer is the leading-edge TRIAC dimmer: in response to the first signal becoming larger than a first threshold in magnitude at a first time, cause the second signal to ramp up and down during a first duration of time; and in response to the first signal becoming smaller than a second threshold in magnitude at a third time, cause the second signal to ramp up and down during a second duration of time. The first duration of time starts at the first time and ends at a second time, and the second duration of time starts at the third time and ends at a fourth time. The system controller is further configured to, if the TRIAC dimmer is detected to be included in the lighting system and the TRIAC dimmer is the trailing-edge TRIAC dimmer: in response to the first signal becoming larger than the first threshold in magnitude at a fifth time, cause the second signal to ramp up and down during a duration of time. The duration of time starts at a sixth time and ends at a seventh time. The seventh time is a time when the first signal becomes smaller than the second threshold in magnitude.

According to yet another embodiment, a method for a lighting system includes receiving a first signal, and receiving a second signal. The second signal represents a magnitude of a current flowing through at least a winding. Additionally, the method includes: in response to the first signal becoming larger than a first threshold in magnitude at a first time, causing the second signal to ramp up and down during a first duration of time; and in response to the first signal becoming smaller than a second threshold in magnitude at a third time, causing the second signal to ramp up and down during a second duration of time. The first duration of time starts at the first time and ends at a second time, and the second duration of time starts at the third time and ends at a fourth time. Moreover, the method includes causing the second signal to remain equal to a constant magnitude from the second time to the third time. The first time is earlier than the second time, the second time is earlier than the third time, and the third time is earlier than the fourth time.

According to yet another embodiment, a method for a lighting system includes receiving a first signal and receiving a second signal. The second signal represents a magnitude of a current flowing through at least a winding. Additionally, the method includes: in response to the first signal becoming larger than a first threshold in magnitude at a first time, causing the second signal to ramp up and down during a duration of time. The duration of time starts at a second time and ends at a third time, and the third time is a time when the first signal becomes smaller than a second threshold in magnitude. Moreover, the method includes causing the second signal to remain equal to a constant magnitude from the first time to the second time. The first time is earlier than the second time, and the second time is earlier than the third time.

According to yet another embodiment, a method for a lighting system includes receiving a first signal. The first signal is related to a dimming-control phase angle. Additionally, the method includes receiving a second signal. The second signal represents a magnitude of a current flowing through at least a winding. Moreover, the method includes, in response to the first signal satisfying one or more predetermined conditions: causing the second signal to ramp up and down during a first duration of time; and causing the second signal to ramp up and down during a second duration of time. The first duration of time starts at a first time and ends at a second time, and the second time is the same as or later than the first time. The second duration of time starts at a third time and ends at a fourth time, and the fourth time is the same as or later than the third time. The causing the second signal to ramp up and down during a first duration of time includes: in response to the dimming-control phase angle increasing from a first angle magnitude to a second angle magnitude, keeping the first duration of time at a first predetermined constant; in response to the dimming-control phase angle increasing from the second angle magnitude to a third angle magnitude, increasing the first duration of time; and in response to the dimming-control phase angle increasing from the third angle magnitude to a fourth angle magnitude, keeping the first duration of time at a second predetermined constant.

According to yet another embodiment, a method for a lighting system includes receiving a first signal. The first signal is related to a dimming-control phase angle. Additionally, the method includes receiving a second signal. The second signal represents a magnitude of a current flowing through at least a winding. Moreover, the method includes, in response to the first signal satisfying one or more predetermined conditions: causing the second signal to ramp up and down during a first duration of time; and causing the second signal to ramp up and down during a second duration of time. The first duration of time starts at a first time and ends at a second time, and the second time is the same as or later than the first time. The second duration of time starts at a third time and ends at a fourth time, and the fourth time is the same as or later than the third time. The causing the second signal to ramp up and down during a second duration of time includes: in response to the dimming-control phase angle increasing from a first angle magnitude to a second angle magnitude, keeping the second duration of time at a first predetermined constant; in response to the dimming-control phase angle increasing from the second angle magnitude to a third angle magnitude, increasing the second duration of time; and in response to the dimming-control phase angle increasing from the third angle magnitude to a fourth angle magnitude, keeping the second duration of time at a second predetermined constant.

According to yet another embodiment, a method for a lighting system includes receiving a first signal. The first signal is related to a dimming-control phase angle. Additionally, the method includes receiving a second signal. The second signal represents a magnitude of a current flowing through at least a winding. Moreover, the method includes, in response to the first signal satisfying one or more predetermined conditions: causing the second signal to ramp up and down during a first duration of time; and causing the second signal to ramp up and down during a second duration of time. The first duration of time starts at a first time and ends at a second time, and the second time is the same as or later than the first time. The second duration of time starts at a third time and ends at a fourth time, and the fourth time is the same as or later than the third time. A sum of the first duration of time and the second duration of time is equal to a total duration of time. The causing the second signal to ramp up and down during a first duration of time and the causing the second signal to ramp up and down during a second duration of time include: in response to the dimming-control phase angle increasing from a first angle magnitude to a second angle magnitude, keeping the total duration of time at a first predetermined constant; in response to the dimming-control phase angle increasing from the second angle magnitude to a third angle magnitude, increasing the total duration of time; and in response to the dimming-control phase angle increasing from the third angle magnitude to a fourth angle magnitude, keeping the total duration of time at a second predetermined constant.

According to yet another embodiment, a method for a lighting system includes receiving a first signal and receiving a second signal. The second signal represents a magnitude of a current flowing through at least a winding. Additionally, the method includes determining whether or not a TRIAC dimmer is detected to be included in the lighting system and if the TRIAC dimmer is detected to be included in the lighting system, whether the TRIAC dimmer is a leading-edge TRIAC dimmer or a trailing-edge TRIAC dimmer. Moreover, the method includes, if the TRIAC dimmer is detected to be included in the lighting system and the TRIAC dimmer is the leading-edge TRIAC dimmer: in response to the first signal becoming larger than a first threshold in magnitude at a first time, causing the second signal to ramp up and down during a first duration of time; and in response to the first signal becoming smaller than a second threshold in magnitude at a third time, causing the second signal to ramp up and down during a second duration of time. The first duration of time starts at the first time and ends at a second time, and the second duration of time starts at the third time and ends at a fourth time. Also, the method includes, if the TRIAC dimmer is detected to be included in the lighting system and the TRIAC dimmer is the trailing-edge TRIAC dimmer: in response to the first signal becoming larger than the first threshold in magnitude at a fifth time, causing the second signal to ramp up and down during a duration of time. The duration of time starts at a sixth time and ends at a seventh time. The seventh time is a time when the first signal becomes smaller than the second threshold in magnitude.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

5. DETAILED DESCRIPTION OF THE INVENTION

Certain embodiments of the present invention are directed to integrated circuits. More particularly, some embodiments of the invention provide a system and method for stage-based control related to TRIAC dimmer. Merely by way of example, some embodiments of the invention have been applied to driving one or more light emitting diodes (LEDs). But it would be recognized that the invention has a much broader range of applicability.

Figure 1:
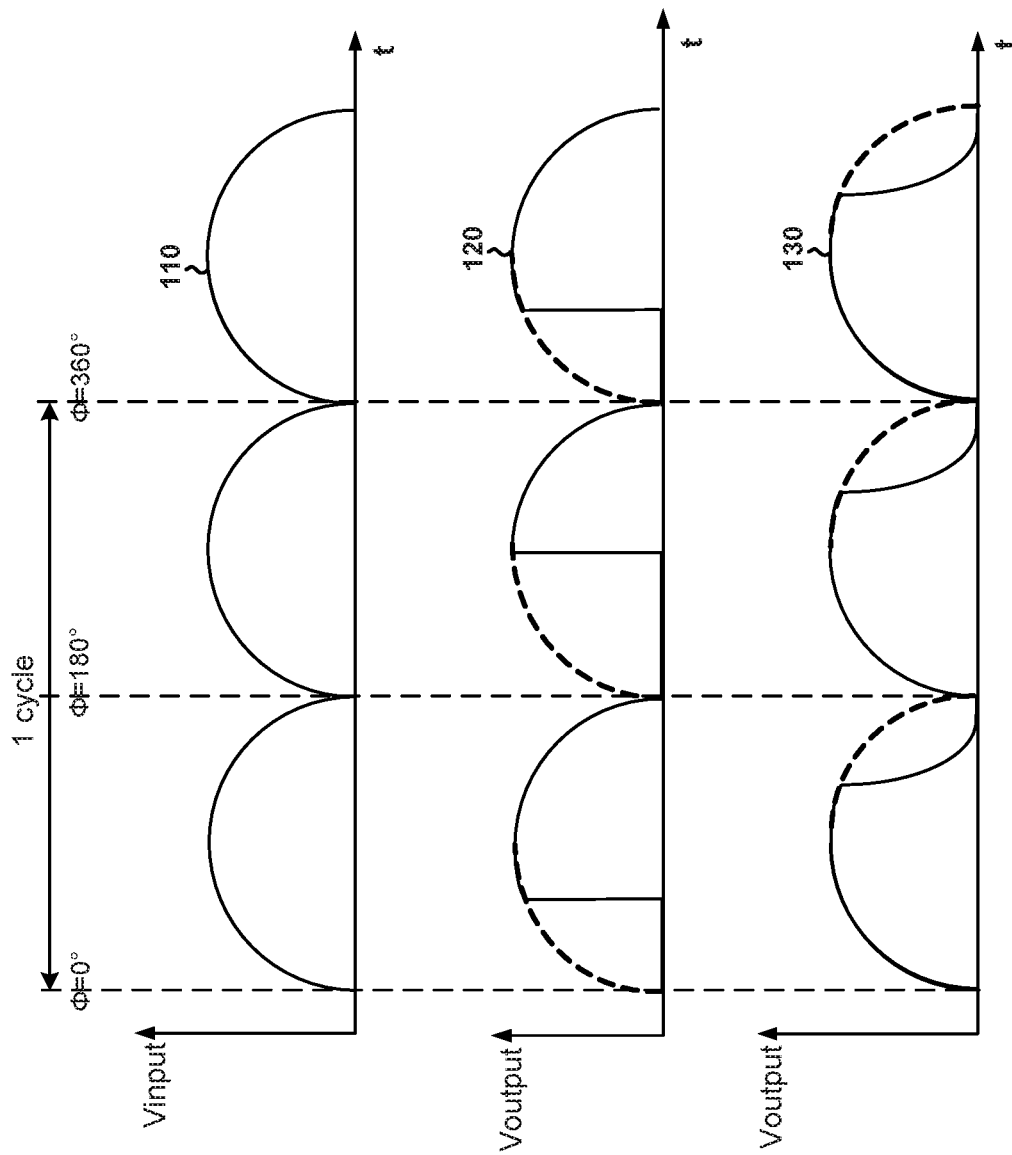
FIG. 1 shows certain conventional timing diagrams for a leading-edge TRIAC dimmer and a trailing-edge TRIAC dimmer.
Figure 2:
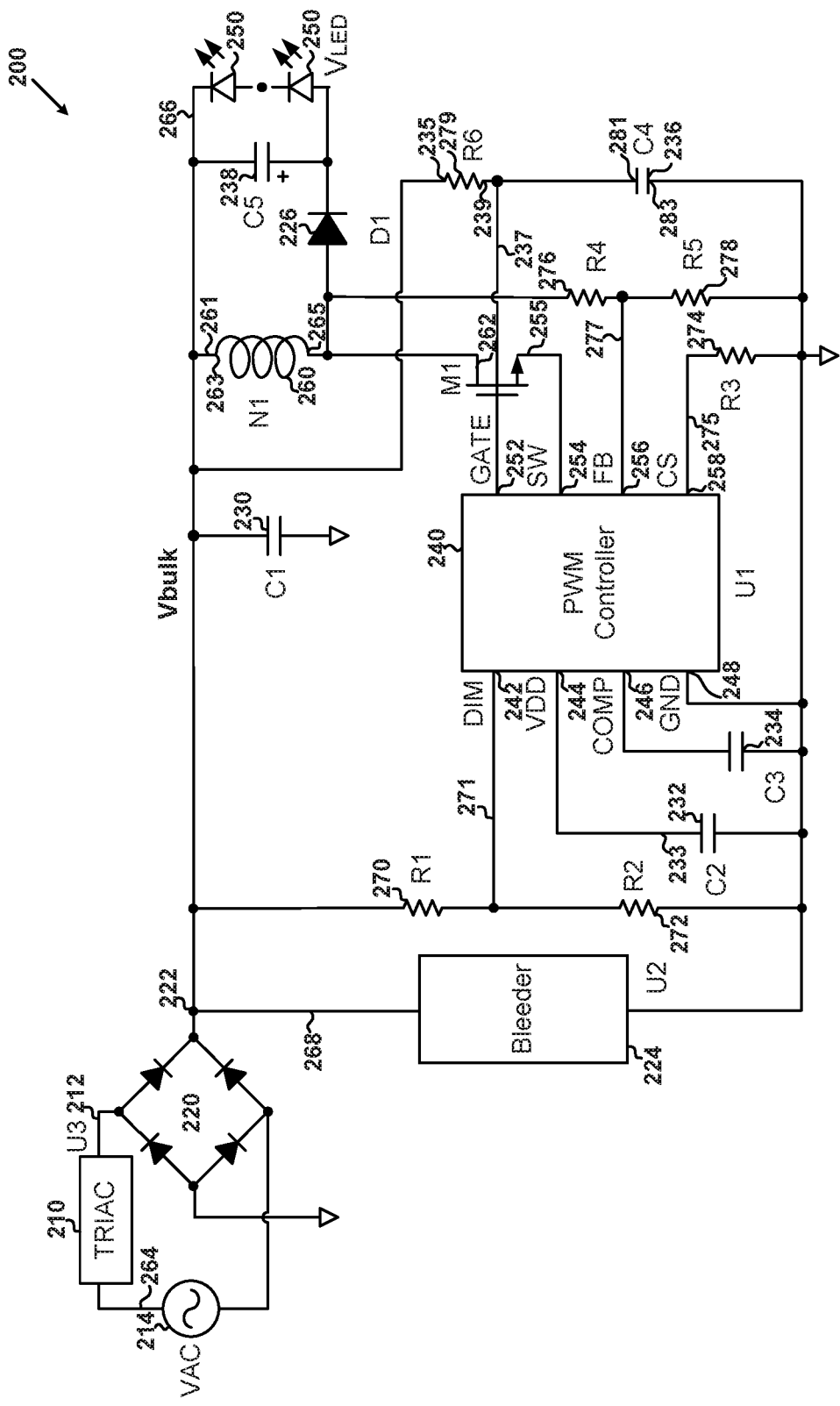
FIG. 2 is a simplified diagram of a conventional lighting system that includes a bleeder.
Figure 3:
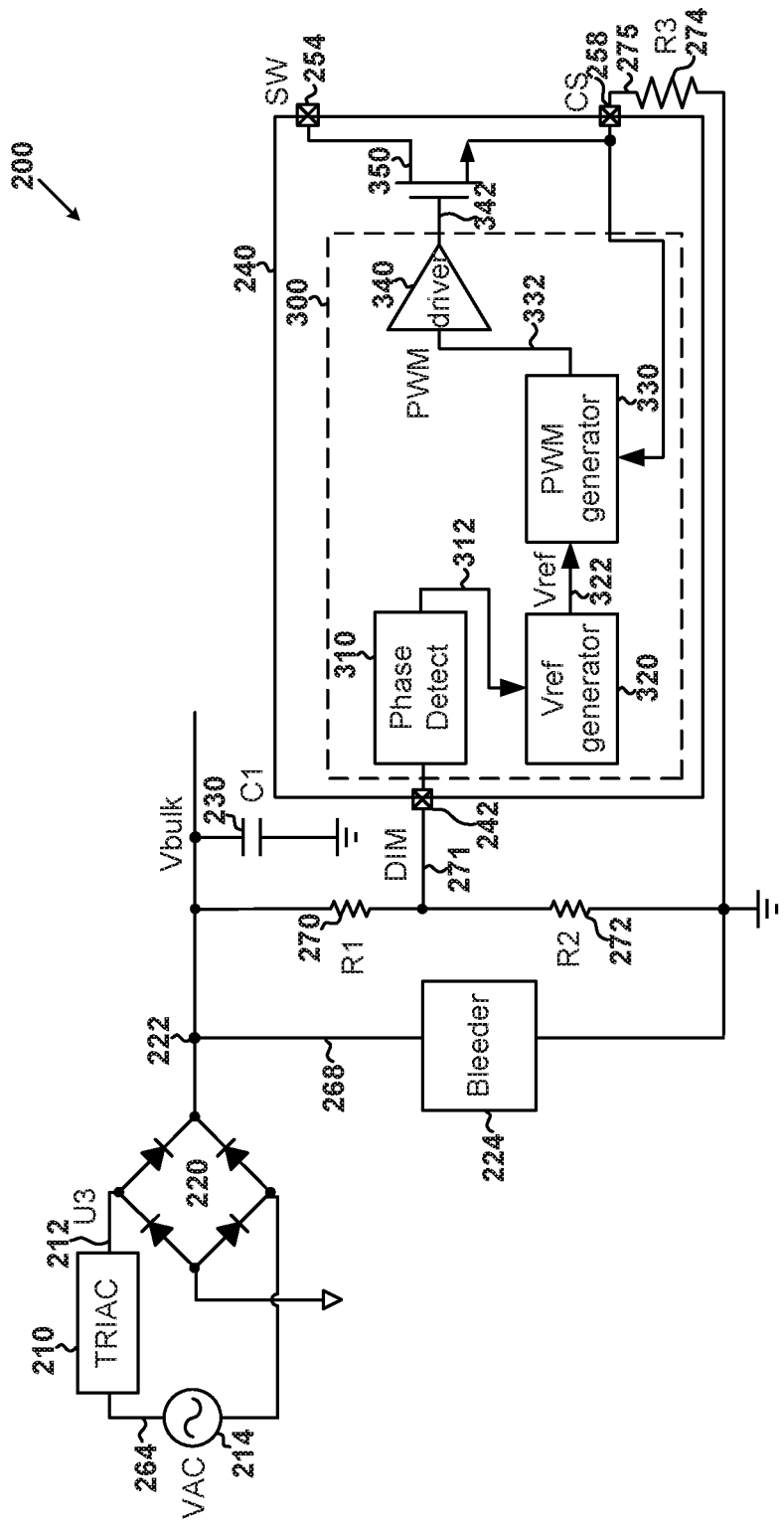
FIG. 3 is a simplified diagram showing certain conventional components of the lighting system as shown in FIG. 2.
Figure 4:
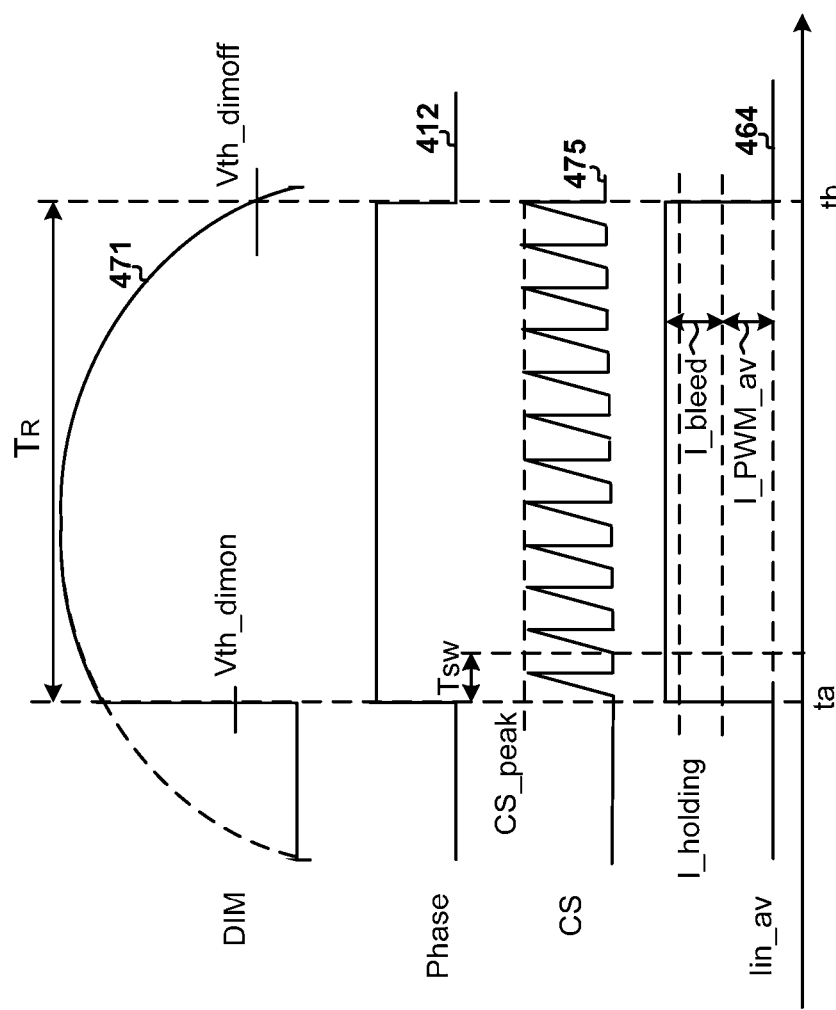
FIG. 4 shows certain conventional timing diagrams for the lighting system 200 as shown in FIGS. 2 and 3.
Figure 5:
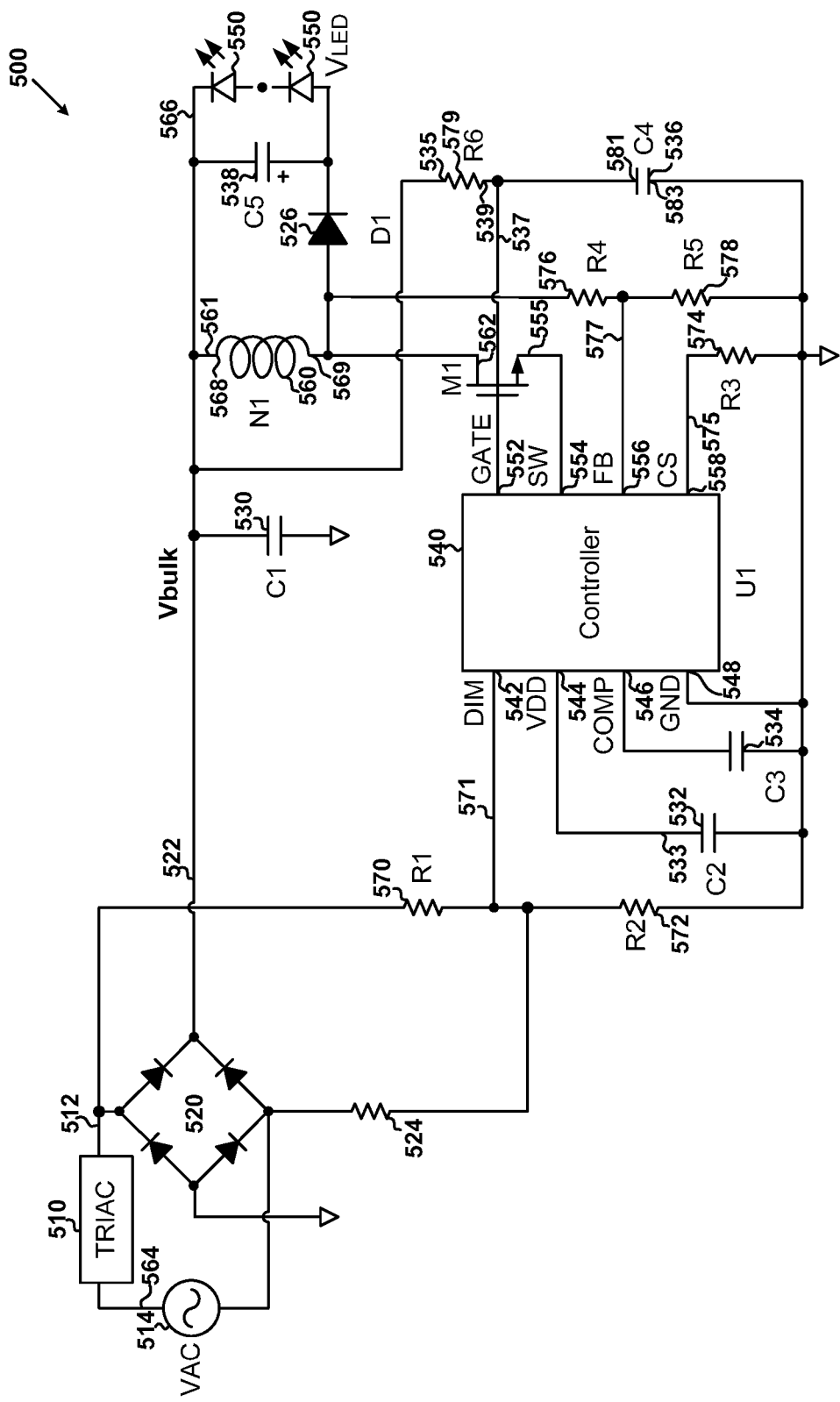
FIG. 5 is a simplified diagram of a lighting system according to an embodiment of the present invention.

FIG. 5 is a simplified diagram of a lighting system according to an embodiment of the present invention. This diagram is merely an example, which should not unduly limit the scope of the claims. One of ordinary skill in the art would recognize many variations, alternatives, and modifications. The lighting system 500 includes a TRIAC dimmer 510, a rectifier 520, a diode 526, capacitors 530, 532, 534, 536 and 538, a modulation controller 540, a winding 560, a transistor 562, resistors 524, 570, 572, 574, 576, 578 and 579, and one or more LEDs 550. For example, the modulation controller 540 includes controller terminals 542, 544, 546, 548, 552, 554, 556 and 558. In another example, the modulation controller 540 is a chip, and each of the controller terminals 542, 544, 546, 548, 552, 554, 556 and 558 is a pin. In yet another example, the modulation controller 540 is a pulse-width-modulation (PWM) controller. In yet another example, the winding 560 includes winding terminals 568 and 569.

In one embodiment, the TRIAC dimmer 510 receives an AC input voltage 514 (e.g., VAC) and generates a voltage 512. For example, the voltage 512 is received by the rectifier 520 (e.g., a full wave rectifying bridge), which generates a rectified output voltage 522. In another example, the rectified output voltage 522 is larger than or equal to zero.

In another embodiment, the resistor 579 includes resistor terminals 535 and 539, and the capacitor 536 includes capacitor terminals 581 and 583. For example, the resistor terminal 535 receives the rectified output voltage 522. In another example, the resistor terminal 539 is connected to the capacitor terminal 581, the controller terminal 552, and a gate terminal of the transistor 562. In yet another example, the gate terminal of the transistor 562 receives a gate voltage 537 from the resistor terminal 539, the capacitor terminal 581, and the controller terminal 552. In yet another example, the capacitor terminal 583 receives a ground voltage.

In yet another embodiment, the rectified output voltage 522 is used to charge the capacitor 536 through the resistor 579 to raise the gate voltage 537. For example, if the result of the gate voltage 537 minus a source voltage at a source terminal of the transistor 562 reaches or exceeds a transistor threshold voltage, the transistor 562 is turned on.

According to one embodiment, when the transistor 562 is turned on, through the transistor 562 and the controller terminal 554, a current flows into the modulation controller 540 and uses an internal path to charge the capacitor 532. For example, in response, the capacitor 532 generates a capacitor voltage 533, which is received by the controller terminal 544. In another example, if the capacitor voltage 533 reaches or exceeds an undervoltage-lockout threshold of the modulation controller 540, the modulation controller 540 starts up.

According to another embodiment, after the modulation controller 540 has started up, a pulse-width-modulation (PWM) signal 555 is generated. For example, the PWM signal 555 has a signal frequency and a duty cycle. In another example, the PWM signal 555 is received by the source terminal of the transistor 562 through the controller terminal 554. In yet another example, in response, the transistor 562 is turned on and off, in order to make an output current 566 constant and provide the output current 566 to the one or more LEDs 550, by working with at least the capacitor 538.

In one embodiment, as shown in FIG. 5, a drain voltage at a drain terminal of the transistor 562 is received by a voltage divider that includes the resistors 576 and 578. For example, the drain terminal of the transistor 562 is connected to the winding terminal 569 of the winding 560, and the winding terminal 568 of the winding 560 is connected to the capacitor 530 and the resistor 579. In another example, in response to receiving the drain voltage, the voltage divider generates a voltage 577, which is received by the controller terminal 556. In yet another example, the modulation controller 540 uses the voltage 577 to detect the end of a demagnetization process of the winding 560. In yet another example, the detection of the end of the demagnetization process is used to control an internal error amplifier of the modulation controller 540, and through the controller terminal 546, to control charging and discharging of the capacitor 534.

In another embodiment, after the modulation controller 540 has started up, the resistor 574 is used to detect a current 561, which flows through the winding 560. For example, the winding 560 is connected to a drain terminal of the transistor 562. In another example, the current 561 flows from the winding 560 through the resistor 574, which in response generates a sensing voltage 575. In yet another example, the sensing voltage 575 is received by the controller terminal 558, and is processed by the modulation controller 540 on a cycle-by-cycle basis. In yet another example, the peak magnitude of the sensing voltage 575 is sampled, and the sampled signal is sent to an input terminal of the internal error amplifier of the modulation controller 540. In yet another example, the other input terminal of the internal error amplifier receives a reference voltage $V_{ref}$.

As shown in FIG. 5, the voltage 512 is received by the resistor 570 according to one embodiment. For example, the resistors 570, 572, and 524 together generates a voltage 571. In another example, the voltage 571 is received by the controller terminal 542. In yet another example, the modulation controller 540 processes the voltage 571 and determines phase angle of the voltage 571. According to yet another embodiment, the lighting system 500 does not include a bleeder. For example, the lighting system 500 ensures, without using any bleeder, that when the TRIAC dimmer 510 is fired on, an input current 564 that flows through the TRIAC dimmer 510 is larger than a holding current required by the TRIAC dimmer 510, in order to avoid misfire of the TRIAC dimmer 510 and also avoid flickering of the one or more LEDs 550. In another example, the lighting system 500 does not use a bleeder, so heat generation is not increased and energy efficiency of the lighting system 500 is not reduced.

Figure 6A:
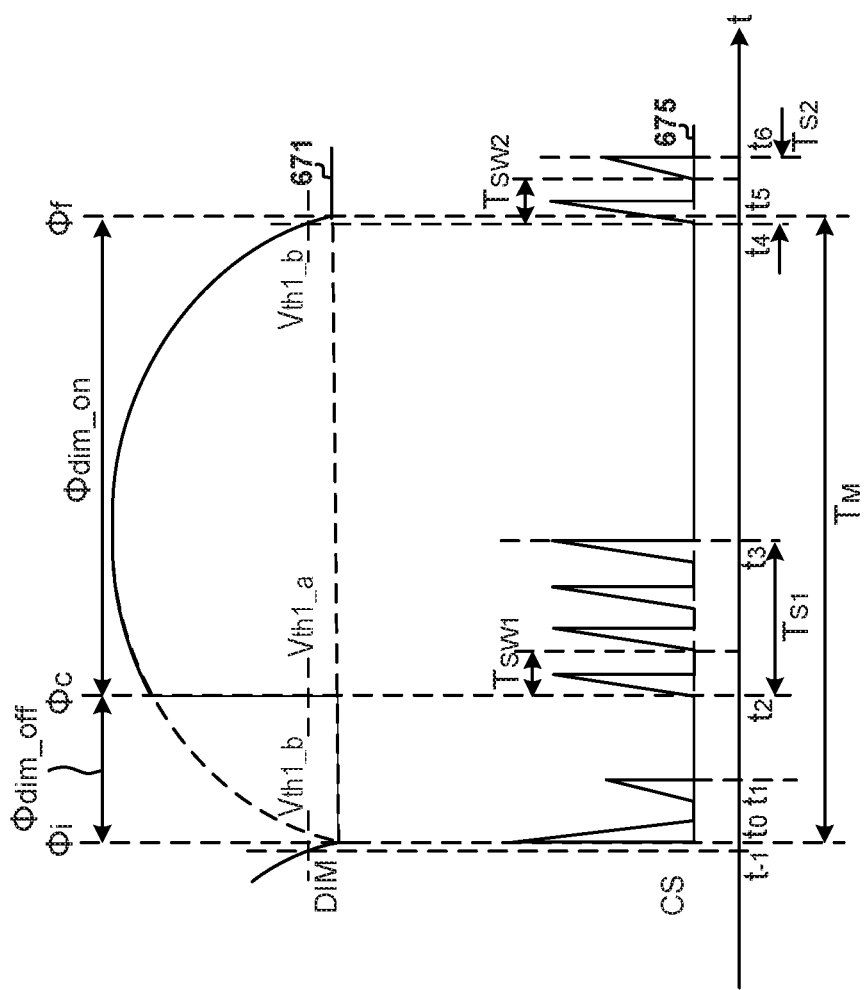
FIG. 6A shows certain timing diagrams for the lighting system as shown in FIG. 5 if the TRIAC dimmer is a leading-edge TRIAC dimmer according to one embodiment of the present invention.
Figure 6B:
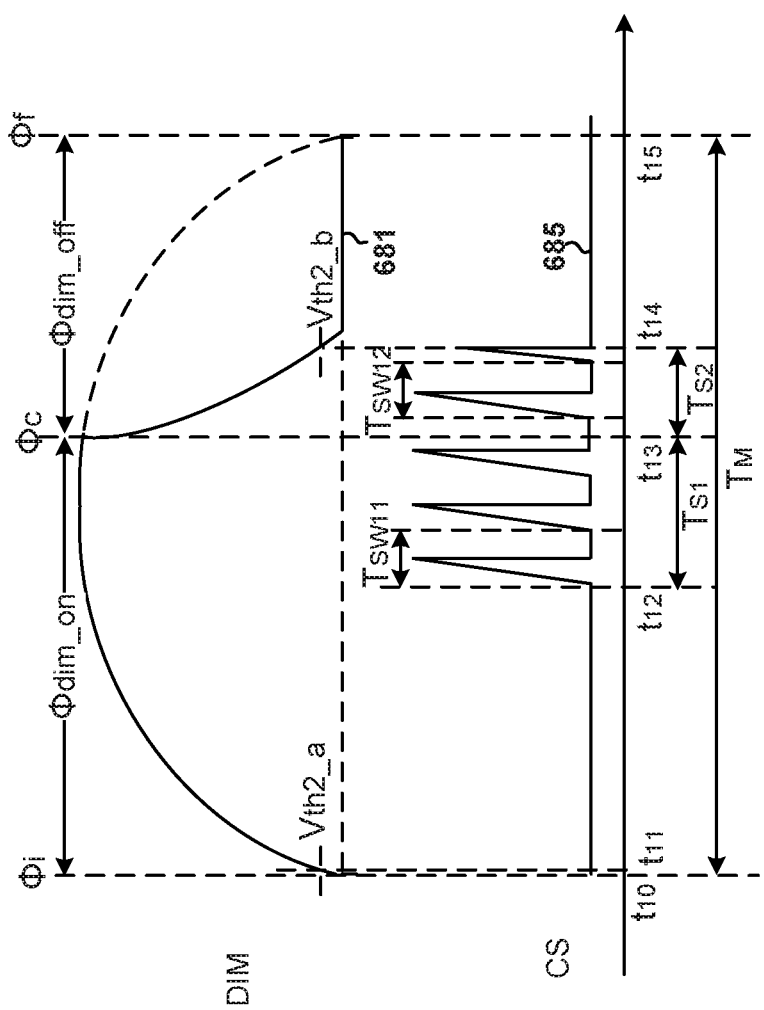
FIG. 6B shows certain timing diagrams for the lighting system as shown in FIG. 5 if the TRIAC dimmer is a trailing-edge TRIAC dimmer according to another embodiment of the present invention.

In one embodiment, the lighting system 500 operates according to FIG. 6A and/or FIG. 6B. For example, the lighting system 500 operates according to FIG. 6A. In another example, the lighting system 500 operates according to FIG. 6B. In yet another example, the lighting system 500 operates according to FIGS. 6A and 6B. In another embodiment, the lighting system 500 operates according to FIG. 7. In yet another embodiment, the lighting system 500 operates according to FIGS. 6A, 6B, and 7.

As discussed above and further emphasized here, FIG. 5 is merely an example, which should not unduly limit the scope of the claims. One of ordinary skill in the art would recognize many variations, alternatives, and modifications. For example, the lighting system 500 does not include the TRIAC dimmer 510. In another example, the TRIAC dimmer 510 is removed from the lighting system 500, and the AC input voltage 514 (e.g., VAC) is directly received by the rectifier 520.

FIG. 6A shows certain timing diagrams for the lighting system 500 as shown in FIG. 5 if the TRIAC dimmer 510 is a leading-edge TRIAC dimmer according to one embodiment of the present invention. These diagrams are merely examples, which should not unduly limit the scope of the claims. One of ordinary skill in the art would recognize many variations, alternatives, and modifications. The waveform 671 represents the voltage 571 as a function of time, and the waveform 675 represents the sensing voltage 575 as a function of time.

In one embodiment, each cycle of the voltage 571 has a phase angel (e.g., $\phi$) that changes from $\phi_i$ to $\phi_f$. For example, $\phi_i$ is equal to 0°, and $\phi_f$ is equal to 180°. In another example, $\phi_i$ is equal to 180°, and $\phi_f$ is equal to 360°. In yet another example, the voltage 571 is larger than or equal to zero.

In another embodiment, the phase angel $\phi_i$ corresponds to time $t_0$, the phase angel $\phi_c$ corresponds to time $t_2$, and the phase angel $\phi_f$ corresponds to time $t_5$. For example, a time duration $T_M$ that starts from time to and ends at time $t_5$ represents one period of the voltage 571. In another example, a time duration that starts from time $t_0$ and ends at time $t_2$ corresponds to $\phi_{dim\_off}$. In yet another example, a time duration that starts from time $t_2$ and ends at time $t_5$ corresponds to $\phi_{dim\_on}$.

In yet another embodiment, the TRIAC dimmer 510 is a leading-edge TRIAC dimmer, which clips part of the waveform that corresponds to the phase angel from $\phi_i$ to $\phi_c$. For example, $\phi_c$ is larger than or equal to $\phi_i$ and is smaller than or equal to $\phi_f$. In another example, $\phi_c$ minus $\phi_i$ is equal to $\phi_{dim\_off}$, which corresponds to a time duration when the TRIAC dimmer 510 is not fired on.

In yet another embodiment, the unclipped part of the waveform corresponds to the phase angel from $\phi_c$ to $\phi_f$. For example, $\phi_f$ minus $\phi_c$ is equal to $\phi_{dim\_on}$, which corresponds to a time duration when the TRIAC dimmer 510 is fired on. In another example, $\phi_{dim\_on}$ represents a dimming-control phase angle. In yet another example, the sum of $\phi_{dim\_off}$ and $\phi_{dim\_on}$ is equal to 180°.

In yet another example, $\phi_{dim\_off}$ is larger than or equal to 0° and smaller than or equal to 180°, and $\phi_{dim\_on}$ is larger than or equal to 0° and smaller than or equal to 180°. In yet another example, if $\phi_{dim\_off}$ is equal to 180° and $\phi_{dim\_on}$ is equal to 0°, the TRIAC dimmer 510 clips the entire waveform that corresponds to the phase angel starting at 0° and ending at 180° or starting at 180° and ending at 360°. In yet another example, if $\phi_{dim\_off}$ is equal to 0° and $\phi_{dim\_on}$ is equal to 180°, the TRIAC dimmer 510 does not clip any part of the waveform that corresponds to the phase angel starting at 0° and ending at 180° or starting at 180° and ending at 360°.

According to one embodiment, if the dimming-control phase angle $\phi_{dim\_on}$ becomes larger, the one or more LEDs 550 becomes brighter, and if the dimming-control phase angle $\phi_{dim\_on}$ becomes smaller, the one or more LEDs 550 becomes dimmer. According to another embodiment, as shown by the waveform 675, for a particular dimming-control phase angle $\phi_{dim\_on}$, the sensing voltage 575 ramps up and down during a stage-1 time duration $T_{s1}$ and during a stage-2 time duration $T_{s2}$. For example, during the stage-1 time duration $T_{s1}$, within a switching period (e.g., $T_{sw1}$), the sensing voltage 575 ramps up, ramps down, and then remains constant (e.g., remains equal to zero) until the end of the switching period (e.g., until the end of $T_{sw1}$). In another example, during the stage-2 time duration $T_{s2}$, within a switching period (e.g., $T_{sw2}$), the sensing voltage 575 ramps up, ramps down, and then remains constant (e.g., remains equal to zero) until the end of the switching period (e.g., until the end of $T_{sw2}$). In yet another example, the switching period $T_{sw1}$ and the switching period $T_{sw2}$ are equal in time duration.

According to yet another embodiment, corresponding to one period of the voltage 571 (e.g., from time $t_0$ to time $t_5$), the stage-1 time duration $T_{s1}$ starts at time $t_2$ and ends at time $t_3$, and the stage-2 time duration $T_{s2}$ starts at time $t_4$ and ends at time $t_6$. For example, corresponding to a previous period of the voltage 571 (e.g., a previous period ending at time $t_0$), the stage-2 time duration $T_{s2}$ ends at time $t_1$. In another example, the time duration from time $t_1$ to time $t_2$ is longer than the switching period $T_{sw1}$ and is also longer than the switching period $T_{sw2}$, and during the entire time duration from time $t_1$ to time $t_2$, the sensing voltage 575 remains constant (e.g., remains equal to zero). In yet another example, the time duration from time $t_3$ to time $t_4$ is longer than the switching period $T_{sw1}$ and is also longer than the switching period $T_{sw2}$, and during the entire time duration from time $t_3$ to time $t_4$, the sensing voltage 575 remains constant (e.g., remains equal to zero).

According to yet another embodiment, time $t_2$ represents the time when the voltage 571 becomes larger than a threshold voltage $V_{th1\_a}$, and time $t_4$ represents the time when the voltage 571 becomes smaller than a threshold voltage $V_{th1\_b}$. For example, the threshold voltage $V_{th1\_a}$ and the threshold voltage $V_{th1\_b}$ are equal. In another example, the threshold voltage $V_{th1\_a}$ and the threshold voltage $V_{th1\_b}$ are not equal. According to yet another embodiment, time $t_0$ represents the beginning time of one period of the voltage 571 that ends at time $t_5$, and time to also represents the ending time of a previous period of the voltage 571. For example, during the previous period of the voltage 571, time $t_{-1}$ represents the time when the voltage 571 becomes smaller than the threshold voltage $V_{th1\_b}$.

As discussed above and further emphasized here, FIG. 6A is merely an example, which should not unduly limit the scope of the claims. One of ordinary skill in the art would recognize many variations, alternatives, and modifications. For example, time $t_5$ is approximately equal to time $t_4$, and the phase angel $\phi_f$ approximately corresponds to time $t_4$. In another example, the time duration $T_M$ starts at time $t_0$ and ends approximately at time $t_4$, and the time duration $T_M$ represents one period of the voltage 571. In yet another example, a time duration that starts at time $t_2$ and ends at time $t_4$ approximately corresponds to $\phi_{dim\_on}$.

FIG. 6B shows certain timing diagrams for the lighting system 500 as shown in FIG. 5 if the TRIAC dimmer 510 is a trailing-edge TRIAC dimmer according to another embodiment of the present invention. These diagrams are merely examples, which should not unduly limit the scope of the claims. One of ordinary skill in the art would recognize many variations, alternatives, and modifications. The waveform 681 represents the voltage 571 as a function of time, and the waveform 685 represents the sensing voltage 575 as a function of time.

In one embodiment, each cycle of the voltage 571 has a phase angel (e.g., $\phi$) that changes from $\phi_i$ to $\phi_f$. For example, $\phi_i$ is equal to 0°, and $\phi_f$ is equal to 180°. In another example, $\phi_i$ is equal to 180°, and $\phi_f$ is equal to 360°. In yet another example, the voltage 571 is larger than or equal to zero.

In another embodiment, the phase angel $\phi_i$ corresponds to time $t_{10}$, the phase angel $\phi_c$ corresponds to time $t_{13}$, and the phase angel $\phi_f$ corresponds to time $t_{15}$. For example, a time duration $T_M$ that starts from time $t_{10}$ and ends at time $t_{15}$ represents one period of the voltage 571. In another example, a time duration that starts from time $t_{10}$ and ends at time $t_{13}$ corresponds to $\phi_{dim\_on}$. In yet another example, a time duration that starts from time $t_{13}$ and ends at time $t_{15}$ corresponds to $\phi_{dim\_off}$.

In yet another embodiment, the TRIAC dimmer 510 is a trailing-edge TRIAC dimmer, which clips part of the waveform that corresponds to the phase angel from $\phi_c$ to $\phi_f$. For example, $\phi_c$ is larger than or equal to $\phi_i$ and is smaller than or equal to $\phi_f$. In another example, $\phi_f$ minus $\phi_c$ is equal to $\phi_{dim\_off}$, which corresponds to a time duration when the TRIAC dimmer 510 is not fired on.

In yet another embodiment, the unclipped part of the waveform corresponds to the phase angel from $\phi_i$ to $\phi_c$. For example, $\phi_c$ minus $\phi_i$ is equal to $\phi_{dim\_on}$, which corresponds to a time duration when the TRIAC dimmer 510 is fired on.

In another example, $\phi_{dim\_on}$ represents a dimming-control phase angle. In yet another example, the sum of $\phi_{dim\_off}$ and $\phi_{dim\_on}$ is equal to 180°.

In yet another example, $\phi_{dim\_off}$ is larger than or equal to 0° and smaller than or equal to 180°, and $\phi_{dim\_on}$ is larger than or equal to 0° and smaller than or equal to 180°. In yet another example, if $\phi_{dim\_off}$ is equal to 180° and $\phi_{dim\_on}$ is equal to 0°, the TRIAC dimmer 510 clips the entire waveform that corresponds to the phase angel starting at 0° and ending at 180° or starting at 180° and ending at 360°. In yet another example, if $\phi_{dim\_off}$ is equal to 0° and $\phi_{dim}$ is equal to 180°, the TRIAC dimmer 510 does not clip any part of the waveform that corresponds to the phase angel starting at 0° and ending at 180° or starting at 180° and ending at 360°.

According to one embodiment, if the dimming-control phase angle $\phi_{dim\_on}$ becomes larger, the one or more LEDs 550 becomes brighter, and if the dimming-control phase angle $\phi_{dim\_on}$ becomes smaller, the one or more LEDs 550 becomes dimmer. According to another embodiment, as shown by the waveform 685, for a particular dimming-control phase angle $\phi_{dim\_on}$, the sensing voltage 575 ramps up and down during a stage-1 time duration $T_{s1}$ and during a stage-2 time duration $T_{s2}$. For example, the stage-1 time duration $T_{s1}$ starts at time $t_{12}$ and ends at time $t_{13}$. In another example, the stage-2 time duration $T_{s2}$ starts at time $t_{13}$ and ends at time $t_{14}$. In yet another example, the combination of the stage-1 time duration $T_{s1}$ and the stage-2 time duration $T_{s2}$ starts at time $t_{12}$ and ends at time $t_{14}$.

According to yet another embodiment, during the time duration from time $t_{12}$ to time $t_{14}$, the sensing voltage 575 ramps up and down. For example, during the combination of the stage-1 time duration $T_{s1}$ and the stage-2 time duration $T_{s2}$, within a switching period (e.g., $T_{sw11}$), the sensing voltage 575 ramps up, ramps down, and then remains constant (e.g., remains equal to zero) until the end of the switching period (e.g., $T_{sw11}$). In another example, during the combination of the stage-1 time duration $T_{s1}$ and the stage-2 time duration $T_{s2}$, within a switching period (e.g., $T_{sw12}$), the sensing voltage 575 ramps up, ramps down, and then remains constant (e.g., remains equal to zero) until the end of the switching period (e.g., $T_{sw12}$).

According to yet another embodiment, time $t_{11}$ represents the time when the voltage 571 becomes larger than a threshold voltage $V_{th2\_a}$, and time $t_{14}$ represents the time when the voltage 571 becomes smaller than a threshold voltage $V_{th2\_b}$. For example, the threshold voltage $V_{th2\_a}$ and the threshold voltage $V_{th2\_b}$ are equal. In another example, the threshold voltage $V_{th2\_a}$ and the threshold voltage $V_{th2\_b}$ are not equal. In yet another example, the time duration from time $t_{11}$ to time $t_{12}$ is longer than the switching period $T_{sw11}$ and is also longer than the switching period $T_{sw12}$, and during the entire time duration from time $t_{11}$ to time $t_{12}$, the sensing voltage 575 remains constant (e.g., remains equal to zero). In yet another example, the time duration from time $t_{14}$ to time $t_{15}$ is longer than the switching period $T_{sw11}$ and is also longer than the switching period $T_{sw12}$, and during the entire time duration from time $t_{14}$ to time $t_{15}$, the sensing voltage 575 remains constant (e.g., remains equal to zero).

As discussed above and further emphasized here, FIG. 6B is merely an example, which should not unduly limit the scope of the claims. One of ordinary skill in the art would recognize many variations, alternatives, and modifications. For example, time to is approximately equal to time $t_{11}$, and the phase angel $\phi_i$ approximately corresponds to time $t_{11}$. In another example, the time duration $T_M$ that starts at time $t_{11}$ and ends at time $t_{15}$ approximately represents one period of the voltage 571. In yet another example, a time duration that starts at time $t_{11}$ and ends at time $t_{13}$ approximately corresponds to $\phi_{dim\_on}$.

Figure 7:
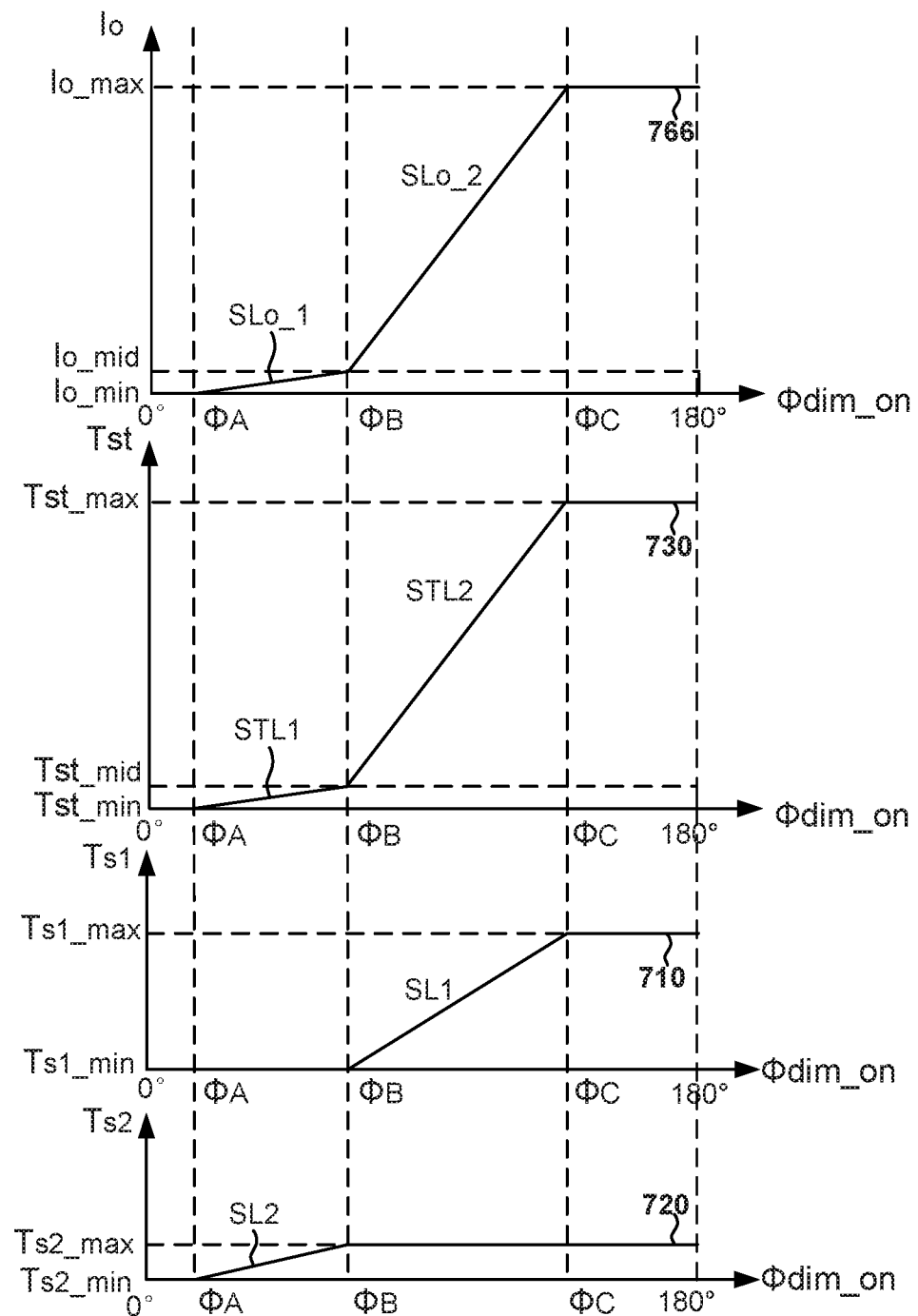
FIG. 7 shows certain dimming-control phase angle diagrams for the lighting system as shown in FIG. 5 according to certain embodiments of the present invention.

FIG. 7 shows certain dimming-control phase angle diagrams for the lighting system 500 as shown in FIG. 5 according to certain embodiments of the present invention. These diagrams are merely examples, which should not unduly limit the scope of the claims. One of ordinary skill in the art would recognize many variations, alternatives, and modifications. The waveform 766 represents the output current 566 as a function of dimming-control phase angle $\phi_{dim\_on}$, the waveform 710 represents the stage-1 time duration $T_{s1}$ as a function of dimming-control phase angle $\phi_{dim\_on}$, the waveform 720 represents the stage-2 time duration $T_{s2}$ as a function of dimming-control phase angle $\phi_{dim\_on}$, and the waveform 730 represents the two-stage total time duration $T_{st}$ as a function of dimming-control phase angle $\phi_{dim\_on}$.

In one embodiment, as shown by the waveform 710, the stage-1 time duration $T_{s1}$ remains equal to $T_{s1\_min}$ if the dimming-control phase angle $\phi_{dim\_on}$ increases from 0° to $\phi_A$ and from $\phi_A$ to $\phi_B$, the stage-1 time duration $T_{s1}$ increases (e.g., increases linearly at a constant slope $SL_1$) from $T_{s1\_min}$ to $T_{s1\_max}$ if the dimming-control phase angle $\phi_{dim\_on}$ increases from $\phi_B$ to $\phi_C$, and the stage-1 time duration $T_{s1}$ remains equal to $T_{s1\_max}$ if the dimming-control phase angle $\phi_{dim\_on}$ increases from $\phi_C$ to 180°. For example, $T_{s1\_min}$ is equal to zero. In another example, $T_{s1\_min}$ is larger than zero. In yet another example, $T_{s1\_max}$ is larger than $T_{s1\_min}$ and is also larger than zero.

In another embodiment, as shown by the waveform 720, the stage-2 time duration $T_{s2}$ remains equal to $T_{s2\_min}$ if the dimming-control phase angle $\phi_{dim\_on}$ increases from 0° to $\phi_A$, the stage-2 time duration $T_{s2}$ increases (e.g., increases linearly at a constant slope $SL_2$) from $T_{s2\_min}$ to $T_{s2\_max}$ if the dimming-control phase angle $\phi_{dim\_on}$ increases from $\phi_A$ to $\phi_B$, and the stage-2 time duration $T_{s2}$ remains equal to $T_{s2\_max}$ if the dimming-control phase angle $\phi_{dim\_on}$ increases from $\phi_B$ to $\phi_C$ and from $\phi_C$ to 180°. For example, the slope $SL_1$ and the slope $SL_2$ are different. In another example, the slope $SL_1$ and the slope $SL_2$ are equal. In yet another example, $\phi_B$ is smaller than 90°. In yet another example, $T_{s2\_min}$ is equal to zero. In yet another example, $T_{s2\_min}$ is larger than zero. In yet another example, $T_{s2\_max}$ is larger than $T_{s2\_min}$ and is also larger than zero.

In yet another embodiment, as shown by the waveform 730, the two-stage total time duration $T_{st}$ is equal to the sum of the stage-1 time duration $T_{s1}$ and the stage-2 time duration $T_{s2}$. For example, the two-stage total time duration $T_{st}$ remains equal to $T_{st\_min}$ if the dimming-control phase angle $\phi_{dim\_on}$ increases from 0° to $\phi A$, the two-stage total time duration $T_{st}$ increases (e.g., increases linearly at a slope $STL_1$) from $T_{st\_min}$ to $T_{st\_mid}$ if the dimming-control phase angle $\phi_{dim\_on}$ increases from $\phi_A$ to $\phi_B$, the two-stage total time duration $T_{st}$ increases (e.g., increases linearly at a slope $STL_2$) from $T_{st\_mid}$ to $T_{st\_max}$ if the dimming-control phase angle $\phi_{dim\_on}$ increases from $\phi_B$ to $\phi_C$, and the two-stage total time duration $T_{st}$ remains equal to $T_{st\_max}$ if the dimming-control phase angle $\phi_{dim\_on}$ increases from $\phi_C$ to 180°. For example, the slope $STL_1$ is equal to the slope $SL_2$, and the slope $STL_2$ is equal to the slope $SL_1$. In another example, the slope $STL_1$ and the slope $STL_2$ are equal. In yet another example, the slope $STL_1$ and the slope $STL_2$ are not equal. In yet another example, $T_{st\_min}$ is equal to the sum of $T_{s1\_min}$ and $T_{s2\_min}$, $T_{st\_mid}$ is equal to the sum of $T_{s1\_min}$ and $T_{s2\_max}$, and $T_{st\_max}$ is equal to the sum of $T_{s1\_max}$ and $T_{s2\_max}$. In yet another example, $T_{st\_min}$ is equal to zero. In yet another example, $T_{st\_min}$ is larger than zero. In yet another example, $T_{st\_mid}$ is larger than $T_{st\_min}$ and is also larger than zero, but is smaller than $T_{st\_max}$. In yet another example, $T_{st\_max}$ is larger than $T_{st\_min}$ and $T_{st\_mid}$, and is also larger than zero.

In yet another embodiment, as shown by the waveform 766, the output current 566 remains equal to zero if the dimming-control phase angle $\phi_{dim\text{-}on}$ increases from 0° to $\phi_A$, the output current 566 increases (e.g., increases linearly at a slope $SL_{0\_1}$) from zero to $I_{0\_mid}$ if the dimming-control phase angle $\phi_{dim\_on}$ increases from $\phi_A$ to $\phi_B$, the output current 566 increases (e.g., increases linearly at a slope $SL_{0\_2}$) from $I_{0\_mid}$ to $I_{0\_max}$ if the dimming-control phase angle $\phi_{dim\_on}$ increases from $\phi_B$ to $\phi_C$, and the output current 566 remains equal to $I_{0\_max}$ if the dimming-control phase angle $\phi_{dim\_on}$ increases from $\phi_C$ to 180°. For example, the slope $SL_{0\_1}$ and the slope $SL_{0\_2}$ are different. In another example, the slope $SL_{0\_1}$ and the slope $SL_{0\_2}$ are equal. In yet another example, $I_{0\_max}$ is equal to the magnitude of the output current 566 if the dimmer 510 is removed and the AC input voltage 514 (e.g., VAC) is directly received by the rectifier 520. In yet another example, $I_{0\_mid}$ is smaller than 10% of $I_{0\_max}$.

According to one embodiment, if the dimming-control phase angle $\phi_{dim\_on}$ increases from $\phi_A$ to $\phi_B$, the dimming control of the one or more LEDs 550 is performed by changing the stage-2 time duration $T_{s2}$, and if the dimming-control phase angle $\phi_{dim\_on}$ increases from $\phi_B$ to $\phi_C$, the dimming control of the one or more LEDs 550 is performed by changing the stage-1 time duration $T_{s1}$. For example, the slope $SL_{0\_i}$ for the output current 566 depends on the slope $SL_2$ of the stage-2 time duration $T_{s2}$. In another example, the slope $SL_{0\_2}$ for the output current 566 depends on the slope $SL_1$ of the stage-1 time duration $T_{s1}$.

According to another embodiment, magnitudes of $\phi_A$, $\phi_B$, and $\phi_C$ are adjusted, and $0° \leq \phi_A \leq \phi_B \leq \phi_C \leq 180°$ is satisfied. For example, magnitudes of $\phi_A$, $\phi_B$, and $\phi_C$ are adjusted, and $0° < \phi_A < \phi_B < \phi_C < 180°$ is satisfied. In another example, magnitudes of $\phi_A$, $\phi_B$, and $\phi_C$ are adjusted, and $0° \leq \phi_A < \phi_B < \phi_C \leq 180°$ is satisfied.

Figure 8:
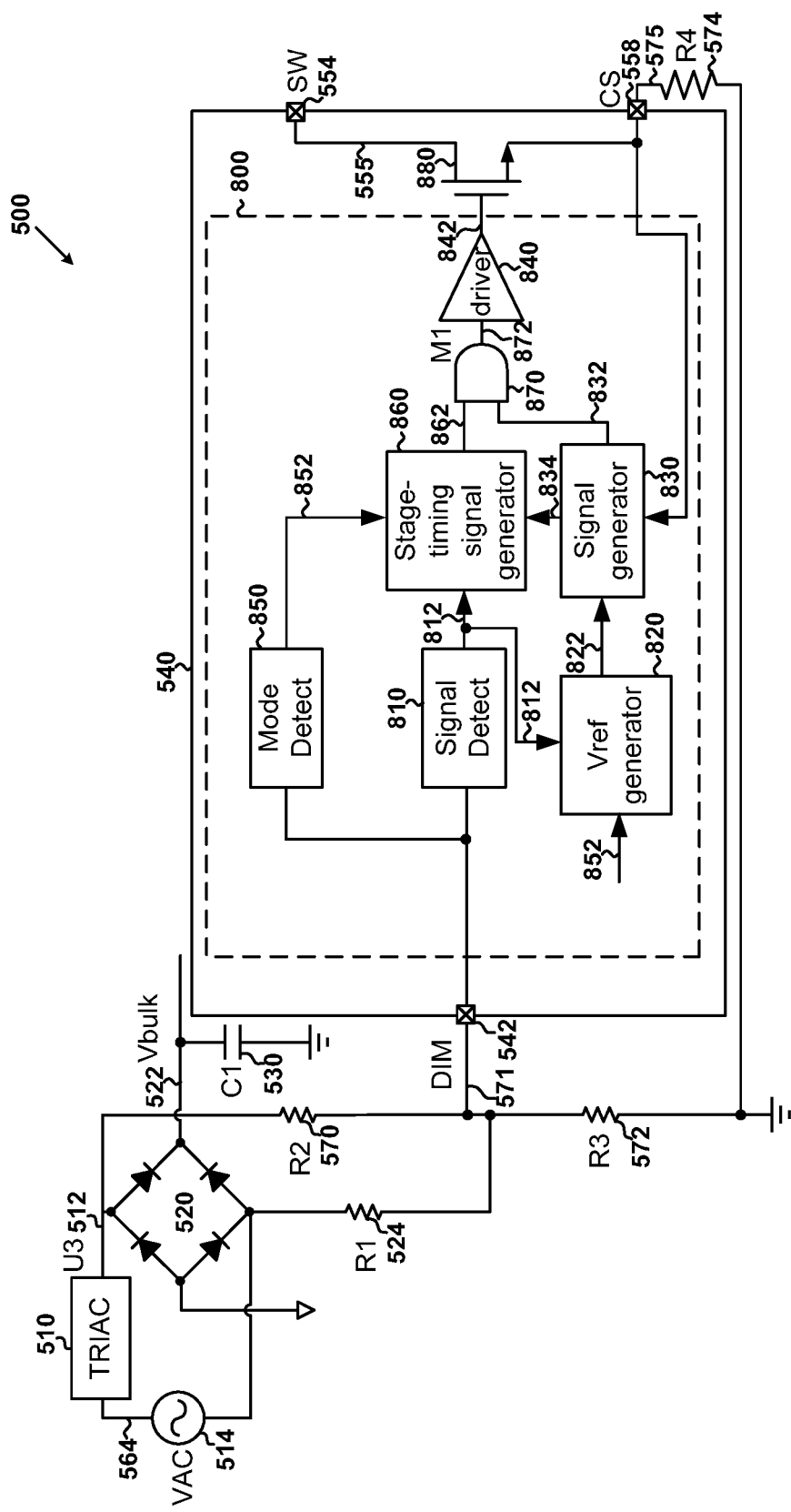
FIG. 8 is a simplified diagram showing certain components of the lighting system as shown in FIG. 5 according to one embodiment of the present invention.

FIG. 8 is a simplified diagram showing certain components of the lighting system 500 as shown in FIG. 5 according to one embodiment of the present invention. This diagram is merely an example, which should not unduly limit the scope of the claims. One of ordinary skill in the art would recognize many variations, alternatives, and modifications. The modulation controller 540 includes a dimming control component 800 and a transistor 880. For example, the dimming control component 800 includes a signal detector 810, a mode detector 850, a stage-timing signal generator 860, a reference voltage generator 820, a modulation signal generator 830, an AND gate 870, and a driver 840. For example, the modulation signal generator 830 is a pulse-width-modulation (PWM) signal generator.

As discussed above and further emphasized here, FIG. 8 is merely an example, which should not unduly limit the scope of the claims. One of ordinary skill in the art would recognize many variations, alternatives, and modifications. For example, the lighting system 500 does not include the TRIAC dimmer 510. In another example, the TRIAC dimmer 510 is removed from the lighting system 500, and the AC input voltage 514 (e.g., VAC) is directly received by the rectifier 520.

In one embodiment, the mode detector 850 receives the voltage 571 through the terminal 542, and determines, based at least in part on the voltage 571, whether or not the TRIAC dimmer 510 is detected to be included in the lighting system 500 and if the TRIAC dimmer 510 is detected to be included in the lighting system 500, whether the TRIAC dimmer 510 is a leading-edge TRIAC dimmer or a trailing-edge TRIAC dimmer. For example, the mode detector 850 generates a mode signal 852 that indicates whether or not the TRIAC dimmer 510 is detected to be included in the lighting system 500 and if the TRIAC dimmer 510 is detected to be included in the lighting system 500, whether the TRIAC dimmer 510 is a leading-edge TRIAC dimmer or a trailing-edge TRIAC dimmer. In another example, the mode signal 852 is received by the reference voltage generator 820 and the stage-timing signal generator 860.

In yet another example, the mode signal 852 includes three logic signals $852_a$, $852_b$, and $852_c$. In yet another example, if the logic signal $852_a$ is at the logic high level and the logic signals $852_b$ and $852_c$ are at the logic low level, the mode signal 852 indicates that the TRIAC dimmer 510 is not included in the lighting system 500. In yet another example, if the logic signal $852_b$ is at the logic high level and the logic signals $852_a$ and $852_c$ are at the logic low level, the mode signal 852 indicates that the TRIAC dimmer 510 is detected to be included in the lighting system 500 and the TRIAC dimmer 510 is a leading-edge TRIAC dimmer. In yet another example, if the logic signal $852_c$ is at the logic high level and the logic signals $852_a$ and $852_b$ are at the logic low level, the mode signal 852 indicates that the TRIAC dimmer 510 is detected to be included in the lighting system 500 and the TRIAC dimmer 510 is a trailing-edge TRIAC dimmer.

In another embodiment, the signal detector 810 receives the voltage 571 through the terminal 542, detects the voltage 571, and generates a signal 812. For example, the signal 812 indicates approximately the magnitude of the dimming-control phase angle $\phi_{dim\_on}$ of the voltage 571 (e.g., as shown in FIG. 6A, FIG. 6B, and/or FIG. 7).

In yet another embodiment, the signal detector 810 generates the signal 812 based at least in part on the voltage 571. For example, if the voltage 571 becomes larger than a threshold voltage $V_{th\_aa}$, the signal 812 changes from a logic low level to a logic high level. In another example, if the voltage 571 becomes smaller than a threshold voltage $V_{th\_bb}$, the signal 812 changes from the logic high level to the logic low level. In yet another example, the threshold voltage $V_{th\_aa}$ and the threshold voltage $V_{th\_bb}$ are equal. In yet another example, the threshold voltage $V_{th\_aa}$ and the threshold voltage $V_{th\_bb}$ are not equal.

According to one embodiment, as shown in FIG. 6A, the signal 812 changes from the logic high level to the logic low level at time $t_{-1}$, remains at the logic low level from time $t_{-1}$ to time $t_2$, changes from the logic low level to the logic high level at time $t_2$, remains at the logic high level from time $t_2$ to time $t_4$, changes from the logic high level to the logic low level at time $t_4$, and remains at the logic low level from time $t_4$ to time $t_5$. For example, the threshold voltage $V_{th\_aa}$ is the threshold voltage $V_{th1\_a}$. In another example, the threshold voltage $V_{th\_bb}$ is the threshold voltage $V_{th1\_b}$.

According to another embodiment, as shown in FIG. 6B, the signal 812 remains at the logic low level from time $t_{10}$ to time $t_{11}$, changes from the logic low level to the logic high level at time $t_{11}$, remains at the logic high level from time $t_{11}$ to time $t_{14}$, changes from the logic high level to the logic low level at time $t_{14}$, and remains at the logic low level from time $t_{14}$ to time $t_{15}$. For example, the threshold voltage $V_{th\_aa}$ is the threshold voltage $V_{th2\_a}$. In another example, the threshold voltage $V_{th\_bb}$ is the threshold voltage $V_{th2\_b}$.

According to some embodiments, the reference voltage generator 820 receives the mode signal 852 and the signal 812, and generates a reference voltage 822 (e.g., $V_{ref}$). In one embodiment, if the mode signal 852 indicates that the TRIAC dimmer 510 is not included in the lighting system 500, the reference voltage generator 820 generates the reference voltage 822 (e.g., $V_{ref}$) that is a predetermined constant, regardless of the magnitude of the dimming-control phase angle $\phi_{dim\_on}$.

In another embodiment, if the mode signal 852 indicates that the TRIAC dimmer 510 is detected to be included in the lighting system 500 and the TRIAC dimmer 510 is a leading-edge TRIAC dimmer, the reference voltage generator 820 generates the reference voltage 822 (e.g., $V_{ref}$). For example, the reference voltage 822 (e.g., $V_{ref}$) is a predetermined constant, regardless of the magnitude of the dimming-control phase angle $\phi_{dim\_on}$. In another example, the reference voltage 822 (e.g., $V_{ref}$) changes with the magnitude of the dimming-control phase angle $\phi_{dim\_on}$. In yet another example, the reference voltage 822 (e.g., $V_{ref}$) increases proportionally with the increasing magnitude of the dimming-control phase angle $\phi_{dim\_on}$.

In yet another embodiment, if the mode signal 852 indicates that the TRIAC dimmer 510 is detected to be included in the lighting system 500 and the TRIAC dimmer 510 is a trailing-edge TRIAC dimmer, the reference voltage generator 820 generates the reference voltage 822 (e.g., $V_{ref}$). For example, the reference voltage 822 (e.g., $V_{ref}$) is a predetermined constant, regardless of the magnitude of the dimming-control phase angle $\phi_{dim\_on}$. In another example, the reference voltage 822 (e.g., $V_{ref}$) changes with the magnitude of the dimming-control phase angle $\phi_{dim\_on}$. In yet another example, the reference voltage 822 (e.g., $V_{ref}$) increases proportionally with the increasing magnitude of the dimming-control phase angle $\phi_{dim\_on}$.

In yet another embodiment, the reference voltage 822 (e.g., $V_{ref}$) when the mode signal 852 indicates that the TRIAC dimmer 510 is not included in the lighting system 500 is smaller than the reference voltage 822 (e.g., $V_{ref}$) when the mode signal 852 indicates that the TRIAC dimmer 510 is detected to be included in the lighting system 500.

According to certain embodiments, the reference voltage 822 (e.g., $V_{ref}$) is received by the modulation signal generator 830, which also receives the sensing voltage 575 through the terminal 558. For example, the sensing voltage 575 represents the magnitude of the current 561, which flows through the winding 560 and the resistor 574.

In one embodiment, the modulation signal generator 830 processes the reference voltage 822 (e.g., $V_{ref}$) and the sensing voltage 575 and generates a modulation signal 832. For example, the modulation signal generator 830 is a pulse-width-modulation (PWM) signal generator, and the modulation signal 832 is a pulse-width-modulation (PWM) signal. In another example, within each switching cycle, the modulation signal generator 830 determines an integral of the reference voltage 822 (e.g., $V_{ref}$) over time, converts the integral to an intermediate voltage that is proportional to the integral, and determines whether the sensing voltage 575 reaches or exceeds the intermediate voltage. In yet another example, within each switching cycle, if the sensing voltage 575 reaches or exceeds the intermediate voltage, the modulation signal generator 830 changes the modulation signal 832 from a logic high level to a logic low level to cause the end of the pulse width for the switching cycle if the pulse width is not larger than the maximum pulse width predetermined by the modulation controller 540. In yet another example, if the rectified output voltage 522 is large, within each switching cycle, the sensing voltage 575 reaches or exceeds the intermediate voltage fast enough so that the pulse width ends before the pulse width becomes larger than a maximum pulse width predetermined by the modulation controller 540. In yet another example, if the rectified output voltage 522 is small (e.g., if the capacitor 530 has been completely discharged), within each switching cycle, the sensing voltage 575 cannot reach or exceed the intermediate voltage fast enough, and the pulse width of the modulation signal 832 for the switching cycle is set equal to the maximum pulse width predetermined by the modulation controller 540. In yet another example, the modulation signal 832 is received by the AND gate 870.

In another embodiment, the modulation signal generator 830 processes the sensing voltage 575, detects whether the capacitor 530 has been completely discharged based at least in part on the sensing voltage 575, and when the capacitor 530 has been detected to be completely discharged, generate a timing signal 834 that indicates the capacitor 530 has been completely discharged. For example, the timing signal 834 indicates the capacitor 530 becomes completely discharged at time $t_6$ as shown in FIG. 6A. In another example, the timing signal 834 is received by the stage-timing signal generator 860.

In yet another embodiment, the modulation signal generator 830 processes the sensing voltage 575, detects whether a pulse width of the modulation signal 832 for a switching cycle is set equal to the maximum pulse width predetermined by the modulation controller 540, and if the pulse width of the modulation signal 832 is set equal to the maximum pulse width, generate the timing signal 834 that indicates the capacitor 530 has been completely discharged. For example, the timing signal 834 indicates the capacitor 530 becomes completely discharged at time $t_6$ as shown in FIG. 6A. In another example, the timing signal 834 is received by the stage-timing signal generator 860.

According to some embodiments, the stage-timing signal generator 860 receives the mode signal 852, the signal 812 and the timing signal 834 and generates a stage-timing signal 862 based at least in part on the mode signal 852, the signal 812 and/or the timing signal 834. For example, the stage-timing signal 862 is received by the AND gate 870.

In one embodiment, as shown in FIG. 6A, if the mode signal 852 indicates the TRIAC dimmer 510 is detected to be included in the lighting system 500 and the TRIAC dimmer 510 is a leading-edge TRIAC dimmer, the stage-timing signal 862 indicates the beginning and the end of the stage-1 time duration $T_{s1}$ and the beginning and the end of the stage-2 time duration $T_{s2}$. For example, the stage-timing signal generator 860 changes the stage-timing signal 862 from the logic low level to the logic high level at time $t_2$, indicating the beginning of the stage-1 time duration $T_{s1}$. In another example, the stage-timing signal generator 860 changes the stage-timing signal 862 from the logic high level to the logic low level at time $t_3$, indicating the end of the stage-1 time duration $T_{s1}$, if the stage-1 time duration $T_{s1}$ is not larger than $T_{s1\_max}$ in magnitude as shown by the waveform 710 of FIG. 7. In yet another example, the stage-timing signal generator 860 changes the stage-timing signal 862 from the logic low level to the logic high level at time $t_4$, indicating the beginning of the stage-2 time duration $T_{s2}$. In another example, the stage-timing signal generator 860 changes the stage-timing signal 862 from the logic high level to the logic low level at time $t_6$, indicating the end of the stage-2 time duration $T_{s2}$, if the stage-2 time duration $T_{s2}$ is not larger than $T_{s2\_max}$ in magnitude as shown by the waveform 720 of FIG. 7.

In another embodiment, as shown in FIG. 6B, if the mode signal 852 indicates the TRIAC dimmer 510 is detected to be included in the lighting system 500 and the TRIAC dimmer 510 is a trailing-edge TRIAC dimmer, the stage-timing signal 862 indicates the beginning of the stage-1 time duration $T_{s1}$ and the end of the stage-2 time duration $T_{s2}$. For example, the stage-timing signal generator 860 changes the stage-timing signal 862 from the logic low level to the logic high level at time $t_{12}$, indicating the beginning of the stage-1 time duration $T_{s1}$. In another example, the stage-timing signal generator 860 changes the stage-timing signal 862 from the logic high level to the logic low level at time $t_{14}$, indicating the end of the stage-2 time duration $T_{s2}$. In yet another example, the stage-1 time duration $T_{s1}$ is not larger than $T_{s1\_max}$ in magnitude as shown by the waveform 710 of FIG. 7, and the stage-2 time duration $T_{s2}$ is not larger than $T_{s2\_max}$ in magnitude as shown by the waveform 720 of FIG. 7.

In yet another embodiment, if the mode signal 852 indicates the TRIAC dimmer 510 is not included in the lighting system 500, the stage-timing signal 862 is the same as the signal 812. For example, if the voltage 571 becomes larger than the threshold voltage $V_{th\_aa}$, the stage-timing signal 862 changes from the logic low level to the logic high level. In another example, if the voltage 571 becomes smaller than the threshold voltage $V_{th\_bb}$, the stage-timing signal 862 changes from the logic high level to the logic low level. In yet another example, the stage-timing signal 862 remains at the logic high level from a time when the voltage 571 becomes larger than the threshold voltage $V_{th\_aa}$ to a time when the voltage 571 becomes smaller than the threshold voltage $V_{th\_bb}$ for the first time since the voltage 571 becomes larger than the threshold voltage $V_{th\_aa}$. In yet another example, the stage-timing signal 862 remains at the logic low level from a time when the voltage 571 becomes smaller than the threshold voltage $V_{th\_bb}$ to a time when the voltage 571 becomes larger than the threshold voltage $V_{th\_aa}$ for the first time since the voltage 571 becomes smaller than the threshold voltage $V_{th\_bb}$.

According to certain embodiments, the AND gate 870 receives the modulation signal 832 and the stage-timing signal 862 and generates a control signal 872 based at least in part on the modulation signal 832 and the stage-timing signal 862. In one embodiment, if the mode signal 852 indicates the TRIAC dimmer 510 is included in the lighting system 500, the stage-timing signal 862 remains at the logic high level during the stage-1 time duration $T_{s1}$ and during the stage-2 time duration $T_{s2}$, and the stage-timing signal 862 remains at the logic low level outside the stage-1 time duration $T_{s1}$ and the stage-2 time duration $T_{s2}$. For example, if the mode signal 852 indicates the TRIAC dimmer 510 is included in the lighting system 500, during the stage-1 time duration $T_{s1}$ and during the stage-2 time duration $T_{s2}$, the control signal 872 is the same as the modulation signal 832. In another example, if the mode signal 852 indicates the TRIAC dimmer 510 is included in the lighting system 500, outside the stage-1 time duration $T_{s1}$ and the stage-2 time duration $T_{s2}$, the control signal 872 remains at the logic low level.

According to some embodiments, if the mode signal 852 indicates the TRIAC dimmer 510 is not included in the lighting system 500, the stage-timing signal 862 remains at the logic high level throughout entire each half cycle of the voltage 571. In one embodiment, the voltage 571 has a phase angel (e.g., ϕ), which changes from 0° to 180° for a half cycle of the voltage 571 and then changes from 180° to 360° for another half cycle of the voltage 571. In another embodiment, if the mode signal 852 indicates the TRIAC dimmer 510 is not included in the lighting system 500, the control signal 872 is the same as the modulation signal 832. In yet another embodiment, if the mode signal 852 indicates the TRIAC dimmer 510 is not included in the lighting system 500, the modulation signal generator 830 operates under quasi-resonant (QR) constant-current (CC) mode. For example, under the quasi-resonant (QR) constant-current (CC) mode, each half cycle of the voltage 571 includes multiple switching cycles of the modulation signal 832. In another example, each switching cycle of the modulation signal 832 includes an on-time period and an off-time period. In yet another example, during each half cycle of the voltage 571, the on-time period of the modulation signal 832 remains constant in magnitude but the off-time period of the modulation signal 832 changes in magnitude, in order to achieve satisfactory power factor (PF).

According to one embodiment, the driver 840 receives the control signal 872 and generates a drive signal 842. For example, if the control signal 872 is at the logic high level, the drive signal 842 is also at the logic high level. In another example, if the control signal 872 is at the logic low level, the drive signal 842 is also at the logic low level. In yet another example, the driver 840 outputs the drive signal 842 to the transistor 880.

According to another embodiment, the transistor 880 is turned on if the drive signal 842 is at the logic high level, and the transistor 880 is turned off if the drive signal 842 is at the logic low level. For example, when the transistor 562 and the transistor 880 are turned on, the current 561 flows through the winding 560, the transistor 562, the controller terminal 554, the transistor 880, the controller terminal 558, and the resistor 574. In another example, if the transistor 880 becomes turned off when the transistor 562 is still turned on, the transistor 562 also becomes turned off and the winding 560 starts to discharge. In yet another example, if the transistor 880 becomes turned on when the transistor 562 is still turned off, the transistor 562 also becomes turned on and the winding 560 starts to charge.

As shown in FIGS. 5 and 8, the lighting system 500 includes a quasi-resonant system with a buck-boost topology according to certain embodiments. For example, the output current 566 of the quasi-resonant system is received by the one or more LEDs 550 and is determined as follows:

$$I_o = \frac{1}{2} \times \frac{V_{ref}}{R_{cs}} \times \frac{T_{s1} + T_{s2}}{T_M} \quad \text{(Equation 2)}$$

where $I_0$ represents the output current 566 of the quasi-resonant system of the lighting system 500. Additionally, $V_{ref}$ represents the reference voltage 822 (e.g., the reference voltage received by an internal error amplifier of the modulation controller 540), and $R_{cs}$ represents the resistance of the resistor 574. Moreover, $T_{s1}$ represents a stage-1 time duration, and $T_{s2}$ represents a stage-2 time duration. Also, $T_M$ represents one period of the voltage 571. For example, one period of the voltage 571 is equal to half period of the AC input voltage 514 (e.g., VAC).

Figure 9A:
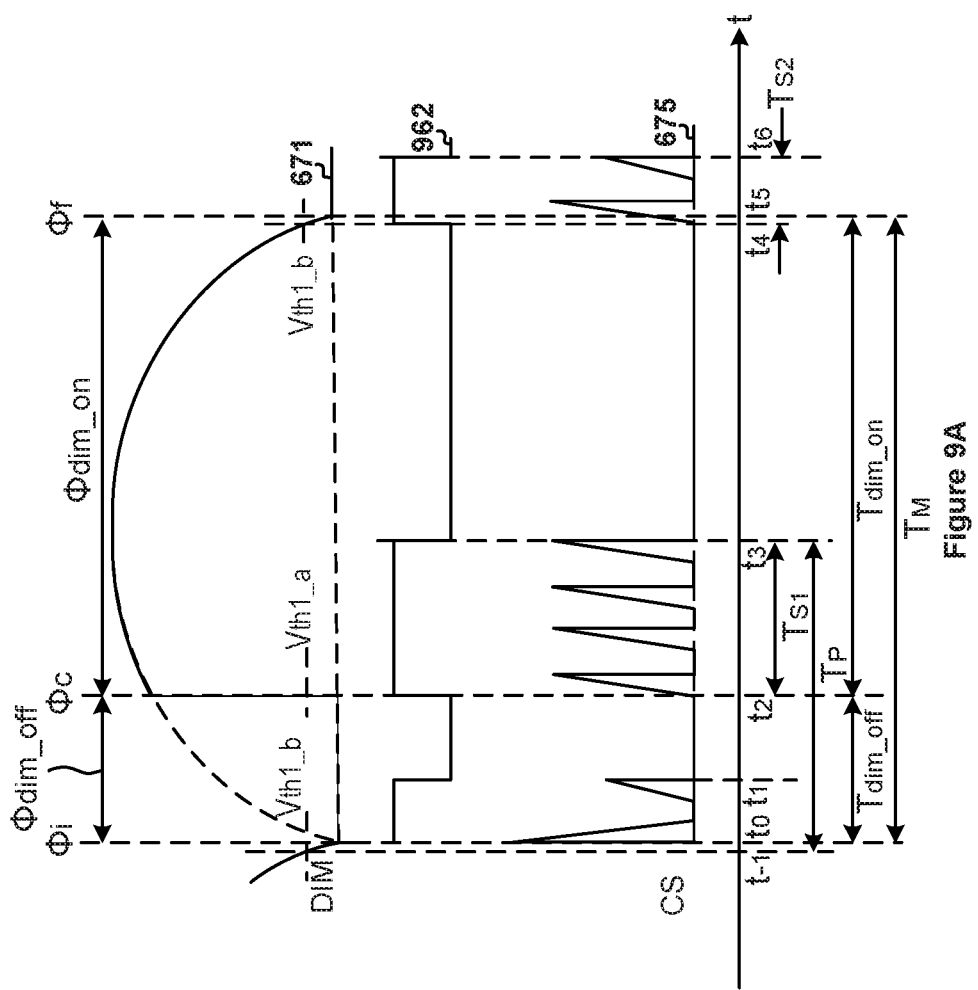
FIG. 9A shows certain timing diagrams for the lighting system as shown in FIG. 5 and FIG. 6A if the TRIAC dimmer is a leading-edge TRIAC dimmer according to one embodiment of the present invention.

FIG. 9A shows certain timing diagrams for the lighting system 500 as shown in FIG. 5 and FIG. 6A if the TRIAC dimmer 510 is a leading-edge TRIAC dimmer according to one embodiment of the present invention. These diagrams are merely examples, which should not unduly limit the scope of the claims. One of ordinary skill in the art would recognize many variations, alternatives, and modifications. The waveform 671 represents the voltage 571 as a function of time as shown in FIG. 6A, the waveform 675 represents the sensing voltage 575 as a function of time as shown in FIG. 6A, and the waveform 962 represents the stage-timing signal 862 as a function of time.

In one embodiment, the TRIAC dimmer 510 is a leading-edge TRIAC dimmer, which clips part of the waveform that corresponds to the phase angel from $\phi_i$ to $\phi_c$. For example, $\phi_c$ minus $\phi_i$ is equal to $\phi_{dim\_off}$, which corresponds to a time duration (e.g., $T_{dim\_off}$) when the TRIAC dimmer 510 is not fired on. In another embodiment, the unclipped part of the waveform corresponds to the phase angel from $\phi_c$ to $\phi_f$. For example, $\phi_f$ minus $\phi_c$ is equal to $\phi_{dim\_on}$, which corresponds to a time duration (e.g., $T_{dim\_on}$) when the TRIAC dimmer 510 is fired on.

In another embodiment, time $t_5$ is approximately equal to time $t_4$, and the phase angel of approximately corresponds to time $t_4$. For example, the time duration $T_{dim\_off}$ when the TRIAC dimmer 510 is not fired on starts at time $t_0$ and ends at $t_2$. In another example, the time duration $T_{dim\_on}$ when the TRIAC dimmer 510 is fired on starts at time $t_2$ and ends approximately at $t_4$. In yet another example, one period $T_M$ of the voltage 571 starts at time $t_0$ and ends approximately at time $t_4$.

In yet another embodiment, one period $T_M$ of the voltage 571 is determined as follows:

$$T_M = T_{dim\_off} + T_{dim\_on} \quad \text{(Equation 3)}$$

where $T_M$ represents one period of the voltage 571. Additionally, $T_{dim\_off}$ represents a time duration when the TRIAC dimmer 510 is not fired on, and $T_{dim\_on}$ represents a time duration when the TRIAC dimmer 510 is fired on.

According to one embodiment, the stage-1 time duration $T_{s1}$ starts at time $t_2$ and ends at time $t_3$. For example, as shown by the waveform 962, the stage-timing signal 862 changes from a logic low level to a logic high level at time $t_2$, remains at the logic high level from time $t_2$ to time $t_3$, and changes from the logic high level back to the logic low level at time $t_3$.

According to another embodiment, the stage-2 time duration $T_{s2}$ starts at time $t_4$ and ends at time $t_6$. For example, as shown by the waveform 962, the stage-timing signal 862 changes from the logic low level to the logic high level at time $t_4$, remains at the logic high level from time $t_4$ to time $t_6$, and changes from the logic high level back to the logic low level at time $t_6$. In another example, time $t_4$ is after time $t_3$.

In one embodiment, the stage-1 time duration $T_{s1}$ starts at time $t_2$, which is the end of the time duration $T_{dim\_off}$ when the TRIAC dimmer 510 is not fired on. For example, the signal 812 changes from the logic low level to the logic high at time $t_2$, and in response, the stage-timing signal generator 860 changes the stage-timing signal 862 from the logic low level to the logic high level at time $t_2$, indicating the beginning of the stage-1 time duration $T_{s1}$.

In another embodiment, the stage-1 time duration $T_{s1}$ ends at time $t_3$, which is the end of a predetermined time duration $T_P$ from the time when the voltage 571 becomes smaller than the threshold voltage $V_{th1\_b}$. For example, the signal 812 changes from the logic high level to the logic low level at time $t_{-1}$, and in response, the stage-timing signal generator 860, after the predetermined time duration $T_P$, changes the stage-timing signal 862 from the logic high level to the logic low level at time $t_3$, indicating the end of the stage-1 time duration $T_{s1}$.

In yet another embodiment, the stage-1 time duration $T_{s1}$ is larger than or equal to zero but smaller than or equal to $T_{s1\_max}$ in magnitude, as shown by the waveform 710 of FIG. 7. For example, time $t_3$ is larger than or equal to time $t_2$ in magnitude. In another example, time $t_3$ minus time $t_2$ is smaller than or equal to $T_{s1\_max}$ in magnitude.

According to one embodiment, as shown in FIG. 9A, time $t_{-1}$ is approximately equal to time $t_4$, and the following can be obtained:

$$T_{dim\_off} + T_{s1} \cong T_P \quad \text{(Equation 4)}$$

where $T_{dim\_off}$ represents the time duration when the TRIAC dimmer 510 is not fired on, and $T_{s1}$ represents a stage-1 time duration. Additionally, $T_P$ represents a predetermined time duration. For example, the stage-1 time duration $T_{s1}$ satisfies Equation 4, and the stage-1 time duration $T_{s1}$ is also larger than or equal to zero but smaller than or equal to $T_{s1\_max}$ in magnitude as shown by the waveform 710 of FIG. 7.

According to another embodiment, based on Equations 3 and 4, the following can be obtained:

$$T_{s1} \cong T_{dim\_on} - (T_M - T_P) \quad \text{(Equation 5)}$$

where $T_{s1}$ represents the stage-1 time duration, and $T_{dim\_on}$ represents the time duration when the TRIAC dimmer 510 is fired on. Additionally, $T_M$ represents one period of the voltage 571, and $T_P$ represents a predetermined time duration. For example, the stage-1 time duration $T_{s1}$ satisfies Equation 5, and the stage-1 time duration $T_{s1}$ is also larger than zero but smaller than $T_{s1\_max}$ as shown by the waveform 710 of FIG. 7.

According to yet another embodiment, a time duration when the TRIAC dimmer 510 is fired on has the following relationship with a dimming-control phase angle:

$$T_{dim\_on} = k \times \phi_{dim\_on} \quad \text{(Equation 6)}$$

where $T_{dim\_on}$ represents the time duration when the TRIAC dimmer 510 is fired on, and $\phi_{dim\_on}$ represents the dimming-control phase angle. Additionally, k represents a constant. For example, based on Equations 5 and 6, the following can also be obtained:

$$T_{s1} \cong k \times \phi_{dim\_on} - (T_M - T_P) \quad \text{(Equation 7)}$$

where $T_{s1}$ represents the stage-1 time duration, and $\phi_{dim\_on}$ represents the dimming-control phase angle. Additionally, k represents a constant. Moreover, $T_M$ represents one period of the voltage 571, and $T_P$ represents a predetermined time duration. In another example, the stage-1 time duration $T_{s1}$ satisfies Equation 7, and the stage-1 time duration $T_{s1}$ is also larger than or equal to zero but smaller than or equal to $T_{s1\_max}$ in magnitude, as shown by the waveform 710 of FIG. 7.

In one embodiment, the stage-2 time duration $T_{s2}$ starts at time $t_4$. For example, the signal 812 changes from the logic high level to the logic low at time $t_4$, and in response, the stage-timing signal generator 860 changes the stage-timing signal 862 from the logic low level to the logic high level at time $t_4$, indicating the beginning of the stage-2 time duration $T_{s2}$.

In another embodiment, the stage-2 time duration $T_{s2}$ ends at time $t_6$, which is the time when the capacitor 530 is completely discharged. For example, the timing signal 834 indicates that the capacitor 530 becomes completely discharged at time $t_6$, and in response, the stage-timing signal generator 860 changes the stage-timing signal 862 from the logic high level to the logic low level at time $t_6$, indicating the end of the stage-2 time duration $T_{s2}$.

In yet another embodiment, the stage-2 time duration $T_{s2}$ is larger than or equal to zero but smaller than or equal to $T_{s2\_max}$ in magnitude, as shown by the waveform 720 of FIG. 7. For example, time $t_6$ is larger than or equal to time $t_4$ in magnitude. In another example, time $t_6$ minus time $t_4$ is smaller than or equal to $T_{s2\_max}$ in magnitude.

As shown in FIG. 9A, corresponding to each period (e.g., corresponding to each $T_M$) of the voltage 571, there are a stage-1 time duration (e.g., $T_{s1}$) and a stage-2 time duration (e.g., $T_{s2}$) according to certain embodiments. In one embodiment, corresponding to one period of the voltage 571 (e.g., from time $t_0$ to time $t_5$), the stage-1 time duration $T_{s1}$ starts at time $t_2$ and ends at time $t_3$, and the stage-2 time duration $T_{s2}$ starts at time $t_4$ and ends at time $t_6$. In another embodiment, corresponding to a previous period of the voltage 571 (e.g., ending at time $t_0$), the stage-2 time duration $T_{s2}$ starts at time $t_{-1}$ and ends at time $t_1$.

In yet another embodiment, the stage-timing signal 862 changes from the logic low level to the logic high level at time $t_{-1}$, remains at the logic high level from time $t_{-1}$ to time $t_1$, changes from the logic high level to the logic low level at time $t_1$, remains at the logic low level from time $t_1$ to time $t_2$, changes from the logic low level to the logic high level at time $t_2$, remains at the logic high level from time $t_2$ to time $t_3$, changes from the logic high level to the logic low level at time $t_3$, remains at the logic low level from time $t_3$ to time $t_4$, changes from the logic low level to the logic high level at time $t_4$, remains at the logic high level from time $t_4$ to $t_6$, and changes from the logic high level to the logic low level at time $t_6$.

According to one embodiment, corresponding to one period of the voltage 571 (e.g., from time $t_0$ to time $t_5$), the stage-1 time duration (e.g., $T_{s1}$ from time $t_2$ to time $t_3$) falls within the time duration when the TRIAC dimmer 510 is fired on (e.g., $T_{dim\_on}$ from time $t_2$ to time $t_5$), and the stage-2 time duration (e.g., $T_{s2}$ from time $t_4$ to time $t_6$) at least mostly falls outside of the time duration when the TRIAC dimmer 510 is fired on (e.g., $T_{dim\_on}$ from time $t_2$ to time $t_5$). For example, corresponding to the period of the voltage 571 (e.g., from time $t_0$ to time $t_5$), during the stage-1 time duration (e.g., $T_{s1}$) and during the stage-2 time duration (e.g., $T_{s2}$), the sensing voltage 575 ramps up and down and the current 561 also ramps up and down. In another example, corresponding to the period of the voltage 571 (e.g., from time $t_0$ to time $t_5$), outside the stage-1 time duration (e.g., $T_{s1}$) and the stage-2 time duration (e.g., $T_{s2}$), the sensing voltage 575 remains equal to zero. In yet another example, corresponding to the period of the voltage 571 (e.g., from time $t_0$ to time $t_5$), outside the stage-1 time duration (e.g., $T_{s1}$) and the stage-2 time duration (e.g., $T_{s2}$), the current 561 charges the capacitor 532. According to another embodiment, corresponding to a previous period of the voltage 571 (e.g., ending at time $t_5$), during the stage-2 time duration $T_{s2}$ (e.g., starting at time $t_{-1}$ and ending at time $t_1$), the sensing voltage 575 ramps up and down and the current 561 also ramps up and down.

Figure 9B:
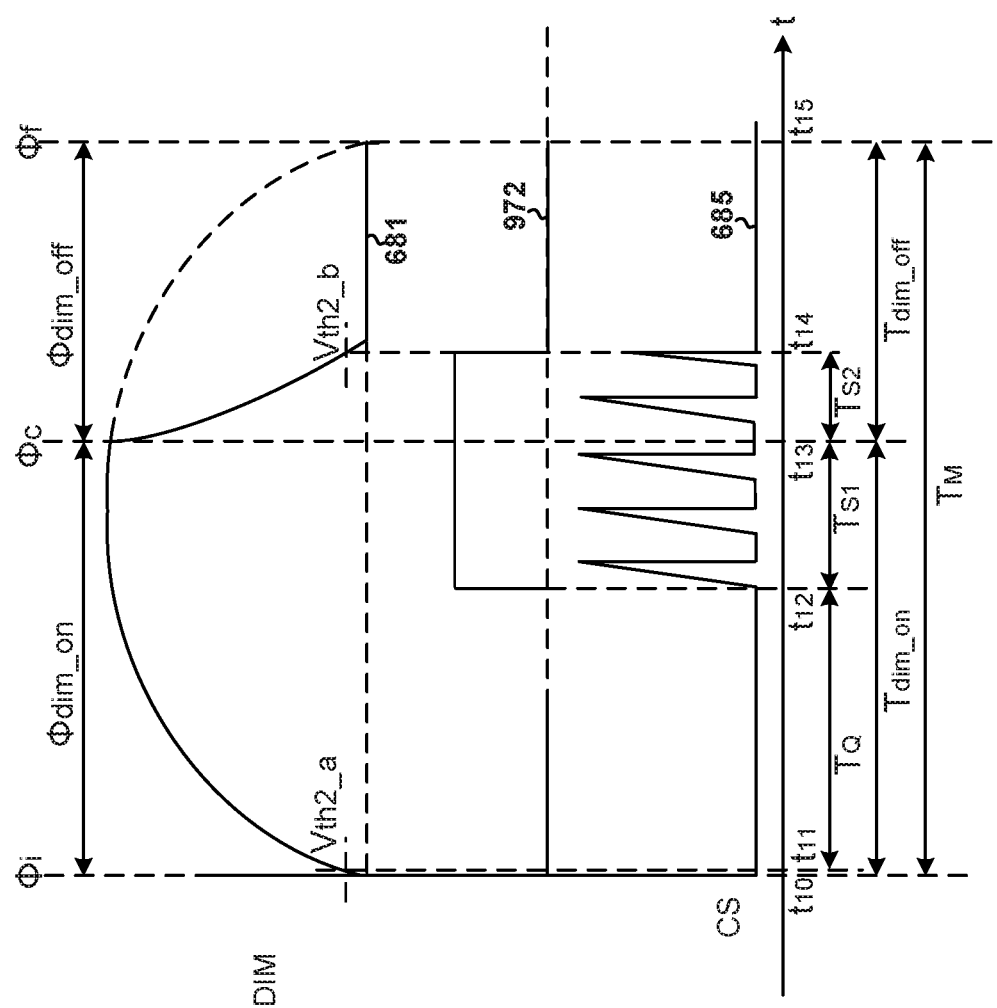
FIG. 9B shows certain timing diagrams for the lighting system as shown in FIG. 5 and FIG. 6B if the TRIAC dimmer is a trailing-edge TRIAC dimmer according to another embodiment of the present invention.

FIG. 9B shows certain timing diagrams for the lighting system 500 as shown in FIG. 5 and FIG. 6B if the TRIAC dimmer 510 is a trailing-edge TRIAC dimmer according to another embodiment of the present invention. These diagrams are merely examples, which should not unduly limit the scope of the claims. One of ordinary skill in the art would recognize many variations, alternatives, and modifications. The waveform 681 represents the voltage 571 as a function of time as shown in FIG. 6B, the waveform 675 represents the sensing voltage 575 as a function of time as shown in FIG. 6B, and the waveform 972 represents the stage-timing signal 862 as a function of time.

In one embodiment, the TRIAC dimmer 510 is a trailing-edge TRIAC dimmer, which clips part of the waveform that corresponds to the phase angel from $\phi_c$ to $\phi_f$. For example, $\phi_f$ minus $\phi_c$ is equal to $\phi_{dim\_off}$, which corresponds to a time duration (e.g., $T_{dim\_off}$) when the TRIAC dimmer 510 is not fired on. In another embodiment, the unclipped part of the waveform corresponds to the phase angel from $\phi_i$ to $\phi_c$. For example, $\phi_c$ minus $\phi_i$ is equal to $\phi_{dim\_on}$, which corresponds to a time duration (e.g., $T_{dim\_on}$) when the TRIAC dimmer 510 is fired on.

In another embodiment, time $t_{10}$ is approximately equal to time $t_{11}$, and the phase angel $\phi_i$ approximately corresponds to time $t_{11}$. For example, the time duration $T_{dim\_off}$ when the TRIAC dimmer 510 is not fired on starts at time $t_{13}$ and ends at $t_{15}$. In another example, the time duration $T_{dim\_on}$ when the TRIAC dimmer 510 is fired on starts at approximately time $t_{11}$ and ends at $t_{13}$. In yet another example, one period $T_M$ of the voltage 571 starts approximately at time $t_{11}$ and ends at time $t_{15}$.

In yet another embodiment, one period $T_M$ of the voltage 571 is determined as follows:

$$T_M = T_{dim\_off} + T_{dim\_on} \quad \text{(Equation 8)}$$

where $T_M$ represents one period of the voltage 571. Additionally, $T_{dim\_off}$ represents a time duration when the TRIAC dimmer 510 is not fired on, and $\phi_{dim\_on}$ represents a time duration when the TRIAC dimmer 510 is fired on.

According to one embodiment, the stage-1 time duration $T_{s1}$ starts at time $t_{12}$ and ends at time $t_{13}$. For example, as shown by the waveform 972, the stage-timing signal 862 changes from a logic low level to a logic high level at time $t_{12}$, remains at the logic high level from time $t_{12}$ to time $t_{13}$. According to another embodiment, the stage-2 time duration $T_{s2}$ starts at time $t_{13}$ and ends at time $t_{14}$. For example, as shown by the waveform 972, the stage-timing signal 862 remains at the logic high level from time $t_{13}$ to time $t_{14}$, and changes from the logic high level back to the logic low level at time $t_{14}$. According to yet another embodiment, the combination of the stage-1 time duration $T_{s1}$ and the stage-2 time duration $T_{s2}$ starts at time $t_{12}$ and ends at time $t_{14}$. For example, as shown by the waveform 972, the stage-timing signal 862 changes from the logic low level to the logic high level at time $t_{12}$, remains at the logic high level from time $t_{12}$ to time $t_{14}$, and changes from the logic high level back to the logic low level at time $t_{14}$.

In one embodiment, the stage-1 time duration $T_{s1}$ starts at time $t_{12}$, which is the end of a predetermined time duration $T_Q$ from the time when the voltage 571 becomes larger than the threshold voltage $V_{th2\_a}$. For example, the phase signal 812 changes from the logic low level to the logic high level at time $t_{11}$, and in response, the stage-timing signal generator 860, after the predetermined time duration $T_Q$, changes the stage-timing signal 862 from the logic low level to the logic high level at time $t_{12}$, indicating the beginning of the stage-1 time duration $T_{s1}$.

In another embodiment, the stage-1 time duration $T_{s1}$ ends at time $t_{12}$, which is the end of the time duration $T_{dim\_on}$ when the TRIAC dimmer 510 is fired on. For example, the stage-1 time duration $T_{s1}$ is larger than or equal to zero but smaller than or equal to $T_{s1\_max}$ in magnitude, as shown by the waveform 710 of FIG. 7. For example, time $t_{13}$ is larger than or equal to time $t_{12}$ in magnitude. In another example, time $t_{13}$ minus time $t_{12}$ is smaller than or equal to $T_{s1\_max}$ in magnitude.

According to one embodiment, as shown in FIG. 9B, the following can be obtained:

$$T_Q + T_{s1} \cong T_{dim\_on} \quad \text{(Equation 9)}$$

where $T_Q$ represents a predetermined time duration, and $T_{s1}$ represents a stage-1 time duration. Additionally, $T_{dim\_on}$ represents the time duration when the TRIAC dimmer 510 is fired on. For example, the stage-1 time duration $T_{s1}$ satisfies Equation 9, and the stage-1 time duration $T_{s1}$ is also larger than or equal to zero but smaller than or equal to $T_{s1\_max}$ in magnitude as shown by the waveform 710 of FIG. 7.

According to another embodiment, based on Equation 9, the following can be obtained:

$$T_{s1} \cong T_{dim\_on} - T_Q \qquad \text{(Equation 10)}$$

where $T_{s1}$ represents the stage-1 time duration, and $T_{dim\_on}$ represents the time duration when the TRIAC dimmer 510 is fired on. Additionally, $T_Q$ represents a predetermined time duration. For example, the stage-1 time duration $T_{s1}$ satisfies Equation 10, and the stage-1 time duration $T_{s1}$ is also larger than zero but smaller than $T_{s1\_max}$ as shown by the waveform 710 of FIG. 7.

According to yet another embodiment, a time duration when the TRIAC dimmer 510 is fired on has the following relationship with a dimming-control phase angle:

$$T_{dim\_on} = k \times \phi_{dim\_on} \qquad \text{(Equation 11)}$$

where $T_{dim\_on}$ represents the time duration when the TRIAC dimmer 510 is fired on, and $\phi_{dim\_on}$ represents the dimming-control phase angle. Additionally, k represents a constant. For example, based on Equations 10 and 11, the following can also be obtained:

$$T_{s1} \cong k \times \phi_{dim\_on} - T_Q \qquad \text{(Equation 12)}$$

where $T_{s1}$ represents the stage-1 time duration, and $\phi_{dim\_on}$ represents the dimming-control phase angle. Additionally, k represents a constant, and $T_Q$ represents a predetermined time duration. In another example, the stage-1 time duration $T_{s1}$ satisfies Equation 12, and the stage-1 time duration $T_{s1}$ is also larger than or equal to zero but smaller than or equal to $T_{s1\_max}$ in magnitude, as shown by the waveform 710 of FIG. 7.

In one embodiment, the stage-2 time duration $T_{s2}$ starts at time $t_{13}$, which is the end of the stage-1 time duration $T_{s1}$. For example, at time $t_{13}$, the stage-timing signal generator 860 keeps the stage-timing signal 862 at the logic high level. In another embodiment, the stage-2 time duration $T_{s2}$ ends at time $t_{14}$. For example, the signal 812 changes from the logic high level to the logic low at time $t_{14}$, and in response, the stage-timing signal generator 860 changes the stage-timing signal 862 from the logic high level to the logic low level at time $t_{14}$, indicating the end of the stage-2 time duration $T_{s2}$.

In yet another embodiment, the stage-2 time duration $T_{s2}$ is larger than or equal to zero but smaller than or equal to $T_{s2\_max}$ in magnitude, as shown by the waveform 720 of FIG. 7. For example, time $t_{14}$ is larger than or equal to time $t_{13}$ in magnitude. In another example, time $t_{14}$ minus time $t_{13}$ is smaller than or equal to $T_{s2\_max}$ in magnitude. In yet another embodiment, the stage-timing signal 862 changes from the logic low level to the logic high level at time $t_{12}$, remains at the logic high level from time $t_{12}$ to time $t_{14}$, and changes from the logic high level back to the logic low level at time $t_{14}$. For example, time $t_{12}$ is no later than time $t_{14}$.

As shown in FIG. 9B, corresponding to each period (e.g., corresponding to each $T_M$) of the voltage 571, there are a stage-1 time duration (e.g., $T_{s1}$) and a stage-2 time duration (e.g., $T_{s2}$) according to certain embodiments. In one embodiment, corresponding to one period of the voltage 571 (e.g., from time $t_{10}$ to time $t_{15}$), the stage-1 time duration $T_{s1}$ starts at time $t_{12}$ and ends at time $t_{13}$, and the stage-2 time duration $T_{s2}$ starts at time $t_{13}$ and ends at time $t_{14}$. In another embodiment, the stage-timing signal 862 changes from the logic low level to the logic high level at time $t_{12}$, remains at the logic high level from time $t_{12}$ to time $t_{14}$, and changes from the logic high level to the logic low level at time $t_{14}$.

According to one embodiment, corresponding to one period of the voltage 571 (e.g., from time $t_{10}$ to time $t_{15}$), the stage-1 time duration (e.g., $T_{s1}$ from time $t_{12}$ to time $t_{13}$) falls within the time duration when the TRIAC dimmer 510 is fired on (e.g., $T_{dim\_on}$ from time $t_{10}$ to time $t_{13}$), and the stage-2 time duration (e.g., $T_{s2}$ from time $t_{13}$ to time $t_{14}$) falls within the time duration when the TRIAC dimmer 510 is not fired on (e.g., $T_{dim\_off}$ from time $t_{13}$ to time $t_{15}$). For example, corresponding to the period of the voltage 571 (e.g., from time $t_{10}$ to time $t_{15}$), during the stage-1 time duration (e.g., $T_{s1}$) and during the stage-2 time duration (e.g., $T_{s2}$), the sensing voltage 575 ramps up and down and the current 561 also ramps up and down. In another example, corresponding to the period of the voltage 571 (e.g., from time $t_{10}$ to time $t_{15}$), outside the stage-1 time duration (e.g., $T_{s1}$) and the stage-2 time duration (e.g., $T_{s2}$), the sensing voltage 575 remains equal to zero. In yet another example, corresponding to the period of the voltage 571 (e.g., from time $t_{10}$ to time $t_{15}$), outside the stage-1 time duration (e.g., $T_{s1}$) and the stage-2 time duration (e.g., $T_{s2}$), the current 561 charges the capacitor 532.

Certain embodiments of the present invention provide stage-based dimmer control systems and methods with high compatibility, low costs, and/or high efficiency. For example, the stage-based dimmer control systems and methods do not include a bleeder; hence the system layouts are simplified with high compatibility achieved. In another example, the stage-based dimmer control systems and methods use one or more control mechanisms in order to reduce bill of materials (BOM), raise energy efficiency, and lower system costs, while providing users with satisfactory dimming effects for light emitting diodes. In yet another example, the stage-based dimmer control systems and methods use a stage-1 time duration (e.g., $T_{s1}$) and a stage-2 time duration (e.g., $T_{s2}$), and each of these time durations is a function of dimming-control phase angle $\phi_{dim\_on}$ as shown in FIG. 7.

According to another embodiment, a system controller (e.g., the modulation controller 540) for a lighting system (e.g., the lighting system 500) includes a first controller terminal (e.g., the controller terminal 542) configured to receive a first signal (e.g., the voltage 571), and a second controller terminal (e.g., the controller terminal 552) coupled to a first transistor terminal of a transistor (e.g., the gate terminal of the transistor 562). The transistor further includes a second transistor terminal (e.g., the drain terminal of the transistor 562) and a third transistor terminal (e.g., the source terminal of the transistor 562). The second transistor terminal is coupled to a first winding terminal of a winding (e.g., the winding 560), and the winding (e.g., the winding 560) further includes a second winding terminal coupled to a capacitor (e.g., the capacitor 530). Additionally, the system controller includes a third controller terminal (e.g., the controller terminal 554) coupled to the third transistor terminal of the transistor (e.g., the source terminal of the transistor 562), and a fourth controller terminal (e.g., the controller terminal 558) coupled to a resistor (e.g., the resistor 574) and configured to receive a second signal (e.g., the sensing voltage 575). The second signal represents a magnitude of a current (e.g., the current 561) flowing through at least the winding (e.g., the winding 560), the third controller terminal (e.g., the controller terminal 554), the fourth controller terminal (e.g., the controller terminal 558), and the resistor (e.g., the resistor 574). The system controller (e.g., the modulation controller 540) is configured to: in response to the first signal (e.g., the voltage 571) becoming larger than a first threshold (e.g., the threshold voltage $V_{th1\_a}$) in magnitude at a first time (e.g., the time $t_2$), cause the second signal (e.g., the sensing voltage 575) to ramp up and down during a first duration of time (e.g., the stage-1 time duration $T_{s1}$); and in response to the first signal (e.g., the voltage 571) becoming smaller than a second threshold (e.g., the threshold voltage $V_{th1\_b}$) in magnitude at a third time (e.g., the time $t_4$), cause the second signal (e.g., the sensing voltage 575) to ramp up and down during a second duration of time (e.g., the stage-2 time duration $T_{s2}$). The first duration of time (e.g., the stage-1 time duration $T_{s1}$) starts at the first time (e.g., the time $t_2$) and ends at a second time (e.g., the time $t_3$). The second duration of time (e.g., the stage-2 time duration $T_{s2}$) starts at the third time (e.g., the time $t_4$) and ends at a fourth time (e.g., the time $t_6$). The system controller (e.g., the modulation controller 540) is further configured to cause the second signal (e.g., the sensing voltage 575) to remain equal to a constant magnitude from the second time (e.g., the time $t_3$) to the third time (e.g., the time $t_4$). The first time (e.g., the time $t_2$) is earlier than the second time (e.g., the time $t_3$), the second time (e.g., the time $t_3$) is earlier than the third time (e.g., the time $t_4$), and the third time (e.g., the time $t_4$) is earlier than the fourth time (e.g., the time $t_6$). For example, the system controller (e.g., the modulation controller 540) is implemented according to at least FIG. 5, FIG. 6A, and/or FIG. 9A.

In another example, the system controller (e.g., the modulation controller 540) is further configured to: in response to the first signal (e.g., the voltage 571) becoming smaller than the second threshold (e.g., the threshold voltage $V_{th1\_b}$) in magnitude at a previous time (e.g., the time $t_{-1}$) earlier than the first time (e.g., the time $t_2$), determine the second time (e.g., the time $t_3$) to be a predetermined time duration (e.g., the predetermined time duration $T_P$) after the previous time (e.g., the time $t_{-1}$).

In yet another example, the fourth time (e.g., the time $t_6$) is a time when the capacitor (e.g., the capacitor 530) becomes completely discharged. In yet another example, the first threshold (e.g., the threshold voltage $V_{th1\_a}$) and the second threshold (e.g., the threshold voltage $V_{th1\_b}$) are equal. In yet another example, the first threshold (e.g., the threshold voltage $V_{th1\_a}$) and the second threshold (e.g., the threshold voltage $V_{th1\_b}$) are not equal. In yet another example, the constant magnitude is equal to zero. In yet another example, each of the first controller terminal (e.g., the controller terminal 542), the second controller terminal (e.g., the controller terminal 552), the third controller terminal (e.g., the controller terminal 554), and the fourth controller terminal (e.g., the controller terminal 558) is a pin.

According to yet another embodiment, a system controller (e.g., the modulation controller 540) for a lighting system (e.g., the lighting system 500) includes a first controller terminal (e.g., the controller terminal 542) configured to receive a first signal (e.g., the voltage 571), and a second controller terminal (e.g., the controller terminal 552) coupled to a first transistor terminal of a transistor (e.g., the gate terminal of the transistor 562). The transistor further includes a second transistor terminal (e.g., the drain terminal of the transistor 562) and a third transistor terminal (e.g., the source terminal of the transistor 562), and the second transistor terminal is coupled to a winding (e.g., the winding 560). Additionally, the system controller (e.g., the modulation controller 540) further includes a third controller terminal (e.g., the controller terminal 554) coupled to the third transistor terminal of the transistor (e.g., the source terminal of the transistor 562), and a fourth controller terminal (e.g., the controller terminal 558) coupled to a resistor (e.g., the resistor 574) and configured to receive a second signal (e.g., the sensing voltage 575). The second signal represents a magnitude of a current (e.g., the current 561) flowing through at least the winding (e.g., the winding 560), the third controller terminal (e.g., the controller terminal 554), the fourth controller terminal (e.g., the controller terminal 558), and the resistor (e.g., the resistor 574). The system controller (e.g., the modulation controller 540) is configured to: in response to the first signal (e.g., the voltage 571) becoming larger than a first threshold (e.g., the threshold voltage $V_{th2\_a}$) in magnitude at a first time (e.g., the time $t_{11}$), cause the second signal (e.g., the sensing voltage 575) to ramp up and down during a duration of time (e.g., the two-stage total time duration $T_{st}$). The duration of time (e.g., the two-stage total time duration $T_{st}$) starts at a second time (e.g., the time $t_{12}$) and ends at a third time (e.g., the time $t_{14}$). The third time (e.g., the time $t_{14}$) is a time when the first signal (e.g., the voltage 571) becomes smaller than a second threshold (e.g., the threshold voltage $V_{th2\_b}$) in magnitude. The system controller (e.g., the modulation controller 540) is further configured to cause the second signal (e.g., the sensing voltage 575) to remain equal to a constant magnitude from the first time (e.g., the time $t_{11}$) to the second time (e.g., the time $t_{12}$). The first time (e.g., the time $t_{11}$) is earlier than the second time (e.g., the time $t_{12}$), and the second time (e.g., the time $t_{12}$) is earlier than the third time (e.g., the time $t_{14}$). For example, the system controller (e.g., the modulation controller 540) is implemented according to at least FIG. 5, FIG. 6B, and/or FIG. 9B.

In another example, the system controller (e.g., the modulation controller 540) is further configured to: in response to the first signal (e.g., the voltage 571) becoming larger than the first threshold (e.g., the threshold voltage $V_{th2\_a}$) in magnitude at the first time (e.g., the time $t_{11}$), determine the second time (e.g., the time $t_{12}$) to be a predetermined time duration (e.g., the predetermined time duration $T_Q$) after the first time (e.g., the time $t_{11}$). In yet another example, the first threshold (e.g., the threshold voltage $V_{th2\_a}$) and the second threshold (e.g., the threshold voltage $V_{th2\_b}$) are equal. In yet another example, the first threshold (e.g., the threshold voltage $V_{th2\_a}$) and the second threshold (e.g., the threshold voltage $V_{th2\_b}$) are not equal. In yet another example, the constant magnitude is equal to zero. In yet another example, each of the first controller terminal (e.g., the controller terminal 542), the second controller terminal (e.g., the controller terminal 552), the third controller terminal (e.g., the controller terminal 554), and the fourth controller terminal (e.g., the controller terminal 558) is a pin.

According to yet another embodiment, a system controller (e.g., the modulation controller 540) for a lighting system (e.g., the lighting system 500) includes a first controller terminal (e.g., the controller terminal 542) configured to receive a first signal (e.g., the voltage 571). The first signal is related to a dimming-control phase angle (e.g., $\phi_{dim\_on}$). Additionally, the system controller (e.g., the modulation controller 540) includes a second controller terminal (e.g., the controller terminal 552) coupled to a first transistor terminal of a transistor (e.g., the gate terminal of the transistor 562). The transistor further includes a second transistor terminal (e.g., the drain terminal of the transistor 562) and a third transistor terminal (e.g., the source terminal of the transistor 562), and the second transistor terminal is coupled to a winding (e.g., the winding 560). Moreover, the system controller (e.g., the modulation controller 540)

includes a third controller terminal (e.g., the controller terminal 554) coupled to the third transistor terminal of the transistor (e.g., the source terminal of the transistor 562), and a fourth controller terminal (e.g., the controller terminal 558) coupled to a resistor (e.g., the resistor 574) and configured to receive a second signal (e.g., the sensing voltage 575). The second signal represents a magnitude of a current (e.g., the current 561) flowing through at least the winding (e.g., the winding 560), the third controller terminal (e.g., the controller terminal 554), the fourth controller terminal (e.g., the controller terminal 558), and the resistor (e.g., the resistor 574). The system controller (e.g., the modulation controller 540) is configured to, in response to the first signal (e.g., the voltage 571) satisfying one or more predetermined conditions: cause the second signal (e.g., the sensing voltage 575) to ramp up and down during a first duration of time (e.g., the stage-1 time duration $T_{s1}$); and cause the second signal (e.g., the sensing voltage 575) to ramp up and down during a second duration of time (e.g., the stage-2 time duration $T_{s2}$). The first duration of time (e.g., the stage-1 time duration $T_{s1}$) starts at a first time and ends at a second time, and the second time is the same as or later than the first time. The second duration of time (e.g., the stage-2 time duration $T_{s2}$) starts at a third time and ends at a fourth time, and the fourth time is the same as or later than the third time. The system controller (e.g., the modulation controller 540) is further configured to: in response to the dimming-control phase angle (e.g., $\phi_{dim\_on}$) increasing from a first angle magnitude (e.g., 0°) to a second angle magnitude (e.g., $\phi_B$), keep the first duration of time at a first predetermined constant; in response to the dimming-control phase angle (e.g., $\phi_{dim\_on}$) increasing from the second angle magnitude (e.g., $\phi_B$) to a third angle magnitude (e.g., $\phi_C$), increase the first duration of time; and in response to the dimming-control phase angle (e.g., $\phi_{dim\_on}$) increasing from the third angle magnitude (e.g., $\phi_C$) to a fourth angle magnitude (e.g., 180°), keep the first duration of time at a second predetermined constant (e.g., $T_{s1\_max}$). For example, the system controller (e.g., the modulation controller 540) is implemented according to at least FIG. 5, FIG. 6A, FIG. 6B, FIG. 7, FIG. 9A, and/or FIG. 9B.

In another example, the second time is earlier than the third time. In yet another example, the second time is the same as the third time. In yet another example, the first angle magnitude is equal to 0°, and the fourth angle magnitude is equal to 180°. In yet another example, the first predetermined constant is equal to zero. In yet another example, the system controller (e.g., the modulation controller 540) is further configured to, in response to the dimming-control phase angle (e.g., $\phi_{dim\_on}$) increasing from the second angle magnitude (e.g., $\phi_B$) to the third angle magnitude (e.g., $\phi_C$), increase the first duration of time linearly with the increasing dimming-control phase angle at a constant slope (e.g., the slope $SL_1$). In yet another example, the second predetermined constant (e.g., $T_{s1\_max}$) is larger than zero.

According to yet another embodiment, a system controller (e.g., the modulation controller 540) for a lighting system (e.g., the lighting system 500) includes a first controller terminal (e.g., the controller terminal 542) configured to receive a first signal (e.g., the voltage 571). The first signal is related to a dimming-control phase angle (e.g., $\phi_{dim\_on}$). Additionally, the system controller (e.g., the modulation controller 540) includes a second controller terminal (e.g., the controller terminal 552) coupled to a first transistor terminal of a transistor (e.g., the gate terminal of the transistor 562). The transistor further includes a second transistor terminal (e.g., the drain terminal of the transistor 562) and a third transistor terminal (e.g., the source terminal of the transistor 562), and the second transistor terminal is coupled to a winding (e.g., the winding 560). Moreover, the system controller (e.g., the modulation controller 540) includes a third controller terminal (e.g., the controller terminal 554) coupled to the third transistor terminal of the transistor (e.g., the source terminal of the transistor 562), and a fourth controller terminal (e.g., the controller terminal 558) coupled to a resistor (e.g., the resistor 574) and configured to receive a second signal (e.g., the sensing voltage 575). The second signal represents a magnitude of a current (e.g., the current 561) flowing through at least the winding (e.g., the winding 560), the third controller terminal (e.g., the controller terminal 554), the fourth controller terminal (e.g., the controller terminal 558), and the resistor (e.g., the resistor 574). The system controller (e.g., the modulation controller 540) is configured to, in response to the first signal (e.g., the voltage 571) satisfying one or more predetermined conditions: cause the second signal (e.g., the sensing voltage 575) to ramp up and down during a first duration of time (e.g., the stage-1 time duration $T_{s1}$); and cause the second signal (e.g., the sensing voltage 575) to ramp up and down during a second duration of time (e.g., the stage-2 time duration $T_{s2}$). The first duration of time (e.g., the stage-1 time duration $T_{s1}$) starts at a first time and ends at a second time, and the second time is the same as or later than the first time. The second duration of time (e.g., the stage-2 time duration $T_{s2}$) starts at a third time and ends at a fourth time, and the fourth time is the same as or later than the third time. The system controller (e.g., the modulation controller 540) is further configured to: in response to the dimming-control phase angle (e.g., $\phi_{dim\_on}$) increasing from a first angle magnitude (e.g., 0°) to a second angle magnitude (e.g., $\phi_A$), keep the second duration of time at a first predetermined constant; in response to the dimming-control phase angle (e.g., $\phi_{dim\_on}$) increasing from the second angle magnitude (e.g., $\phi_A$) to a third angle magnitude (e.g., $\phi_B$), increase the second duration of time; and in response to the dimming-control phase angle (e.g., $\phi_{dim\_on}$) increasing from the third angle magnitude (e.g., $\phi_B$) to a fourth angle magnitude (e.g., 180°), keep the second duration of time at a second predetermined constant (e.g., $T_{s2\_max}$). For example, the system controller (e.g., the modulation controller 540) is implemented according to at least FIG. 5, FIG. 6A, FIG. 6B, FIG. 7, FIG. 9A, and/or FIG. 9B.

In another example, the second time is earlier than the third time. In yet another example, the second time is the same as the third time. In yet another example, the first angle magnitude is equal to 0°, and the fourth angle magnitude is equal to 180°. In yet another example, the first predetermined constant is equal to zero. In yet another example, the system controller (e.g., the modulation controller 540) is further configured to, in response to the dimming-control phase angle (e.g., $\phi_{dim\_on}$) increasing from the second angle magnitude (e.g., $\phi_A$) to the third angle magnitude (e.g., $\phi_B$), increase the second duration of time linearly with the increasing dimming-control phase angle at a constant slope (e.g., the slope $SL_2$). In yet another example, the second predetermined constant (e.g., $T_{s2\_max}$) is larger than zero.

According to yet another embodiment, a system controller (e.g., the modulation controller 540) for a lighting system (e.g., the lighting system 500) includes a first controller terminal (e.g., the controller terminal 542) configured to receive a first signal (e.g., the voltage 571). The first signal is related to a dimming-control phase angle (e.g., $\phi_{dim\_on}$). Additionally, the system controller (e.g., the modulation controller 540) includes a second controller terminal (e.g., the controller terminal 552) coupled to a first transistor terminal of a transistor (e.g., the gate terminal of the transistor 562). The transistor further includes a second transistor terminal (e.g., the drain terminal of the transistor 562) and a third transistor terminal (e.g., the source terminal of the transistor 562), and the second transistor terminal is coupled to a winding (e.g., the winding 560). Moreover, the system controller (e.g., the modulation controller 540) includes a third controller terminal (e.g., the controller terminal 554) coupled to the third transistor terminal of the transistor (e.g., the source terminal of the transistor 562), and a fourth controller terminal (e.g., the controller terminal 558) coupled to a resistor (e.g., the resistor 574) and configured to receive a second signal (e.g., the sensing voltage 575). The second signal represents a magnitude of a current (e.g., the current 561) flowing through at least the winding (e.g., the winding 560), the third controller terminal (e.g., the controller terminal 554), the fourth controller terminal (e.g., the controller terminal 558), and the resistor (e.g., the resistor 574). The system controller (e.g., the modulation controller 540) is configured to, in response to the first signal (e.g., the voltage 571) satisfying one or more predetermined conditions: cause the second signal (e.g., the sensing voltage 575) to ramp up and down during a first duration of time (e.g., the stage-1 time duration $T_{s1}$); and cause the second signal (e.g., the sensing voltage 575) to ramp up and down during a second duration of time (e.g., the stage-2 time duration $T_{s2}$). The first duration of time (e.g., the stage-1 time duration $T_{s1}$) starts at a first time and ends at a second time, and the second time is the same as or later than the first time. The second duration of time (e.g., the stage-2 time duration $T_{s2}$) starts at a third time and ends at a fourth time, and the fourth time is the same as or later than the third time. The sum of the first duration of time (e.g., the stage-1 time duration $T_{s1}$) and the second duration of time (e.g., the stage-2 time duration $T_{s2}$) is equal to a total duration of time (e.g., the two-stage total time duration $T_{st}$). The system controller (e.g., the modulation controller 540) is further configured to: in response to the dimming-control phase angle (e.g., $\phi_{dim\_on}$) increasing from a first angle magnitude (e.g., 0°) to a second angle magnitude (e.g., $\phi_A$), keep the total duration of time at a first predetermined constant; in response to the dimming-control phase angle (e.g., $\phi_{dim\_on}$) increasing from the second angle magnitude (e.g., $\phi_A$) to a third angle magnitude (e.g., $\phi_C$), increase the total duration of time; and in response to the dimming-control phase angle (e.g., $\phi_{dim\_on}$) increasing from the third angle magnitude (e.g., $\phi_C$) to a fourth angle magnitude (e.g., 180°), keep the total duration of time at a second predetermined constant (e.g., $T_{st\_max}$). For example, the system controller (e.g., the modulation controller 540) is implemented according to at least FIG. 5, FIG. 6A, FIG. 6B, FIG. 7, FIG. 9A, and/or FIG. 9B.

In another example, the second time is earlier than the third time. In yet another example, the second time is the same as the third time. In yet another example, the first angle magnitude is equal to 0°, and the fourth angle magnitude is equal to 180°. In yet another example, the first predetermined constant is equal to zero. In yet another example, the second predetermined constant (e.g., $T_{st\_max}$) is larger than zero.

In yet another example, the system controller (e.g., the modulation controller 540) is further configured to, in response to the dimming-control phase angle (e.g., $\phi_{dim\_on}$) increasing from the second angle magnitude (e.g., $\phi_A$) to the third angle magnitude (e.g., $\phi_C$): increase the total duration of time linearly at a first constant slope (e.g., the slope $STL_1$) in response to the dimming-control phase angle increasing from the second angle magnitude (e.g., $\phi_A$) to a fourth angle magnitude (e.g., $\phi_B$); and increase the total duration of time linearly at a second constant slope (e.g., the slope $STL_2$) in response to the dimming-control phase angle increasing from the fourth angle magnitude (e.g., $\phi_B$) to the third angle magnitude (e.g., $\phi_C$). The fourth angle magnitude (e.g., $\phi_B$) is larger than the second angle magnitude (e.g., $\phi_A$) and smaller than the third angle magnitude (e.g., $\phi_C$). In yet another example, the first constant slope (e.g., the slope $STL_1$) and the second constant slope (e.g., the slope $STL_2$) are equal. In yet another example, the first constant slope (e.g., the slope $STL_1$) and the second constant slope (e.g., the slope $STL_2$) are not equal.

In yet another example, the total duration of time is equal to the first predetermined constant in response to the dimming-control phase angle (e.g., $\phi_{dim\_on}$) being equal to the second angle magnitude (e.g., $\phi_A$); the total duration of time is equal to an intermediate magnitude (e.g., $T_{st\_mid}$) in response to the dimming-control phase angle being equal to the fourth angle magnitude (e.g., $\phi_B$); and the total duration of time is equal to the second predetermined constant in response to the dimming-control phase angle (e.g., $\phi_{dim\_on}$) being equal to the third angle magnitude (e.g., $\phi_C$). The intermediate magnitude (e.g., $T_{st\_mid}$) is larger than the first predetermined constant and smaller than the second predetermined constant.

According to yet another embodiment, a system controller (e.g., the modulation controller 540) for a lighting system (e.g., the lighting system 500) includes a first controller terminal (e.g., the controller terminal 542) configured to receive a first signal (e.g., the voltage 571), and a second controller terminal (e.g., the controller terminal 552) coupled to a first transistor terminal of a transistor (e.g., the gate terminal of the transistor 562). The transistor further includes a second transistor terminal (e.g., the drain terminal of the transistor 562) and a third transistor terminal (e.g., the source terminal of the transistor 562), and the second transistor terminal is coupled to a first winding terminal of a winding (e.g., the winding 560). The winding (e.g., the winding 560) further includes a second winding terminal coupled to a capacitor (e.g., the capacitor 530). Additionally, the system controller (e.g., the modulation controller 540) includes a third controller terminal (e.g., the controller terminal 554) coupled to the third transistor terminal of the transistor (e.g., the source terminal of the transistor 562), and a fourth controller terminal (e.g., the controller terminal 558) coupled to a resistor (e.g., the resistor 574) and configured to receive a second signal (e.g., the sensing voltage 575). The second signal represents a magnitude of a current (e.g., the current 561) flowing through at least the winding (e.g., the winding 560), the third controller terminal (e.g., the controller terminal 554), the fourth controller terminal (e.g., the controller terminal 558), and the resistor (e.g., the resistor 574). The system controller (e.g., the modulation controller 540) is configured to determine whether or not a TRIAC dimmer is detected to be included in the lighting system and if the TRIAC dimmer is detected to be included in the lighting system, whether the TRIAC dimmer is a leading-edge TRIAC dimmer or a trailing-edge TRIAC dimmer. The system controller (e.g., the modulation controller 540) is further configured to, if the TRIAC dimmer is detected to be included in the lighting system and the TRIAC dimmer is the leading-edge TRIAC dimmer: in response to the first signal (e.g., the voltage 571) becoming larger than a first threshold (e.g., the threshold voltage $V_{th\_aa}$) in magnitude at a first time (e.g., the time $t_2$), cause the second signal (e.g., the sensing voltage 575) to ramp up and down during a first duration of time (e.g., the stage-1 time duration $T_{s1}$); and in response to the first signal (e.g., the voltage 571) becoming smaller than a second threshold (e.g., the threshold voltage $V_{th\_bb}$) in magnitude at a third time (e.g., the time $t_4$), cause the second signal (e.g., the sensing voltage 575) to ramp up and down during a second duration of time (e.g., the stage-2 time duration $T_{s2}$). The first duration of time (e.g., the stage-1 time duration $T_{s1}$) starts at the first time (e.g., the time $t_2$) and ends at a second time (e.g., the time $t_3$), and the second duration of time (e.g., the stage-2 time duration $T_{s2}$) starts at the third time (e.g., the time $t_4$) and ends at a fourth time (e.g., the time $t_6$). The system controller (e.g., the modulation controller 540) is further configured to, if the TRIAC dimmer is detected to be included in the lighting system and the TRIAC dimmer is the trailing-edge TRIAC dimmer: in response to the first signal (e.g., the voltage 571) becoming larger than the first threshold (e.g., the threshold voltage $V_{th\_aa}$) in magnitude at a fifth time (e.g., the time $t_{11}$), cause the second signal (e.g., the sensing voltage 575) to ramp up and down during a duration of time (e.g., the two-stage total time duration $T_{st}$). The duration of time (e.g., the two-stage total time duration $T_{st}$) starts at a sixth time (e.g., the time $t_{12}$) and ends at a seventh time (e.g., the time $t_{14}$). The seventh time (e.g., the time $t_{14}$) is a time when the first signal (e.g., the voltage 571) becomes smaller than the second threshold (e.g., the threshold voltage $V_{th\_bb}$) in magnitude. For example, the system controller (e.g., the modulation controller 540) is implemented according to at least FIG. 5, FIG. 8, FIG. 9A, and/or FIG. 9B.

In another example, the system controller (e.g., the modulation controller 540) is further configured to, if the TRIAC dimmer is detected to be included in the lighting system and the TRIAC dimmer is the leading-edge TRIAC dimmer, cause the second signal (e.g., the sensing voltage 575) to remain equal to a constant magnitude from the second time (e.g., the time $t_3$) to the third time (e.g., the time $t_4$). In yet another example, the system controller (e.g., the modulation controller 540) is further configured to, if the TRIAC dimmer is detected to be included in the lighting system and the TRIAC dimmer is the trailing-edge TRIAC dimmer, cause the second signal (e.g., the sensing voltage 575) to remain equal to a constant magnitude from the fifth time (e.g., the time $t_{11}$) to the sixth time (e.g., the time $t_{12}$).

According to yet another embodiment, a method for a lighting system (e.g., the lighting system 500) includes receiving a first signal (e.g., the voltage 571), and receiving a second signal (e.g., the sensing voltage 575). The second signal represents a magnitude of a current (e.g., the current 561) flowing through at least a winding (e.g., the winding 560). Additionally, the method includes: in response to the first signal (e.g., the voltage 571) becoming larger than a first threshold (e.g., the threshold voltage $V_{th1\_a}$) in magnitude at a first time (e.g., the time $t_2$), causing the second signal (e.g., the sensing voltage 575) to ramp up and down during a first duration of time (e.g., the stage-1 time duration $T_{s1}$); and in response to the first signal (e.g., the voltage 571) becoming smaller than a second threshold (e.g., the threshold voltage $V_{th1\_b}$) in magnitude at a third time (e.g., the time $t_4$), causing the second signal (e.g., the sensing voltage 575) to ramp up and down during a second duration of time (e.g., the stage-2 time duration $T_{s2}$). The first duration of time (e.g., the stage-1 time duration $T_{s1}$) starts at the first time (e.g., the time $t_2$) and ends at a second time (e.g., the time $t_3$), and the second duration of time (e.g., the stage-2 time duration $T_{s2}$) starts at the third time (e.g., the time $t_4$) and ends at a fourth time (e.g., the time $t_6$). Moreover, the method includes causing the second signal (e.g., the sensing voltage 575) to remain equal to a constant magnitude from the second time (e.g., the time $t_3$) to the third time (e.g., the time $t_4$). The first time (e.g., the time $t_2$) is earlier than the second time (e.g., the time $t_3$), the second time (e.g., the time $t_3$) is earlier than the third time (e.g., the time $t_4$), and the third time (e.g., the time $t_4$) is earlier than the fourth time (e.g., the time $t_6$). For example, the method is implemented according to at least FIG. 5, FIG. 6A, and/or FIG. 9A.

In another example, the method further includes: in response to the first signal (e.g., the voltage 571) becoming smaller than the second threshold (e.g., the threshold voltage $V_{th1\_b}$) in magnitude at a previous time (e.g., the time $t_{-1}$) earlier than the first time (e.g., the time $t_2$), determining the second time (e.g., the time $t_3$) to be a predetermined time duration (e.g., the predetermined time duration $T_P$) after the previous time (e.g., the time $t_{-1}$). In yet another example, the constant magnitude is equal to zero.

According to yet another embodiment, a method for a lighting system (e.g., the lighting system 500) includes receiving a first signal (e.g., the voltage 571) and receiving a second signal (e.g., the sensing voltage 575). The second signal represents a magnitude of a current (e.g., the current 561) flowing through at least a winding (e.g., the winding 560). Additionally, the method includes: in response to the first signal (e.g., the voltage 571) becoming larger than a first threshold (e.g., the threshold voltage $V_{th2\_a}$) in magnitude at a first time (e.g., the time $t_{11}$), causing the second signal (e.g., the sensing voltage 575) to ramp up and down during a duration of time (e.g., the two-stage total time duration $T_{st}$). The duration of time (e.g., the two-stage total time duration $T_{st}$) starts at a second time (e.g., the time $t_{12}$) and ends at a third time (e.g., the time $t_{14}$), and the third time (e.g., the time $t_{14}$) is a time when the first signal (e.g., the voltage 571) becomes smaller than a second threshold (e.g., the threshold voltage $V_{th2\_b}$) in magnitude. Moreover, the method includes causing the second signal (e.g., the sensing voltage 575) to remain equal to a constant magnitude from the first time (e.g., the time $t_{11}$) to the second time (e.g., the time $t_{12}$). The first time (e.g., the time $t_{11}$) is earlier than the second time (e.g., the time $t_{12}$), and the second time (e.g., the time $t_{12}$) is earlier than the third time (e.g., the time $t_{14}$). For example, the method is implemented according to at least FIG. 5, FIG. 6B, and/or FIG. 9B.

In another example, the method further includes: in response to the first signal (e.g., the voltage 571) becoming larger than the first threshold (e.g., the threshold voltage $V_{th2\_a}$) in magnitude at the first time (e.g., the time $t_{11}$), determining the second time (e.g., the time $t_{12}$) to be a predetermined time duration (e.g., the predetermined time duration $T_Q$) after the first time (e.g., the time $t_{11}$). In yet another example, the constant magnitude is equal to zero.

According to yet another embodiment, a method for a lighting system (e.g., the lighting system 500) includes receiving a first signal (e.g., the voltage 571). The first signal is related to a dimming-control phase angle (e.g., $\phi_{dim\_on}$). Additionally, the method includes receiving a second signal (e.g., the sensing voltage 575). The second signal represents a magnitude of a current (e.g., the current 561) flowing through at least a winding (e.g., the winding 560). Moreover, the method includes, in response to the first signal (e.g., the voltage 571) satisfying one or more predetermined conditions: causing the second signal (e.g., the sensing voltage 575) to ramp up and down during a first duration of time (e.g., the stage-1 time duration $T_{s1}$); and causing the second signal (e.g., the sensing voltage 575) to ramp up and down during a second duration of time (e.g., the stage-2 time duration $T_{s2}$). The first duration of time (e.g., the stage-1 time duration $T_{s1}$) starts at a first time and ends at a second time, and the second time is the same as or later than the first time. The second duration of time (e.g., the stage-2 time duration $T_{s2}$) starts at a third time and ends at a fourth time, and the fourth time is the same as or later than the third time. The causing the second signal (e.g., the sensing voltage 575) to ramp up and down during a first duration of time (e.g., the stage-1 time duration $T_{s1}$) includes: in response to the dimming-control phase angle (e.g., $\phi_{dim\_on}$) increasing from a first angle magnitude (e.g., 0°) to a second angle magnitude (e.g., $\phi_B$), keeping the first duration of time at a first predetermined constant; in response to the dimming-control phase angle (e.g., $\phi_{dim\_on}$) increasing from the second angle magnitude (e.g., $\phi_B$) to a third angle magnitude (e.g., $\phi_C$), increasing the first duration of time; and in response to the dimming-control phase angle (e.g., $\phi_{dim\_on}$) increasing from the third angle magnitude (e.g., $\phi_C$) to a fourth angle magnitude (e.g., 180°), keeping the first duration of time at a second predetermined constant (e.g., $T_{s1\_max}$). For example, the method is implemented according to at least FIG. 5, FIG. 6A, FIG. 6B, FIG. 7, FIG. 9A, and/or FIG. 9B.

In another example, the second time is earlier than the third time. In yet another example, the second time is the same as the third time. In yet another example, the first angle magnitude is equal to 0°, and the fourth angle magnitude is equal to 180°. In yet another example, the first predetermined constant is equal to zero. In yet another example, the process of, in response to the dimming-control phase angle (e.g., $\phi_{dim\_on}$) increasing from the second angle magnitude (e.g., $\phi_B$) to a third angle magnitude (e.g., $\phi_C$), increasing the first duration of time includes: in response to the dimming-control phase angle (e.g., $\phi_{dim\_on}$) increasing from the second angle magnitude (e.g., $\phi_B$) to the third angle magnitude (e.g., $\phi_C$), increasing the first duration of time linearly with the increasing dimming-control phase angle at a constant slope (e.g., the slope $SL_1$). In yet another example, the second predetermined constant (e.g., $T_{s1\_max}$) is larger than zero.

According to yet another embodiment, a method for a lighting system (e.g., the lighting system 500) includes receiving a first signal (e.g., the voltage 571). The first signal is related to a dimming-control phase angle (e.g., $\phi_{dim\_on}$). Additionally, the method includes receiving a second signal (e.g., the sensing voltage 575). The second signal represents a magnitude of a current (e.g., the current 561) flowing through at least a winding (e.g., the winding 560). Moreover, the method includes, in response to the first signal (e.g., the voltage 571) satisfying one or more predetermined conditions: causing the second signal (e.g., the sensing voltage 575) to ramp up and down during a first duration of time (e.g., the stage-1 time duration $T_{s1}$); and causing the second signal (e.g., the sensing voltage 575) to ramp up and down during a second duration of time (e.g., the stage-2 time duration $T_{s2}$). The first duration of time (e.g., the stage-1 time duration $T_{s1}$) starts at a first time and ends at a second time, and the second time is the same as or later than the first time. The second duration of time (e.g., the stage-2 time duration $T_{s2}$) starts at a third time and ends at a fourth time, and the fourth time is the same as or later than the third time. The causing the second signal (e.g., the sensing voltage 575) to ramp up and down during a second duration of time (e.g., the stage-2 time duration $T_{s2}$) includes: in response to the dimming-control phase angle (e.g., $\phi_{dim\_on}$) increasing from a first angle magnitude (e.g., 0°) to a second angle magnitude (e.g., $\phi_A$), keeping the second duration of time at a first predetermined constant; in response to the dimming-control phase angle (e.g., $\phi_{dim\_on}$) increasing from the second angle magnitude (e.g., $\phi_A$) to a third angle magnitude (e.g., $\phi_B$), increasing the second duration of time; and in response to the dimming-control phase angle (e.g., $\phi_{dim\_on}$) increasing from the third angle magnitude (e.g., $\phi_B$) to a fourth angle magnitude (e.g., 180°), keeping the second duration of time at a second predetermined constant (e.g., $T_{s2\_max}$). For example, the method is implemented according to at least FIG. 5, FIG. 6A, FIG. 6B, FIG. 7, FIG. 9A, and/or FIG. 9B.

In another example, the second time is earlier than the third time. In yet another example, the second time is the same as the third time. In yet another example, the first angle magnitude is equal to 0°, and the fourth angle magnitude is equal to 180°. In yet another example, the first predetermined constant is equal to zero. In yet another example, the process of, in response to the dimming-control phase angle (e.g., $\phi_{dim\_on}$) increasing from the second angle magnitude (e.g., $\phi_A$) to a third angle magnitude (e.g., $\phi_B$), increasing the second duration of time includes: in response to the dimming-control phase angle (e.g., $\phi_{dim\_on}$) increasing from the second angle magnitude (e.g., $\phi_A$) to the third angle magnitude (e.g., $\phi_B$), increasing the second duration of time linearly with the increasing dimming-control phase angle at a constant slope (e.g., the slope $SL_2$). In yet another example, the second predetermined constant (e.g., $T_{s2\_max}$) is larger than zero.

According to yet another embodiment, a method for a lighting system (e.g., the lighting system 500) includes receiving a first signal (e.g., the voltage 571). The first signal is related to a dimming-control phase angle (e.g., $\phi_{dim\_on}$). Additionally, the method includes receiving a second signal (e.g., the sensing voltage 575). The second signal represents a magnitude of a current (e.g., the current 561) flowing through at least a winding (e.g., the winding 560). Moreover, the method includes, in response to the first signal (e.g., the voltage 571) satisfying one or more predetermined conditions: causing the second signal (e.g., the sensing voltage 575) to ramp up and down during a first duration of time (e.g., the stage-1 time duration $T_{s1}$); and causing the second signal (e.g., the sensing voltage 575) to ramp up and down during a second duration of time (e.g., the stage-2 time duration $T_{s2}$). The first duration of time (e.g., the stage-1 time duration $T_{s1}$) starts at a first time and ends at a second time, and the second time is the same as or later than the first time. The second duration of time (e.g., the stage-2 time duration $T_{s2}$) starts at a third time and ends at a fourth time, and the fourth time is the same as or later than the third time. A sum of the first duration of time (e.g., the stage-1 time duration $T_{s1}$) and the second duration of time (e.g., the stage-2 time duration $T_{s2}$) is equal to a total duration of time (e.g., the two-stage total time duration $T_{st}$). The causing the second signal (e.g., the sensing voltage 575) to ramp up and down during a first duration of time (e.g., the stage-1 time duration $T_{s1}$) and the causing the second signal (e.g., the sensing voltage 575) to ramp up and down during a second duration of time (e.g., the stage-2 time duration $T_{s2}$) include: in response to the dimming-control phase angle (e.g., $\phi_{dim\_on}$) increasing from a first angle magnitude (e.g., 0°) to a second angle magnitude (e.g., $\phi_A$), keeping the total duration of time at a first predetermined constant; in response to the dimming-control phase angle (e.g., $\phi_{dim\_on}$) increasing from the second angle magnitude (e.g., $\phi_A$) to a third angle magnitude (e.g., $\phi_C$), increasing the total duration of time; and in response to the dimming-control phase angle (e.g., $\phi_{dim\_on}$) increasing from the third angle magnitude (e.g., $\phi_C$) to a fourth angle magnitude (e.g., 180°), keeping the total duration of time at a second predetermined constant (e.g., $T_{st\_max}$). For example, the method is implemented according to at least FIG. 5, FIG. 6A, FIG. 6B, FIG. 7, FIG. 9A, and/or FIG. 9B.

In another example, the second time is earlier than the third time. In yet another example, the second time is the same as the third time. In yet another example, the first angle magnitude is equal to 0°, and the fourth angle magnitude is equal to 180°. In yet another example, the first predetermined constant is equal to zero. In yet another example, the second predetermined constant (e.g., $T_{st\_max}$) is larger than zero.

In yet another example, the process of, in response to the dimming-control phase angle (e.g., $\phi_{dim\_on}$) increasing from the second angle magnitude (e.g., $\phi_A$) to a third angle magnitude (e.g., $\phi_C$), increasing the total duration of time includes: increasing the total duration of time linearly at a first constant slope (e.g., the slope $STL_1$) in response to the dimming-control phase angle increasing from the second angle magnitude (e.g., $\phi_A$) to a fourth angle magnitude (e.g., $\phi_B$); and increasing the total duration of time linearly at a second constant slope (e.g., the slope $STL_2$) in response to the dimming-control phase angle increasing from the fourth angle magnitude (e.g., $\phi_B$) to the third angle magnitude (e.g., $\phi_C$). The fourth angle magnitude (e.g., $\phi_B$) is larger than the second angle magnitude (e.g., $\phi_A$) and smaller than the third angle magnitude (e.g., $\phi_C$). In yet another example, the first constant slope (e.g., the slope $STL_1$) and the second constant slope (e.g., the slope $STL_2$) are equal. In yet another example, the first constant slope (e.g., the slope $STL_1$) and the second constant slope (e.g., the slope $STL_2$) are not equal. In yet another example, the total duration of time is equal to the first predetermined constant in response to the dimming-control phase angle (e.g., $\phi_{dim\_on}$) being equal to the second angle magnitude (e.g., $\phi_A$), the total duration of time is equal to an intermediate magnitude (e.g., $T_{st\_mid}$) in response to the dimming-control phase angle being equal to the fourth angle magnitude (e.g., $\phi_B$), and the total duration of time is equal to the second predetermined constant in response to the dimming-control phase angle (e.g., $\phi_{dim\_on}$) being equal to the third angle magnitude (e.g., $\phi_C$). The intermediate magnitude (e.g., $T_{st\_mid}$) is larger than the first predetermined constant and smaller than the second predetermined constant.

According to yet another embodiment, a method for a lighting system (e.g., the lighting system 500) includes receiving a first signal (e.g., the voltage 571) and receiving a second signal (e.g., the sensing voltage 575). The second signal represents a magnitude of a current (e.g., the current 561) flowing through at least a winding (e.g., the winding 560). Additionally, the method includes determining whether or not a TRIAC dimmer is detected to be included in the lighting system and if the TRIAC dimmer is detected to be included in the lighting system, whether the TRIAC dimmer is a leading-edge TRIAC dimmer or a trailing-edge TRIAC dimmer. Moreover, the method includes, if the TRIAC dimmer is detected to be included in the lighting system and the TRIAC dimmer is the leading-edge TRIAC dimmer: in response to the first signal (e.g., the voltage 571) becoming larger than a first threshold (e.g., the threshold voltage $V_{th\_aa}$) in magnitude at a first time (e.g., the time $t_2$), causing the second signal (e.g., the sensing voltage 575) to ramp up and down during a first duration of time (e.g., the stage-1 time duration $T_{s1}$); and in response to the first signal (e.g., the voltage 571) becoming smaller than a second threshold (e.g., the threshold voltage $V_{th\_bb}$) in magnitude at a third time (e.g., the time $t_4$), causing the second signal (e.g., the sensing voltage 575) to ramp up and down during a second duration of time (e.g., the stage-2 time duration $T_{s2}$). The first duration of time (e.g., the stage-1 time duration $T_{s1}$) starts at the first time (e.g., the time $t_2$) and ends at a second time (e.g., the time $t_3$), and the second duration of time (e.g., the stage-2 time duration $T_{s2}$) starts at the third time (e.g., the time $t_4$) and ends at a fourth time (e.g., the time $t_6$). Also, the method includes, if the TRIAC dimmer is detected to be included in the lighting system and the TRIAC dimmer is the trailing-edge TRIAC dimmer: in response to the first signal (e.g., the voltage 571) becoming larger than the first threshold (e.g., the threshold voltage $V_{th\_aa}$) in magnitude at a fifth time (e.g., the time $t_{11}$), causing the second signal (e.g., the sensing voltage 575) to ramp up and down during a duration of time (e.g., the two-stage total time duration $T_{st}$). The duration of time (e.g., the two-stage total time duration $T_{st}$) starts at a sixth time (e.g., the time $t_{12}$) and ends at a seventh time (e.g., the time $t_{14}$). The seventh time (e.g., the time $t_{14}$) is a time when the first signal (e.g., the voltage 571) becomes smaller than the second threshold (e.g., the threshold voltage $V_{th\_bb}$) in magnitude. For example, the method is implemented according to at least FIG. 5, FIG. 8, FIG. 9A, and/or FIG. 9B.

In another example, the method further includes: if the TRIAC dimmer is detected to be included in the lighting system and the TRIAC dimmer is the leading-edge TRIAC dimmer, causing the second signal (e.g., the sensing voltage 575) to remain equal to a constant magnitude from the second time (e.g., the time $t_3$) to the third time (e.g., the time $t_4$). In yet another example, the method further includes: if the TRIAC dimmer is detected to be included in the lighting system and the TRIAC dimmer is the trailing-edge TRIAC dimmer, causing the second signal (e.g., the sensing voltage 575) to remain equal to a constant magnitude from the fifth time (e.g., the time $t_{11}$) to the sixth time (e.g., the time $t_{12}$).

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for a lighting system, the system controller comprising:
   a first controller terminal configured to receive a first signal;
   a second controller terminal coupled to a first transistor terminal of a transistor, the transistor further including a second transistor terminal and a third transistor terminal, the second transistor terminal being coupled to a first winding terminal of a winding, the winding further including a second winding terminal coupled to a capacitor;

a third controller terminal coupled to the third transistor terminal of the transistor; and a fourth controller terminal coupled to a resistor and configured to receive a second signal, the second signal representing a magnitude of a current flowing through at least the winding, the third controller terminal, the fourth controller terminal, and the resistor;

wherein the system controller is configured to:
in response to the first signal becoming larger than a first threshold in magnitude at a first time, cause the second signal to ramp up and down during a first duration of time, the first duration of time starting at the first time and ending at a second time; and in response to the first signal becoming smaller than a second threshold in magnitude at a third time, cause the second signal to ramp up and down during a second duration of time, the second duration of time starting at the third time and ending at a fourth time;

wherein the system controller is further configured to cause the second signal to remain equal to a constant magnitude from the second time to the third time;

wherein:
the first time is earlier than the second time;
the second time is earlier than the third time; and
the third time is earlier than the fourth time.

2. The system controller of claim 1 is further configured to:
in response to the first signal becoming smaller than the second threshold in magnitude at a previous time earlier than the first time, determine the second time to be a predetermined time duration after the previous time.

3. The system controller of claim 1 wherein the fourth time is a time when the capacitor becomes completely discharged.

4. The system controller of claim 1 wherein the first threshold and the second threshold are equal.

5. The system controller of claim 1 wherein the first threshold and the second threshold are not equal.

6. The system controller of claim 1 wherein the constant magnitude is equal to zero.

7. The system controller of claim 1 wherein each of the first controller terminal, the second controller terminal, the third controller terminal, and the fourth controller terminal is a pin.

8. The system controller of claim 1 wherein each of the first controller terminal, the second controller terminal, the third controller terminal, and the fourth controller terminal is a pin.

9. A system controller for a lighting system, the system controller comprising:
a first controller terminal configured to receive a first signal;
a second controller terminal coupled to a first transistor terminal of a transistor, the transistor further including a second transistor terminal and a third transistor terminal, the second transistor terminal being coupled to a winding;
a third controller terminal coupled to the third transistor terminal of the transistor; and
a fourth controller terminal coupled to a resistor and configured to receive a second signal, the second signal representing a magnitude of a current flowing through at least the winding, the third controller terminal, the fourth controller terminal, and the resistor;

wherein the system controller is configured to:
in response to the first signal becoming larger than a first threshold in magnitude at a first time, cause the second signal to ramp up and down during a duration of time, the duration of time starting at a second time and ending at a third time, the third time being a time when the first signal becomes smaller than a second threshold in magnitude;

wherein the system controller is further configured to cause the second signal to remain equal to a constant magnitude from the first time to the second time;

wherein:
the first time is earlier than the second time; and
the second time is earlier than the third time.

10. The system controller of claim 9 is further configured to:
in response to the first signal becoming larger than the first threshold in magnitude at the first time, determine the second time to be a predetermined time duration after the first time.

11. The system controller of claim 9 wherein the first threshold and the second threshold are equal.

12. The system controller of claim 9 wherein the first threshold and the second threshold are not equal.

13. The system controller of claim 9 wherein the constant magnitude is equal to zero.

14. A system controller for a lighting system, the system controller comprising:
a first controller terminal configured to receive a first signal;
a second controller terminal coupled to a first transistor terminal of a transistor, the transistor further including a second transistor terminal and a third transistor terminal, the second transistor terminal being coupled to a first winding terminal of a winding, the winding further including a second winding terminal coupled to a capacitor;
a third controller terminal coupled to the third transistor terminal of the transistor; and
a fourth controller terminal coupled to a resistor and configured to receive a second signal, the second signal representing a magnitude of a current flowing through at least the winding, the third controller terminal, the fourth controller terminal, and the resistor;

wherein the system controller is configured to determine whether or not a TRIAC dimmer is detected to be included in the lighting system and if the TRIAC dimmer is detected to be included in the lighting system, whether the TRIAC dimmer is a leading-edge TRIAC dimmer or a trailing-edge TRIAC dimmer;

wherein the system controller is further configured to, if the TRIAC dimmer is detected to be included in the lighting system and the TRIAC dimmer is the leading-edge TRIAC dimmer:
in response to the first signal becoming larger than a first threshold in magnitude at a first time, cause the second signal to ramp up and down during a first duration of time, the first duration of time starting at the first time and ending at a second time; and in response to the first signal becoming smaller than a second threshold in magnitude at a third time, cause the second signal to ramp up and down during a second duration of time, the second duration of time starting at the third time and ending at a fourth time;

wherein the system controller is further configured to, if the TRIAC dimmer is detected to be included in the lighting system and the TRIAC dimmer is the trailing-edge TRIAC dimmer:

in response to the first signal becoming larger than the first threshold in magnitude at a fifth time, cause the second signal to ramp up and down during a duration of time, the duration of time starting at a sixth time and ending at a seventh time, the seventh time being a time when the first signal becomes smaller than the second threshold in magnitude.

15. The system controller of claim 14 is further configured to, if the TRIAC dimmer is detected to be included in the lighting system and the TRIAC dimmer is the leading-edge TRIAC dimmer, cause the second signal to remain equal to a constant magnitude from the second time to the third time.

16. The system controller of claim 14 is further configured to, if the TRIAC dimmer is detected to be included in the lighting system and the TRIAC dimmer is the trailing-edge TRIAC dimmer, cause the second signal to remain equal to a constant magnitude from the fifth time to the sixth time.

17. A method for a lighting system, the method comprising:
receiving a first signal;
receiving a second signal, the second signal representing a magnitude of a current flowing through at least a winding;
in response to the first signal becoming larger than a first threshold in magnitude at a first time, causing the second signal to ramp up and down during a first duration of time, the first duration of time starting at the first time and ending at a second time;
in response to the first signal becoming smaller than a second threshold in magnitude at a third time, causing the second signal to ramp up and down during a second duration of time, the second duration of time starting at the third time and ending at a fourth time; and
causing the second signal to remain equal to a constant magnitude from the second time to the third time;
wherein:
the first time is earlier than the second time;
the second time is earlier than the third time; and
the third time is earlier than the fourth time.

18. The method of claim 17, and further comprising:
in response to the first signal becoming smaller than the second threshold in magnitude at a previous time earlier than the first time, determining the second time to be a predetermined time duration after the previous time.

19. The method of claim 17 wherein the constant magnitude is equal to zero.

20. A method for a lighting system, the method comprising:
receiving a first signal;
receiving a second signal, the second signal representing a magnitude of a current flowing through at least a winding;
in response to the first signal becoming larger than a first threshold in magnitude at a first time, causing the second signal to ramp up and down during a duration of time, the duration of time starting at a second time and ending at a third time, the third time being a time when the first signal becomes smaller than a second threshold in magnitude; and
causing the second signal to remain equal to a constant magnitude from the first time to the second time;
wherein:
the first time is earlier than the second time; and
the second time is earlier than the third time.

21. The method of claim 20, and further comprising:
in response to the first signal becoming larger than the first threshold in magnitude at the first time, determining the second time to be a predetermined time duration after the first time.

22. The method of claim 20 wherein the constant magnitude is equal to zero.

23. A method for a lighting system, the method comprising:
receiving a first signal;
receiving a second signal, the second signal representing a magnitude of a current flowing through at least a winding;
determining whether or not a TRIAC dimmer is detected to be included in the lighting system and if the TRIAC dimmer is detected to be included in the lighting system, whether the TRIAC dimmer is a leading-edge TRIAC dimmer or a trailing-edge TRIAC dimmer;
if the TRIAC dimmer is detected to be included in the lighting system and the TRIAC dimmer is the leading-edge TRIAC dimmer,
in response to the first signal becoming larger than a first threshold in magnitude at a first time, causing the second signal to ramp up and down during a first duration of time, the first duration of time starting at the first time and ending at a second time; and
in response to the first signal becoming smaller than a second threshold in magnitude at a third time, causing the second signal to ramp up and down during a second duration of time, the second duration of time starting at the third time and ending at a fourth time; and
if the TRIAC dimmer is detected to be included in the lighting system and the TRIAC dimmer is the trailing-edge TRIAC dimmer,
in response to the first signal becoming larger than the first threshold in magnitude at a fifth time, causing the second signal to ramp up and down during a duration of time, the duration of time starting at a sixth time and ending at a seventh time, the seventh time being a time when the first signal becomes smaller than the second threshold in magnitude.

24. The method of claim 23, and further comprising: if the TRIAC dimmer is detected to be included in the lighting system and the TRIAC dimmer is the leading-edge TRIAC dimmer, causing the second signal to remain equal to a constant magnitude from the second time to the third time.

25. The method of claim 23, and further comprising: if the TRIAC dimmer is detected to be included in the lighting system and the TRIAC dimmer is the trailing-edge TRIAC dimmer, causing the second signal to remain equal to a constant magnitude from the fifth time to the sixth time.

* * * * *